(12) United States Patent
Pinnamaneni

(10) Patent No.: US 11,681,860 B2
(45) Date of Patent: Jun. 20, 2023

(54) METHODS AND SYSTEMS FOR GUIDED INFORMATION VIEWING AND STORAGE PLATFORMS

(71) Applicant: Sunil Pinnamaneni, Glen Oaks, NY (US)

(72) Inventor: Sunil Pinnamaneni, Glen Oaks, NY (US)

( * ) Notice: Subject to any disclaimer, the term of this patent is extended or adjusted under 35 U.S.C. 154(b) by 80 days.

(21) Appl. No.: 17/541,170

(22) Filed: Dec. 2, 2021

(65) Prior Publication Data

US 2022/0207231 A1 Jun. 30, 2022

Related U.S. Application Data

(62) Division of application No. 16/679,278, filed on Nov. 10, 2019, now Pat. No. 11,321,515.

(51) Int. Cl.
*G06F 40/106* (2020.01)
*G06F 40/169* (2020.01)
*G06F 16/953* (2019.01)
*G06F 3/04847* (2022.01)
*G06Q 30/0241* (2023.01)
*G06F 3/0483* (2013.01)
*G06F 16/483* (2019.01)
*G06F 16/93* (2019.01)
(Continued)

(52) U.S. Cl.
CPC .......... *G06F 40/106* (2020.01); *G06F 3/0483* (2013.01); *G06F 3/04847* (2013.01); *G06F 16/483* (2019.01); *G06F 16/5866* (2019.01); *G06F 16/81* (2019.01); *G06F 16/86* (2019.01); *G06F 16/94* (2019.01); *G06F 16/953* (2019.01); *G06F 16/9566* (2019.01); *G06F 16/9577* (2019.01); *G06F 40/169* (2020.01); *G06Q 30/0276* (2013.01); *G06Q 30/0277* (2013.01); *G06F 3/0482* (2013.01); *G06F 3/0489* (2013.01); *G06F 3/04817* (2013.01); *G06F 16/957* (2019.01); *G06F 40/30* (2020.01)

(58) Field of Classification Search
CPC .. G06F 40/106; G06F 3/0483; G06F 3/04847; G06F 16/483; G06F 16/5866; G06F 16/81; G06F 16/86; G06F 16/94; G06F 16/953; G06F 16/9566; G06F 16/9577; G06F 40/169; G06F 3/04817; G06F 3/0482; G06F 3/0489; G06F 16/957; G06F 40/30; G06Q 30/0276; G06Q 30/0277
See application file for complete search history.

(56) References Cited

U.S. PATENT DOCUMENTS

| | | | |
|---|---|---|---|
| 2014/0172808 A1* | 6/2014 | Burge | G06F 21/604 707/694 |
| 2015/0278182 A1* | 10/2015 | Nicholas | G06Q 10/1053 715/230 |

FOREIGN PATENT DOCUMENTS

CN 112639970 A * 4/2021 ........... A63F 13/213

* cited by examiner

*Primary Examiner* — Quoc A Tran

(57) ABSTRACT

The present disclosure relates to methods and systems for organizing, viewing, and connecting annotations of web documents within web browsers. The rationale for connecting annotations is discussed in detail along with mechanisms to enhance asynchronous, guided viewing within web browsers. Furthermore, data structures and processes for constructing this functionality are discussed with the aid of use case and sequence diagrams as well as verbal descriptions. In addition, guidance is provided for hardware system specifications and architectures of the exemplary systems that are discussed.

18 Claims, 60 Drawing Sheets

(51) Int. Cl.
*G06F 16/81* (2019.01)
*G06F 16/84* (2019.01)
*G06F 16/58* (2019.01)
*G06F 16/955* (2019.01)
*G06F 16/957* (2019.01)
*G06F 3/0482* (2013.01)
*G06F 3/0489* (2022.01)
*G06F 40/30* (2020.01)
*G06F 3/04817* (2022.01)
*G06F 17/00* (2019.01)

132 Nurse - Day One

133 Nurse - Day Two

134 visits glycemic index Wikipedia page and highlights "American Diabetes Association supports" and creates check annotation along with annotation comment stating, "Most doctors strongly believe that high glycemic index foods have a negative impact on the health of diabetics."

135 adds annotation to notepad

136 visits allrecipes.com and finds a dish such as "Flavorful Spanish Rice and Beans" and highlights "1 cup uncooked white rice" and creates exclamatory annotation comment stating, "the glycemic index of rice is very high, but it's possible to make this same recipe with pearled barley."

137 adds annotation to notepad

138 visits Harvard Health website and finds page for glycemic index of 100+ foods and highlights "White rice boiled*" with exclamatory annotation and states, "Most people don't realize that white rice has such a high glycemic index. Notice that it is 73, which is higher than most foods."

139 adds annotation to notepad

140 visits Harvard Health website and finds page for glycemic index of 100+ foods and highlights "Pearled Barley" with dagger annotation and states, "Most people don't realize that pearled barley has such a low glycemic index. Notice that it is 28, which is lower than most foods."

141 adds annotation to notepad

142 visits Target website and finds product page for pearled barley and selects "Pearled Barley - 1lb - Market Pantry" with dagger annotation and states, "Pearled Barley can be made in a rice cooker just like rice. Furthermore, cooked pearled barley has a grain like appearance and feel that makes it a perfect replacement for rice. This can be substituted for rice in recipes that call for rice."

143 adds annotation to notepad

144 shares notepad with a patient that is diabetic and likes to make Spanish Rice

FIG. 21

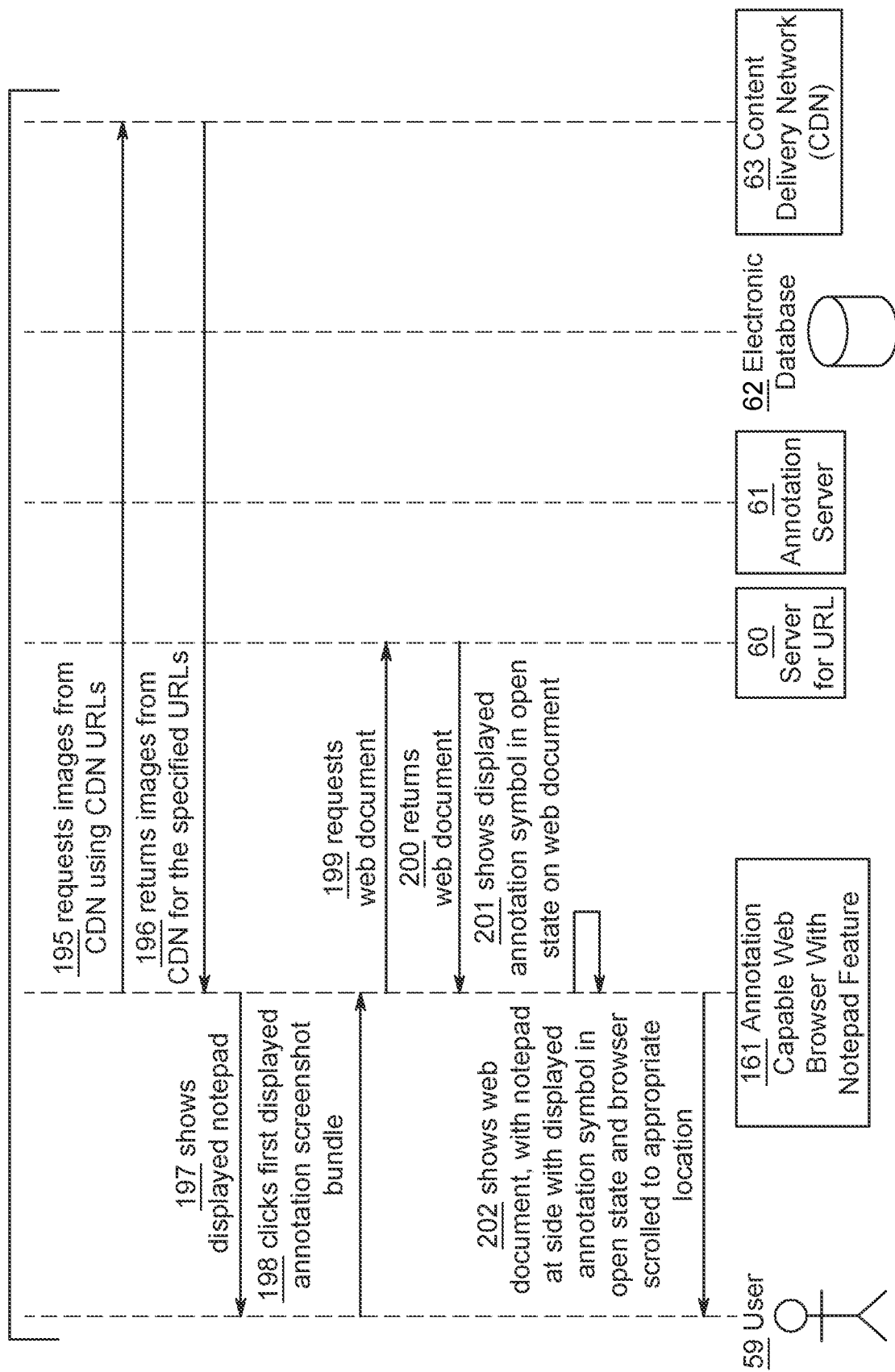

FIG. 32A

← → C 🔍 http://annotationserver.com/inbox

A Web Page

Collection Messages —277

US History Collection —279

- [Invitation to Join] —281

Sarah has invited you to join the US history Collection. Do you wish to join? You have accepted Sarah's invitation. —291

Hi Sam,
This is John. I'm an admin for the collection. I'm happy that you joined.
Sarah will respond after she comes back from vacation.
Best wishes,
John

Car Collection —280

+ This Car Is So Cool —282
+ Sent Invite —283

Hi John,
Thanks. I look forward to discussing US History with you.
I also appreciate Sarah's invitation.
I was happy to Join.
Thanks,
Sam

Untagged Messages —278

+ Message to Friend —284
+ Not Associated —285
+ To Collection —286

Hi Sam,
I just got back from vacation. I'm glad you joined.
Thanks,
Sarah

Write a message —296

[                    ] —297

[Send] —298

FIG. 34

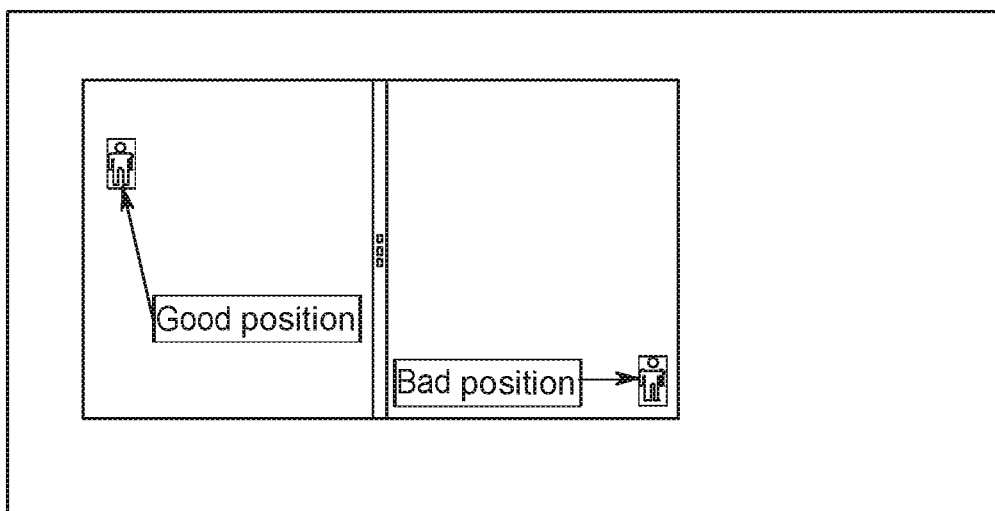
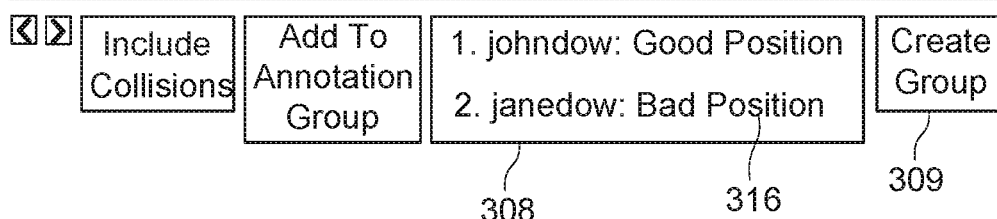
FIG. 38
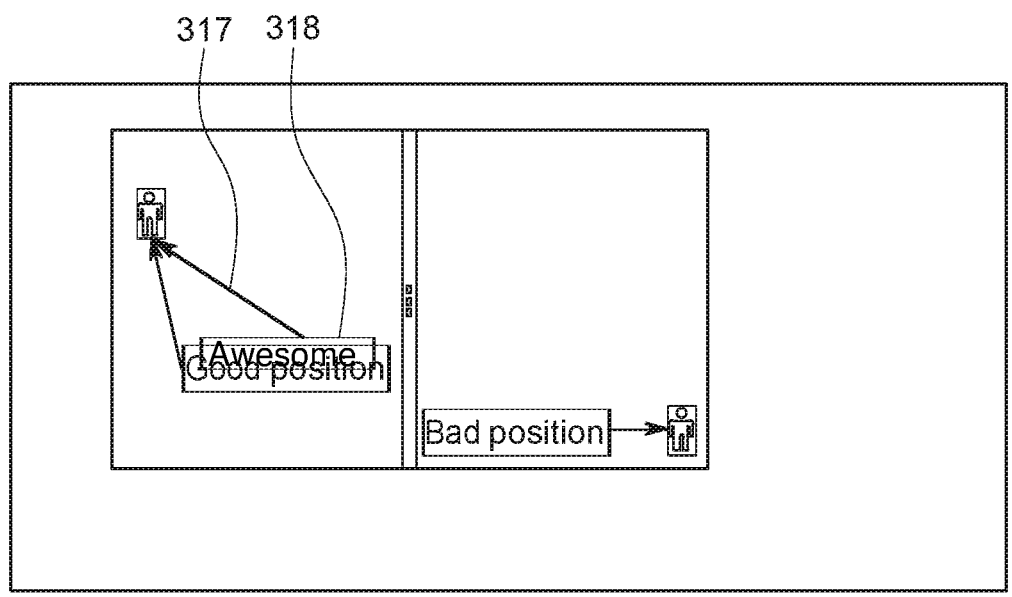
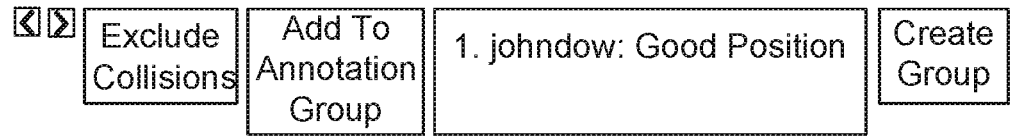
FIG. 39

METHODS AND SYSTEMS FOR GUIDED INFORMATION VIEWING AND STORAGE PLATFORMS

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The world wide web (WWW), web browsers, and browser extensions are well known. The WWW is a global information source where assets such as web pages, pdf documents, images, and videos are identified by unique uniform resource locators (URLs), and web browsers are software applications designed to access information on the WWW. In addition, browser extensions are pieces of software designed to extend the capabilities of pre-existing web browsers. It is also known that web browser functionality can be modified either by modifying a web browser's software code base or by providing a web browser extension for those web browsers that support the addition of functionality by such means.

As the world wide web has grown in popularity, people, on average, are spending more time each day using the world wide web than they have in the past. As the average time spent using the world wide web has increased, people have a greater need to do the following. They need to retrieve information they have previously seen on the WWW. They need to send and discuss snippets of text within web documents with friends and colleagues. They need to refer to specific pieces of text or context within a web document. They need to ask specific questions about portions of web documents. They need to connect information across web documents. They need to find and organize content and snippets for later use. They need to evaluate the value of crowd sourced information. And, they need to access other people's public comments on web documents and put these comments in context.

To deal with these use cases, people typically do the following. They repeat searches to find content they previously accessed. They bookmark web documents. They rescan articles for snippets they recall seeing. They copy and paste sections of text into email messages or other documents in order to share with friends or colleagues. They refer to sentences or paragraphs by number or web page location while discussing on the phone. They ask questions in the comments section of an article and reference the desired text by cutting and pasting it into the comment. They download the web page. And, they copy snippets into a personal word processor or spreadsheet document. This creates inefficiency and time waste for a large number of users. Furthermore, the lack of tools for identifying inaccuracies and spreading this knowledge to other users has allowed inaccurate information to persist longer than it should. Providing methods, computer readable mediums, and systems for handling these tasks in a more efficient manner would be advantageous.

BRIEF SUMMARY OF THE INVENTION

An object of the invention is to provide users an annotation enabled web browser to annotate web pages and documents in such a way that users at another location on the Internet also using such an annotation enabled web browser can identify questions, interesting points, statements that agree, and statements that disagree without reading the text of the user annotation comment or the annotation highlighted text. Such a mechanism improves the efficiency with which a user sorts through vast quantities of information on the WWW.

A further object of the invention is to provide users an annotation enabled web browser to annotate pictures, videos, and sound recordings that are uploaded or embedded in web pages in such a way that users at another location on the Internet also using such an annotation enabled web browser can view these picture, video, and sound recording annotations.

Another object of the invention is to ensure that the document viewing context is modified in a minimal way after annotations are added in comparison to the document viewing context without the annotations. Using a document viewing context that is minimally modified allows users to consume content without being distracted by the annotations while simultaneously being able to find and make use of the annotations at appropriate times.

A further object of the invention is to present advertisements to users nonintrusively. One goal is to show advertisement contents to users after these users initiate an action triggered by curiosity, wherein the curiosity is triggered by the presentation of the advertisement in a certain location or context within a web page. This location or context suggests the advertisement might be relevant to the users' current needs. Furthermore, the presented ad without its contents may contain some aspects of the full advertisement, but the full details are not displayed until the user initiates an action triggered by curiosity that is instilled by contextual methods that selectively and transparently target the user based on the user's current needs.

Another object of the invention is to provide a separate annotation viewing context area that is separate from the world wide web document viewing context area. This annotation viewing context area has a mechanism in addition to search and filtering that presents annotations to users in such a way that users can understand the site of origin for familiar sites and the approximate location of the annotation. Furthermore, other elements of the context of the annotation or highlighted text may become clear without having to read the highlighted text or user annotation comment. This mechanism makes finding a specific annotation from amongst a large number of other annotations an easier task.

A further object of the invention is to provide an annotation organization context area that allows users to scan and organize the annotations into meaningful groupings. An advantage of this object is that it allows users to focus on creating annotations first and focus on organizing them after the annotations have been created. Furthermore, default organizations of the annotations do not need to be undone.

Another object of the invention is to provide users an annotation viewing context area that allows the user to view pages of annotations, keep some annotations available for later review, and continue to search for other annotations. Furthermore, the method facilitates mental tracking by keeping the annotations in visual view while moving the annotations not of interest out of visual view.

An additional object of the invention is to transparently convey privacy settings to users at all times. Conveying privacy settings will avoid the accidental sharing of information a user does not want to share.

A further object of the invention is a way to create guided tours through a series of websites on the global Internet while drawing the users' attention to the salient points of interest on each site. This object further includes ways to modify the tour and present the tour to users.

Another object of the invention is to provide a way for groups to manage access control permissions and to communicate through messaging.

BRIEF DESCRIPTION OF THE SEVERAL VIEWS OF THE DRAWING

For a more complete understanding of the invention, reference is made to the following description and accompanying drawings, in which:

FIG. 21 presents a flow chart showing how the nurse using this exemplary embodiment creates a notepad about glycemic index to share with a patient;

FIG. 34 presents an exemplary embodiment of the inbox page after user responds to the system message and other users also send messages;

FIG. 38 shows the picture annotation group creation interface with two annotation group list items added to the candidate annotation group list;

FIG. 39 shows the picture annotation group creation interface with one annotation group list item added to the candidate annotation group list with a second colliding picture annotation not added to the candidate annotation group list;

BRIEF DESCRIPTION OF THE SEVERAL PARTIAL VIEWS OF THE DRAWING

Figure 19:
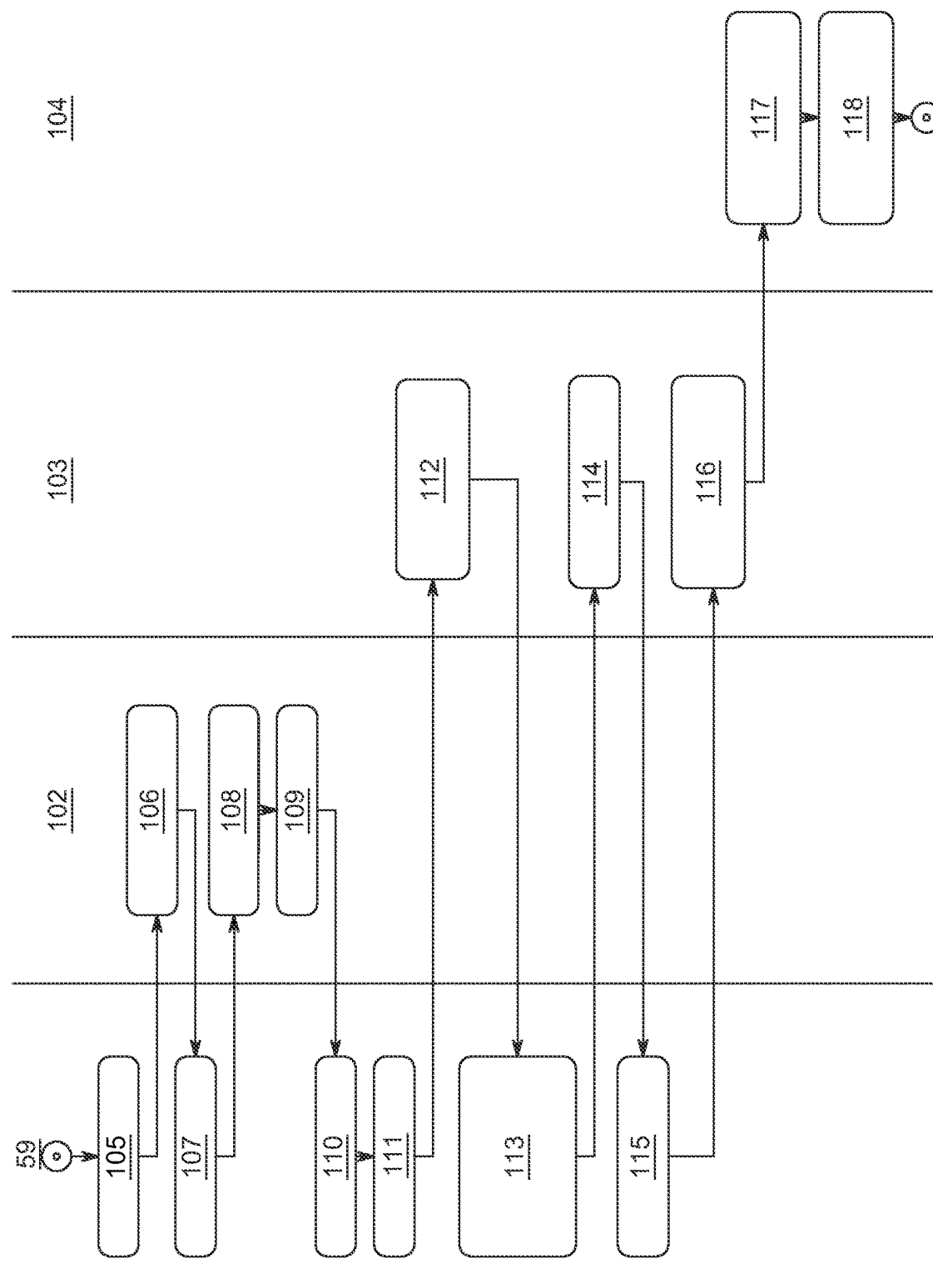
FIG. 19 presents a flow chart showing how the user, web browser, web browser extension content script, and web browser extension background script interact, allowing a user to view a web page and create an annotation on the page.
Figure 19A:
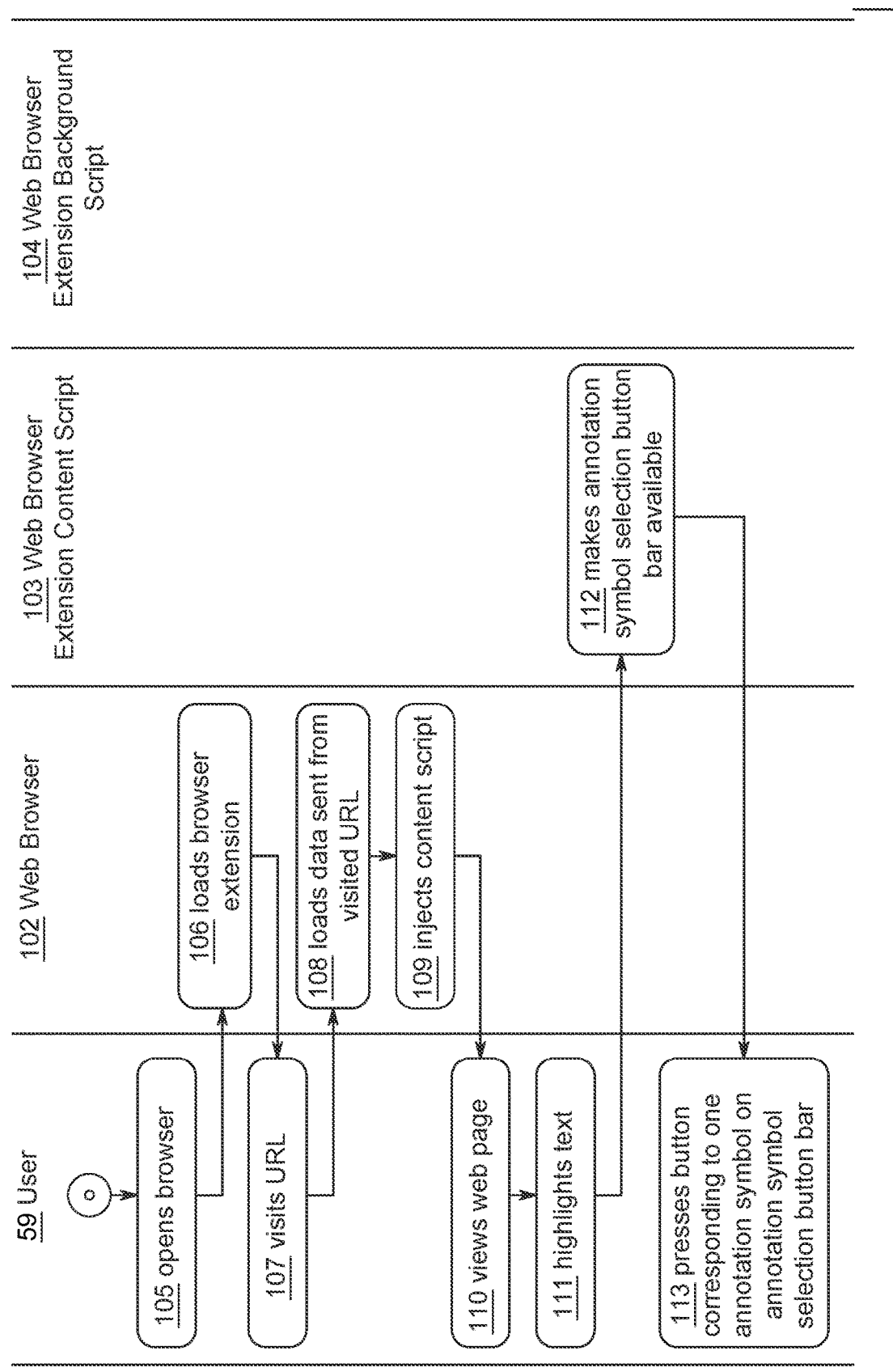
Figure 19B:
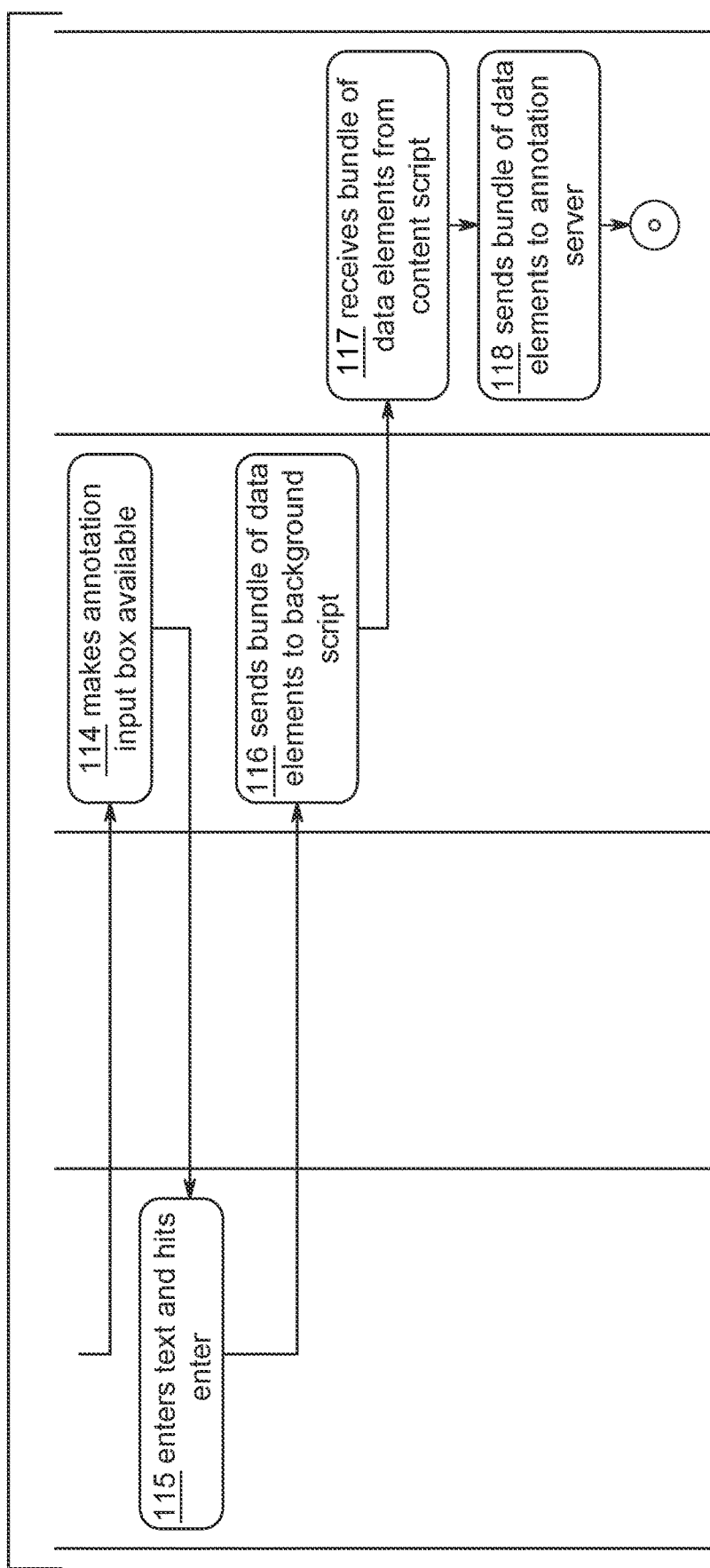
Figure 20:
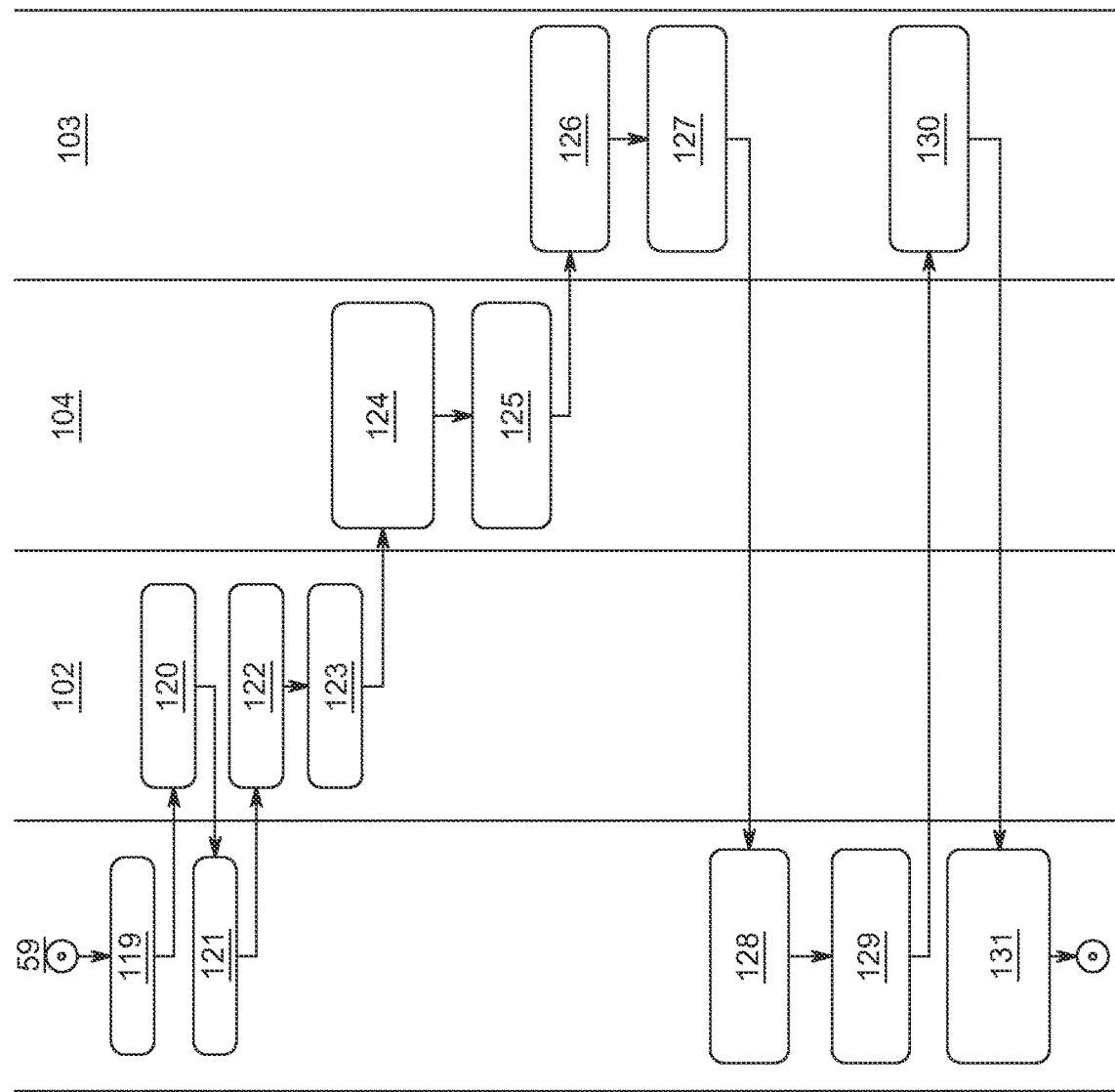
FIG. 20 presents a flow chart showing how the user, web browser, web browser extension background script, and web browser extension content script interact, allowing a user to view a web page with annotations on the page.
Figure 20A:
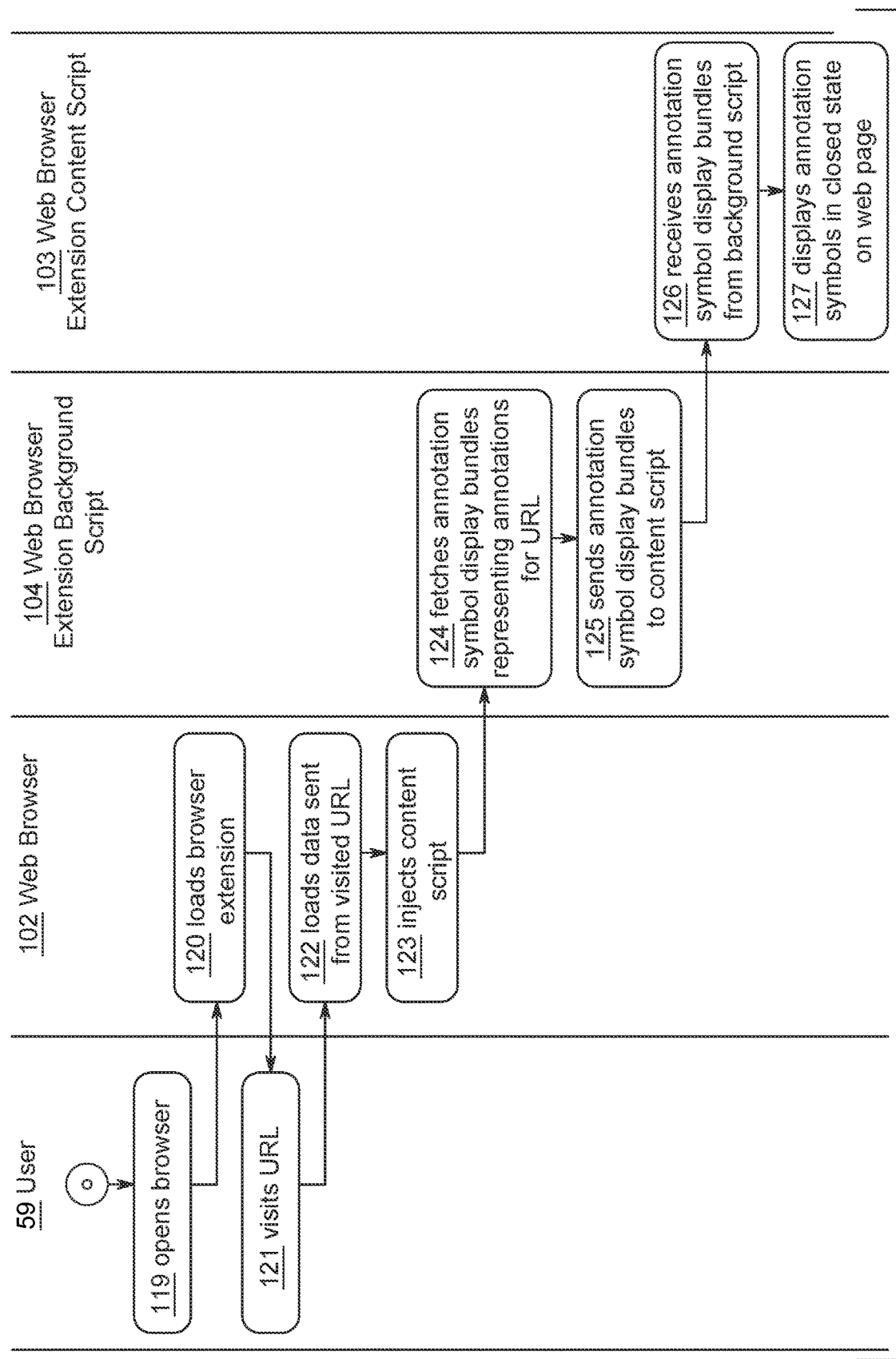
Figure 20B:
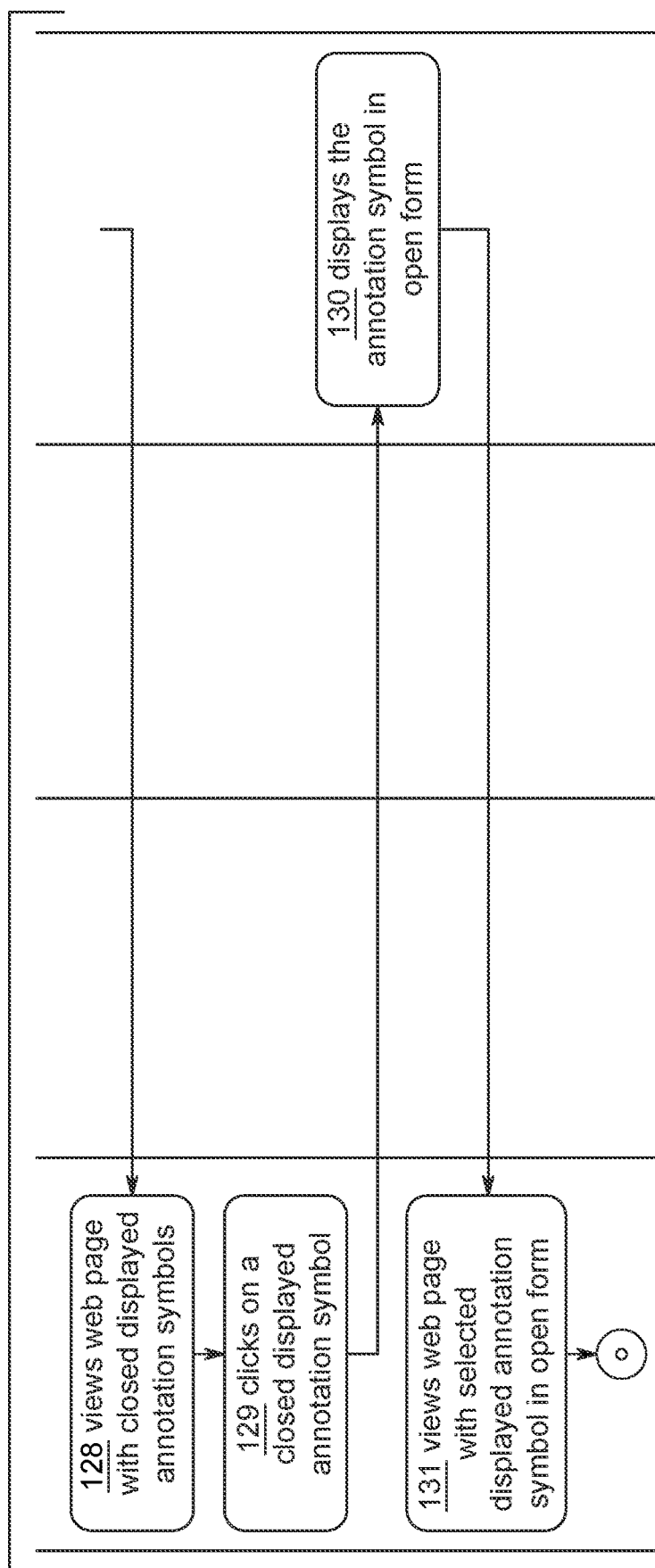
Figure 22:
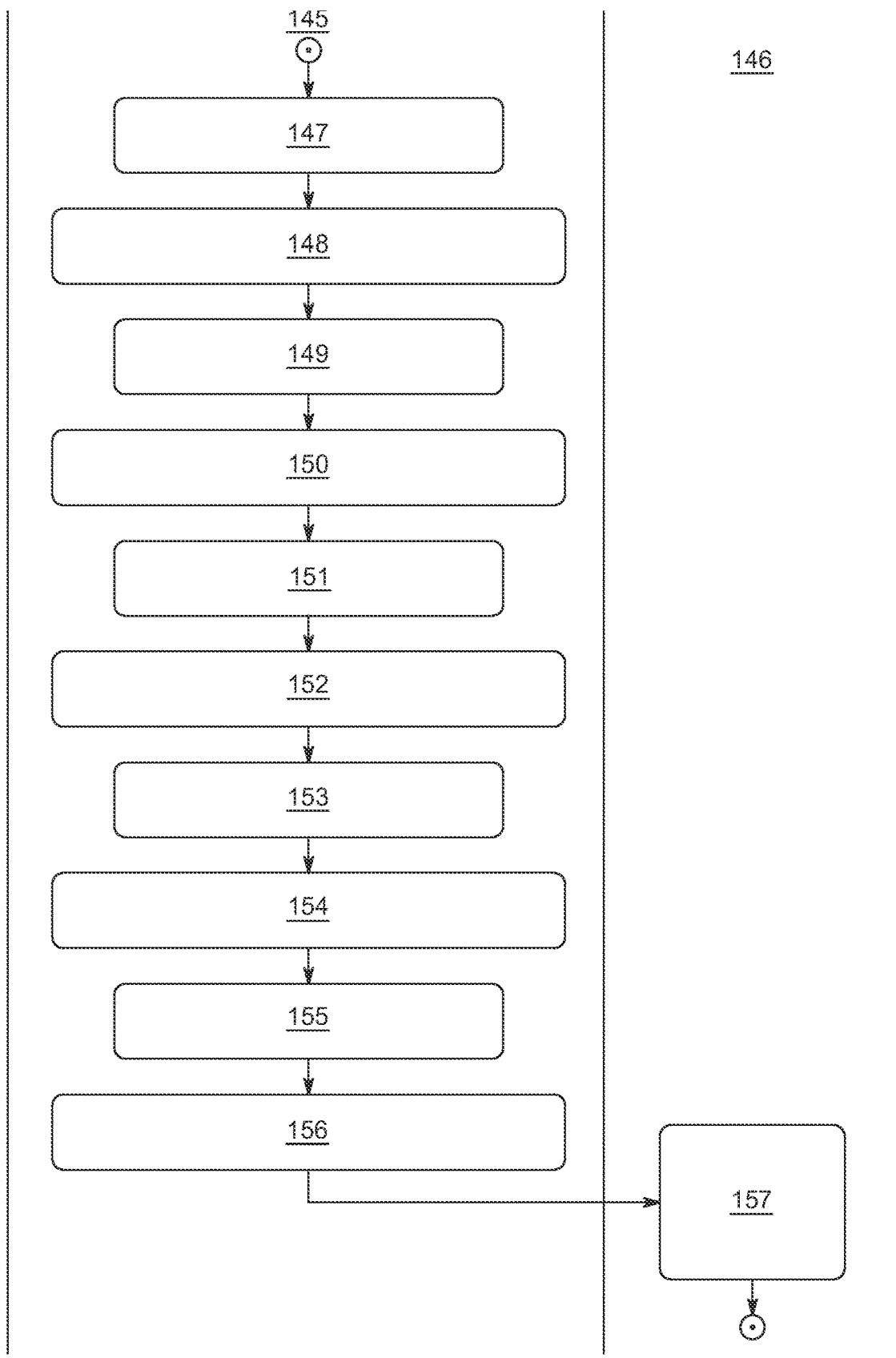
FIG. 22 presents a flow chart showing how the patient uses the notepad provided by the nurse.
Figure 22A:
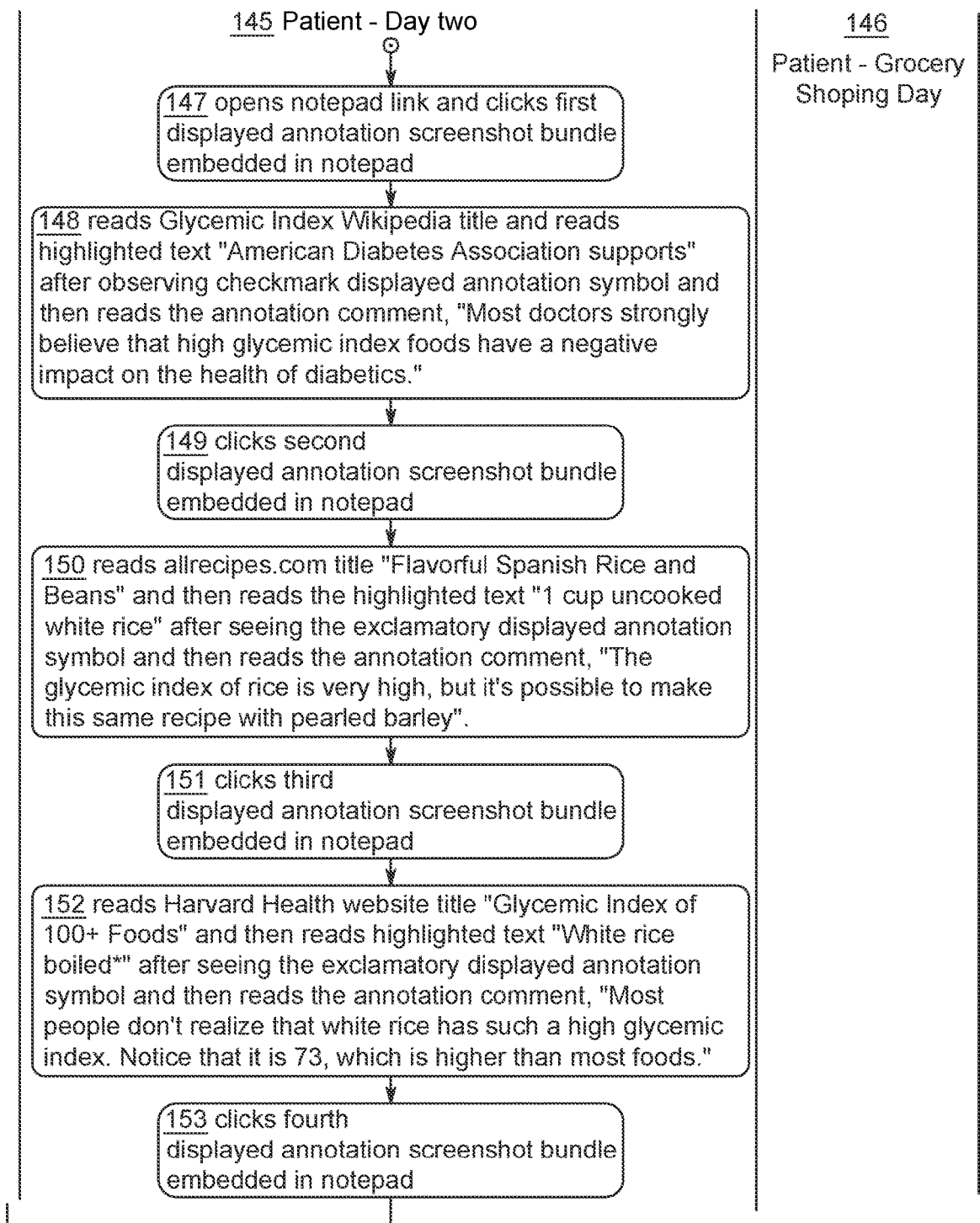
Figure 22B:
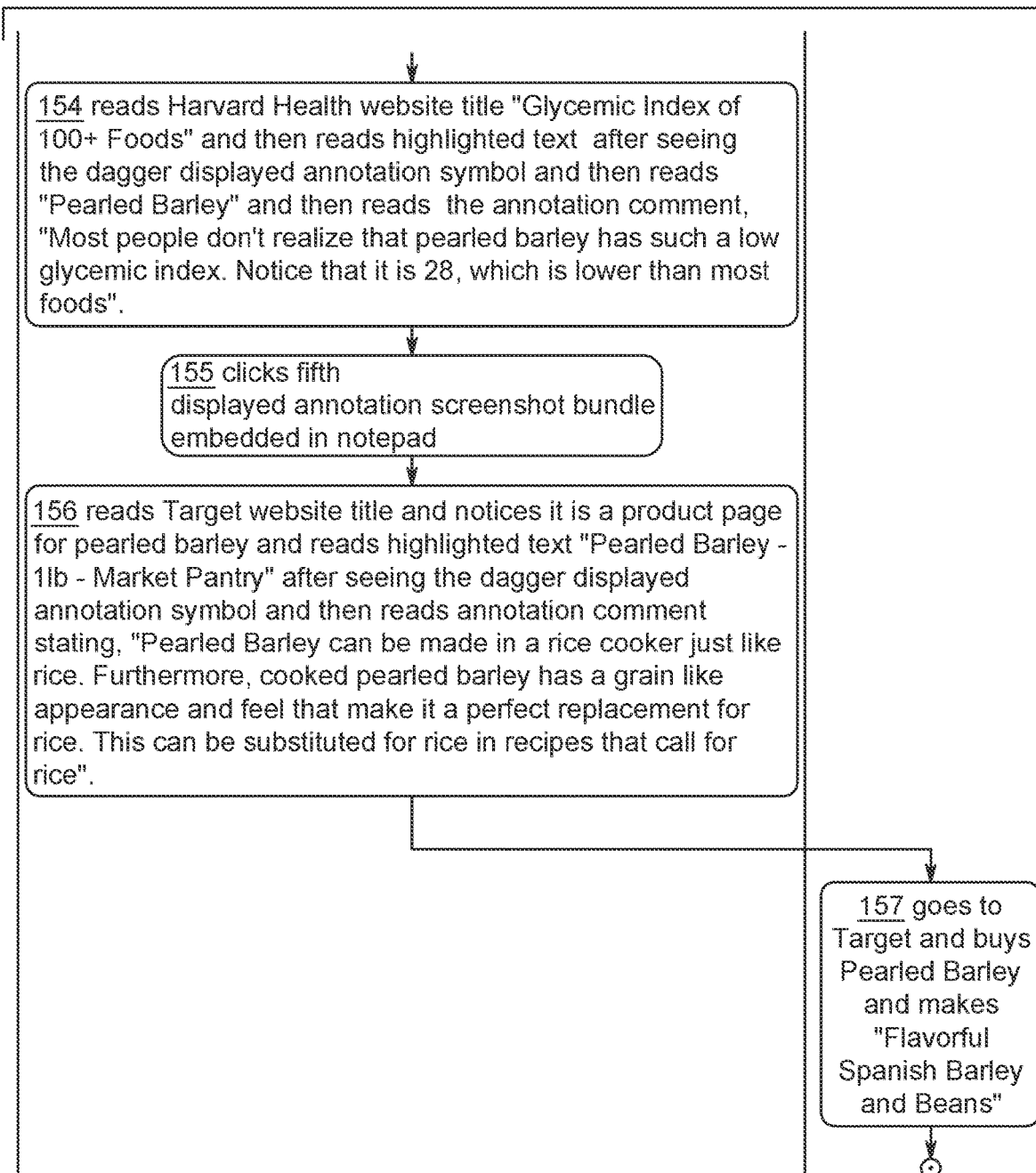
Figure 24:
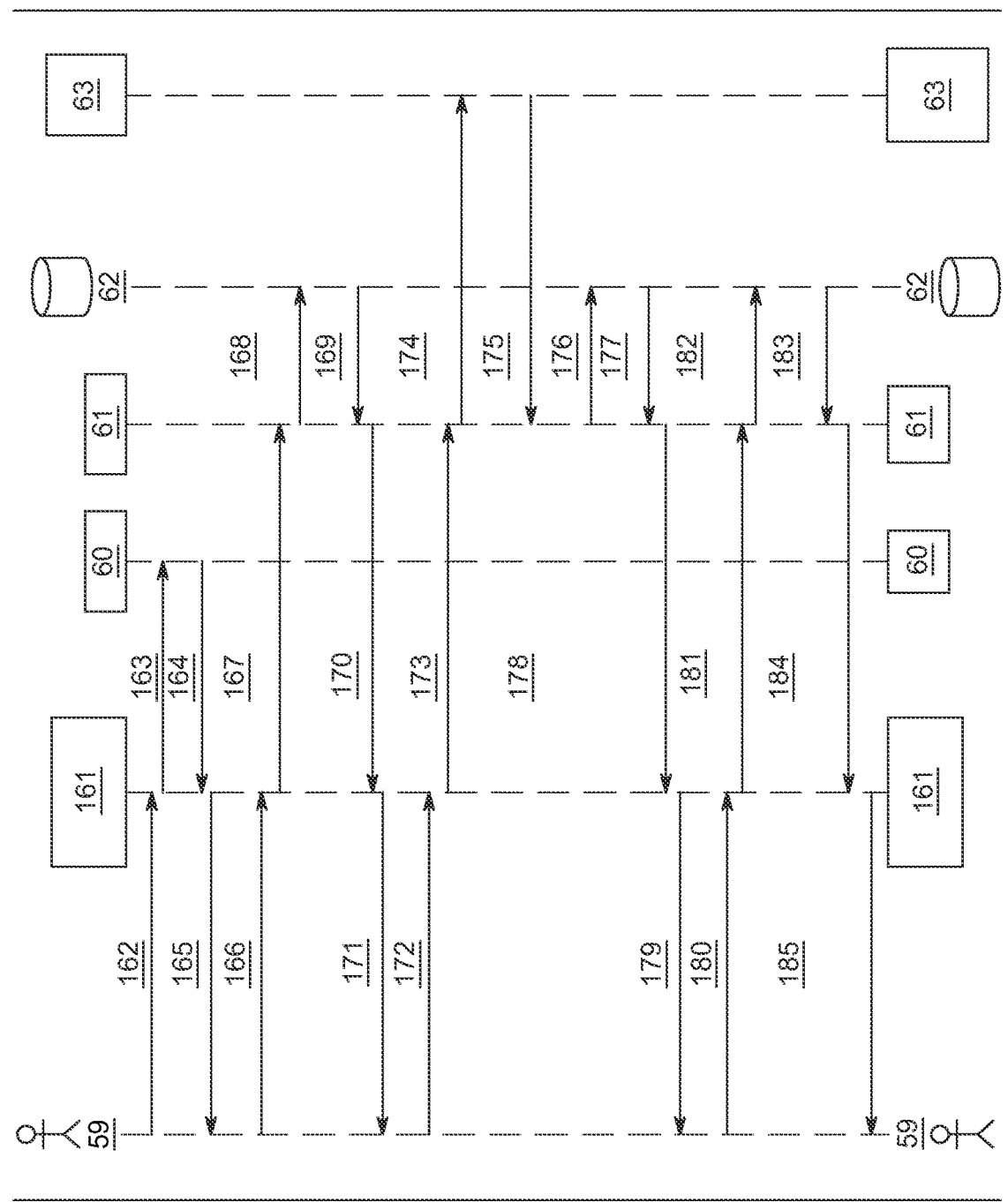
FIG. 24 presents a sequence diagram of a notepad being created and one annotation being created and added to the notepad.
Figure 24A:
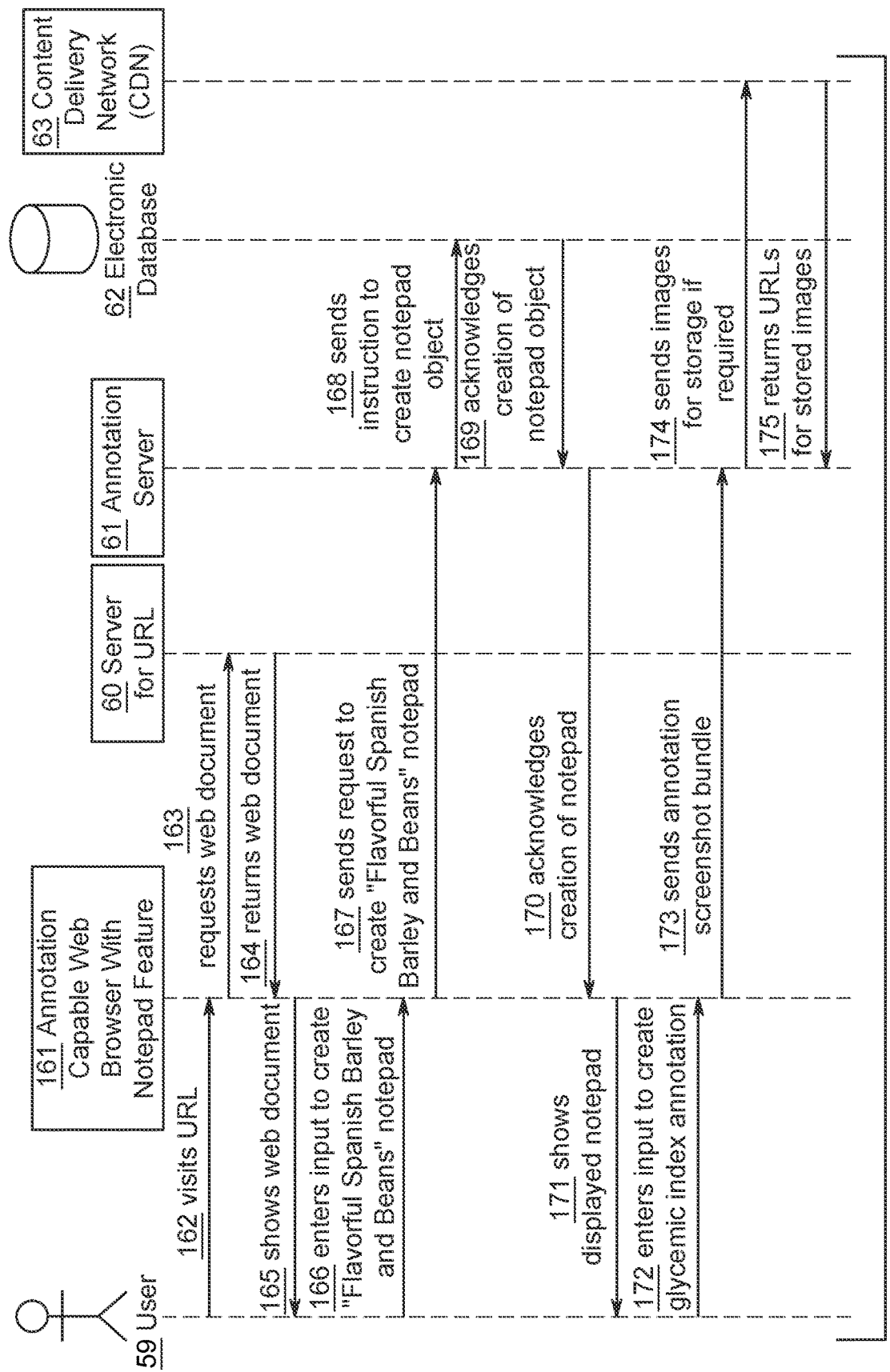
Figure 24B:
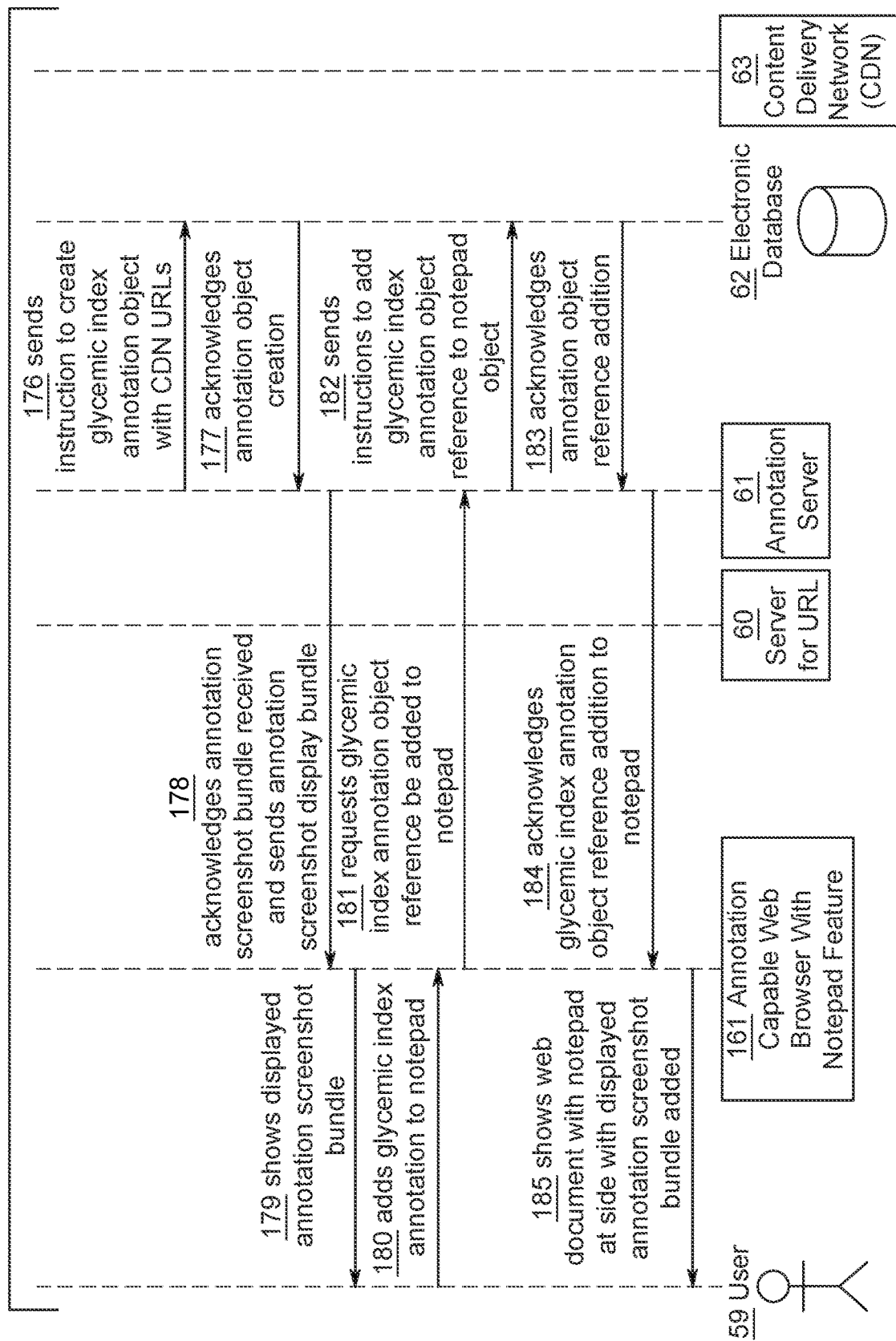
Figure 25:
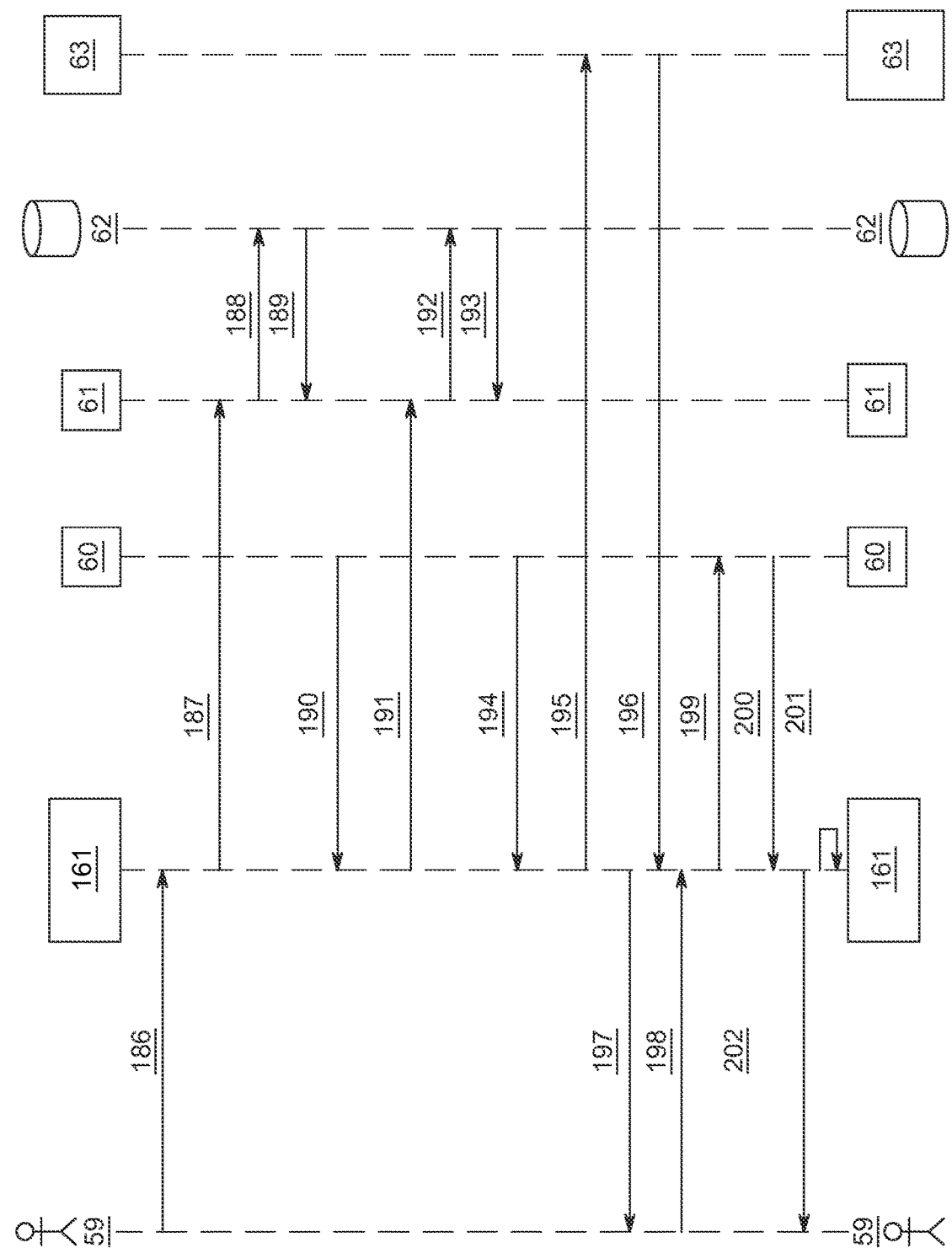
FIG. 25 presents a sequence diagram of a notepad being viewed, the first annotation being clicked, and a browser navigating to that URL and displaying the annotation after scrolling to the appropriate location.
Figure 25A:
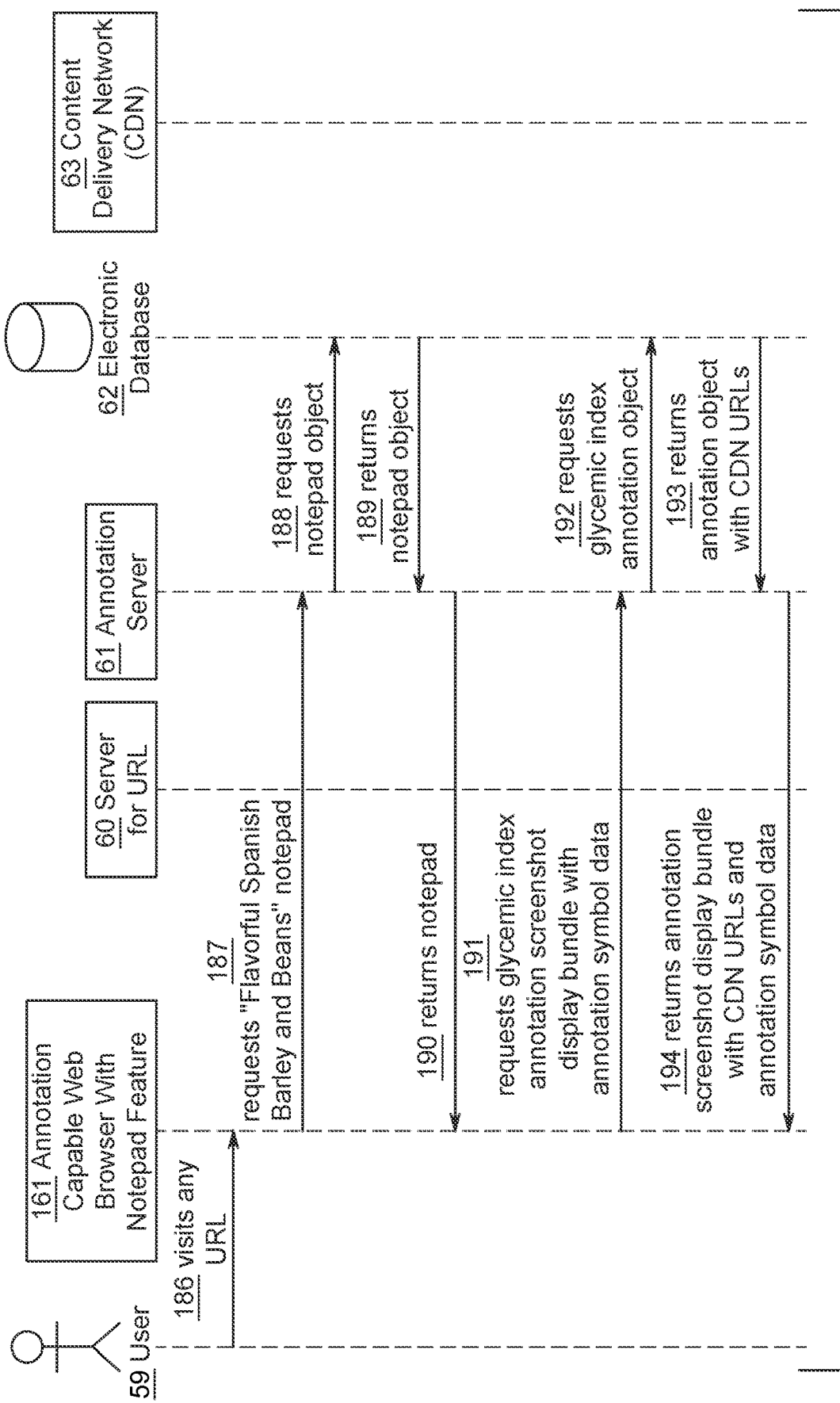
Figure 26:
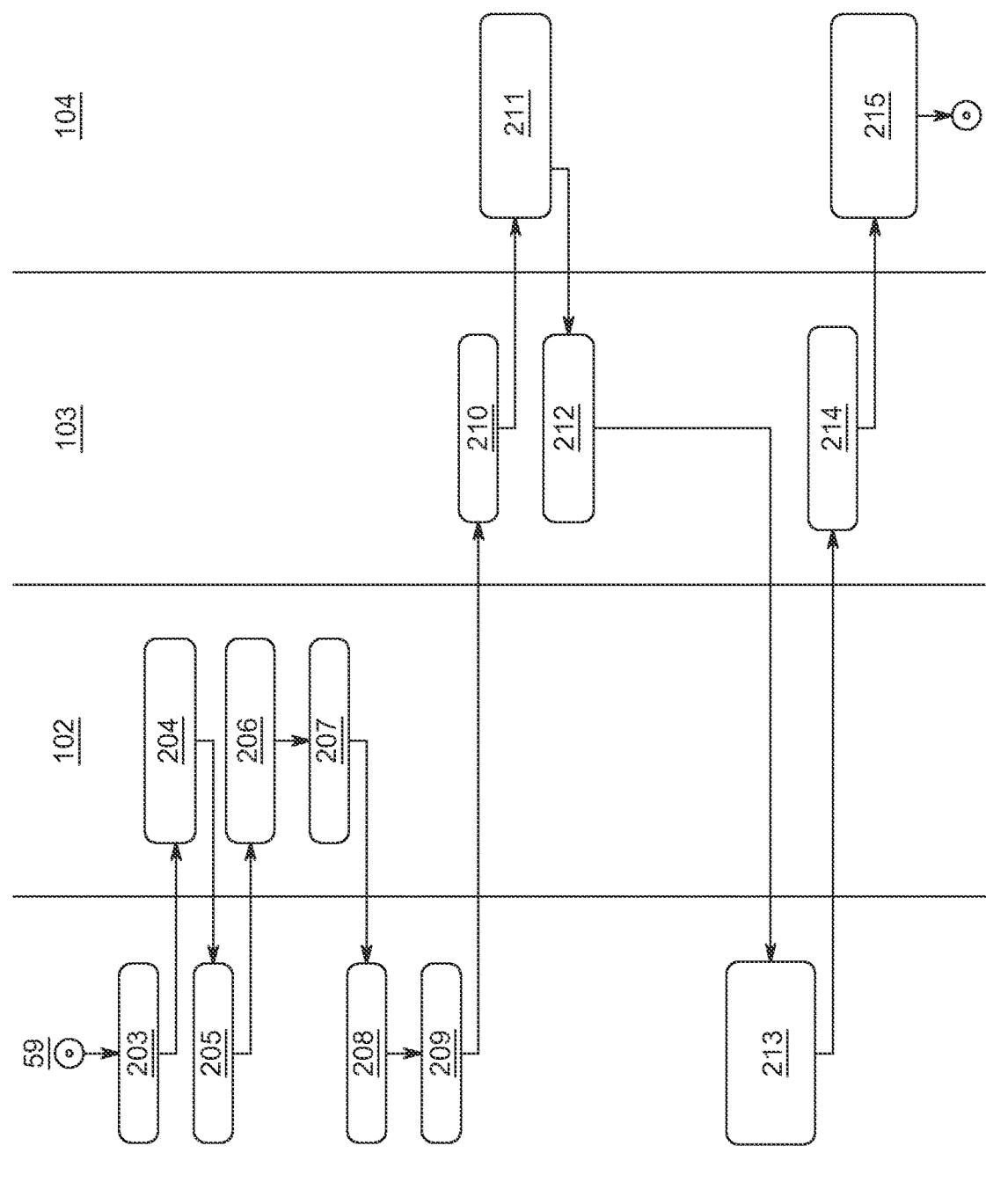
FIG. 26 presents a flowchart showing a notepad being created and an already created annotation being added to the notepad.
Figure 26A:
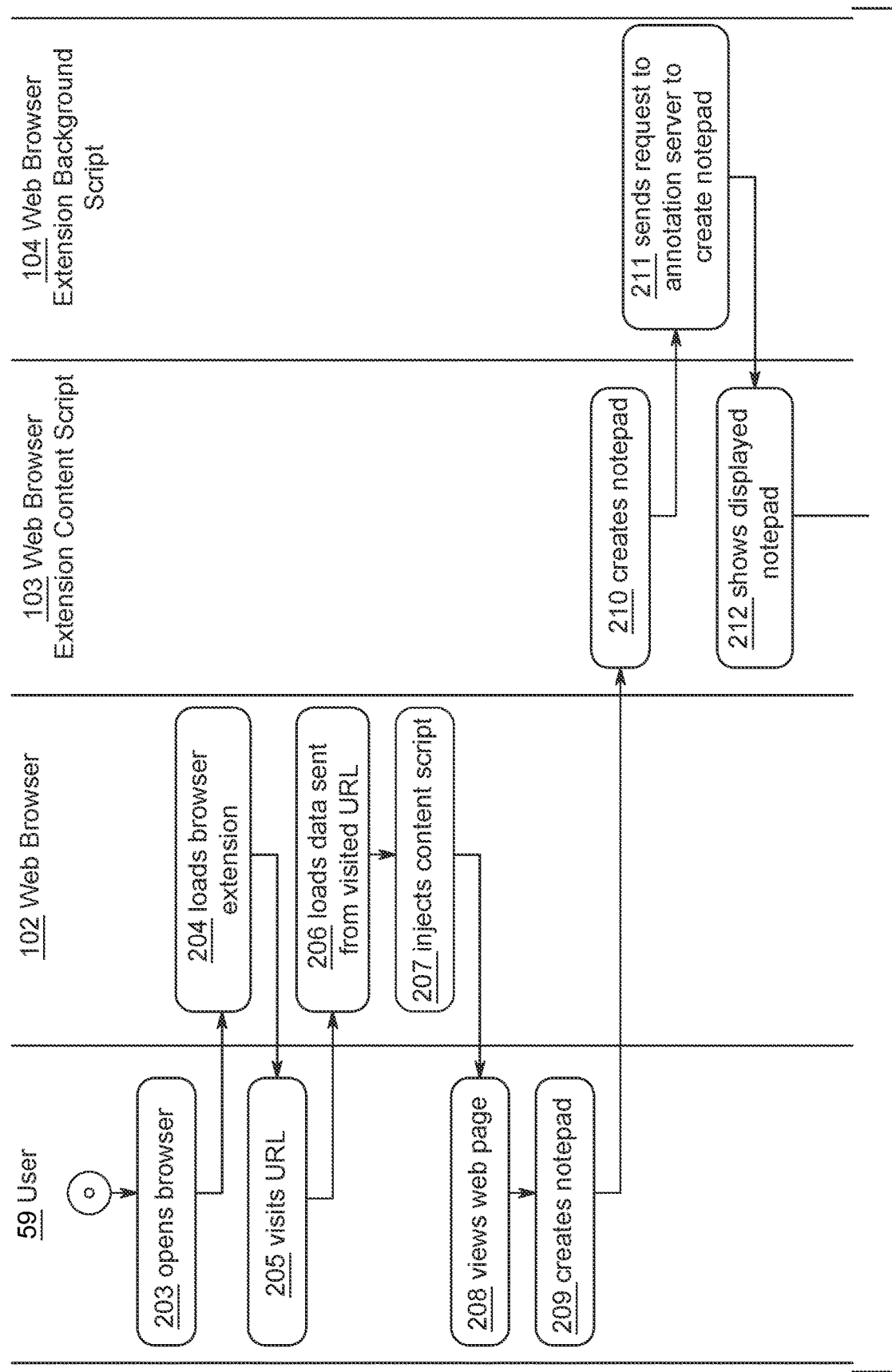
Figure 26B:
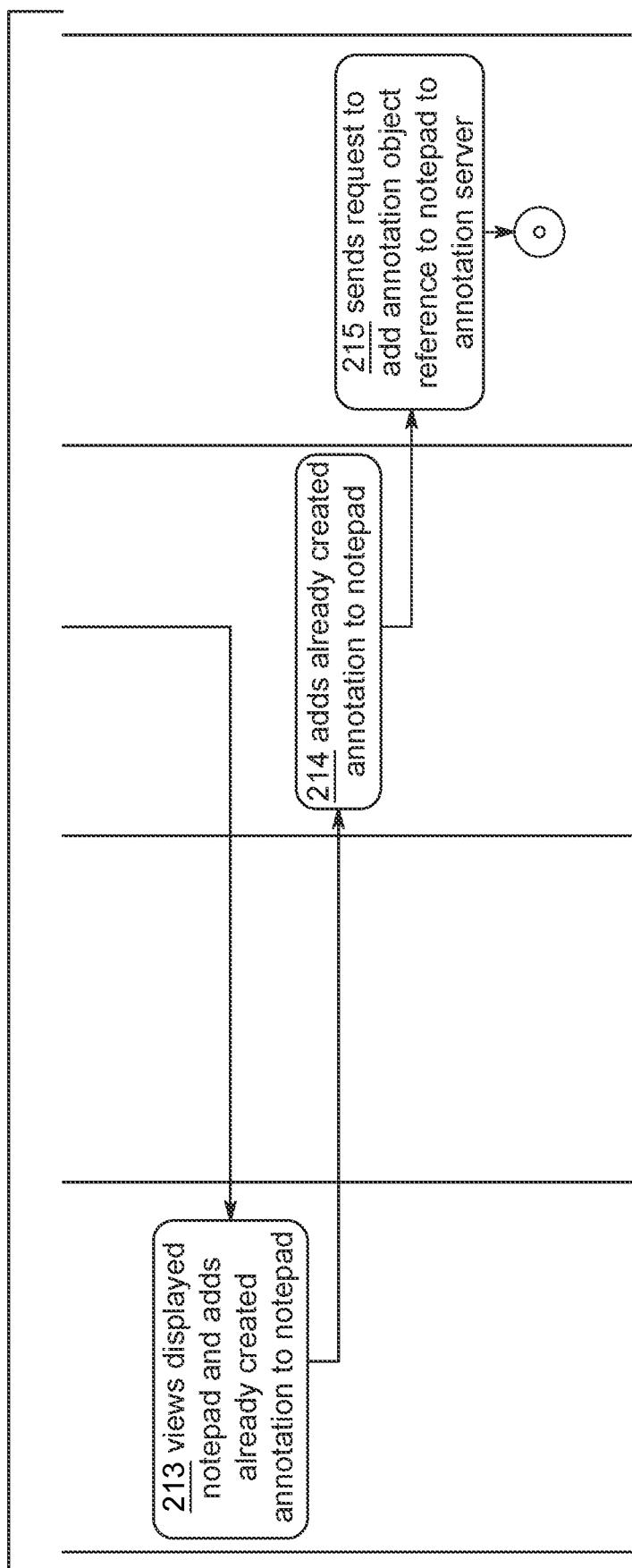
Figure 27:
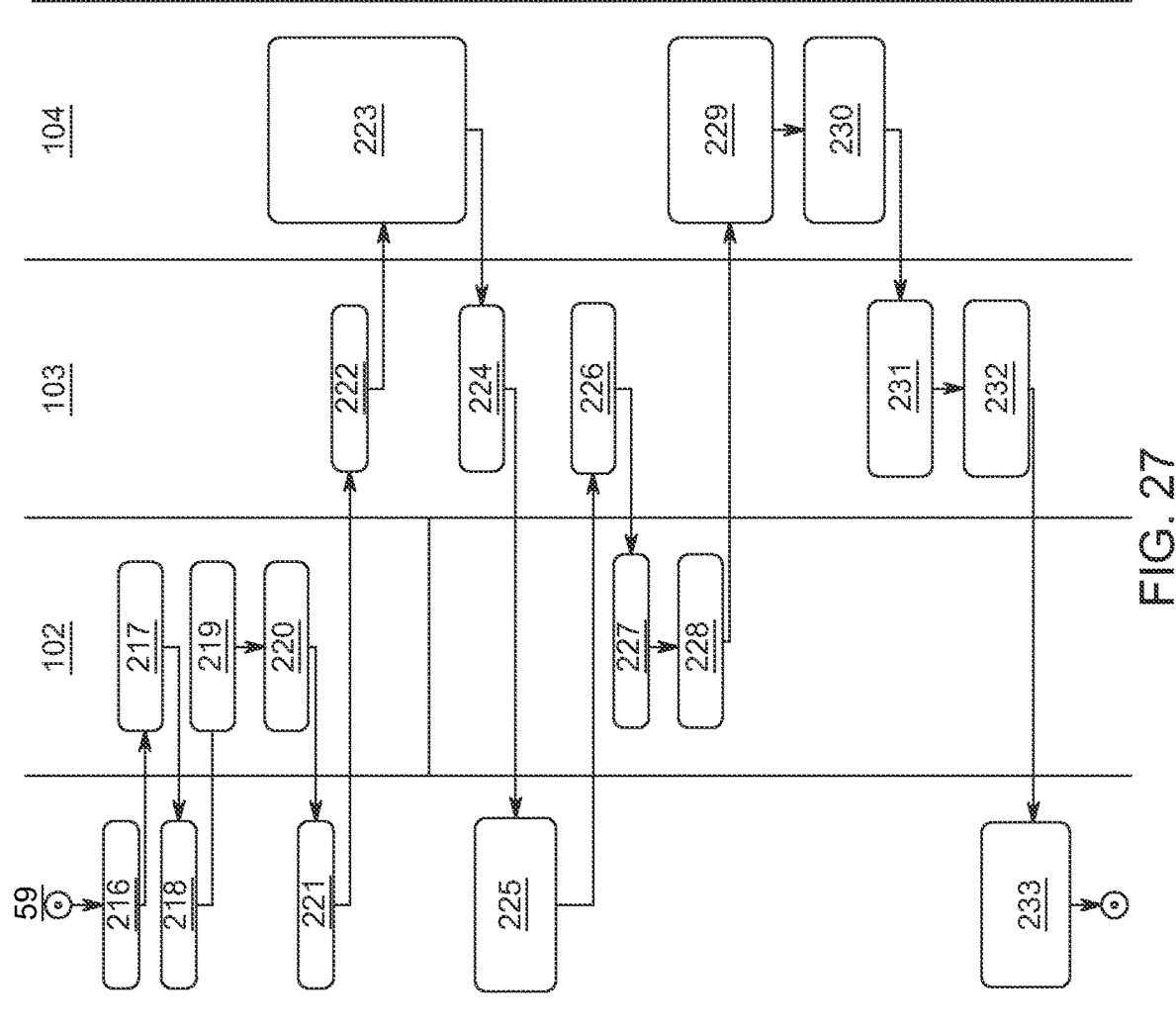
FIG. 27 presents a flowchart showing a notepad being viewed and the annotation in the notepad being opened.
Figure 27A:
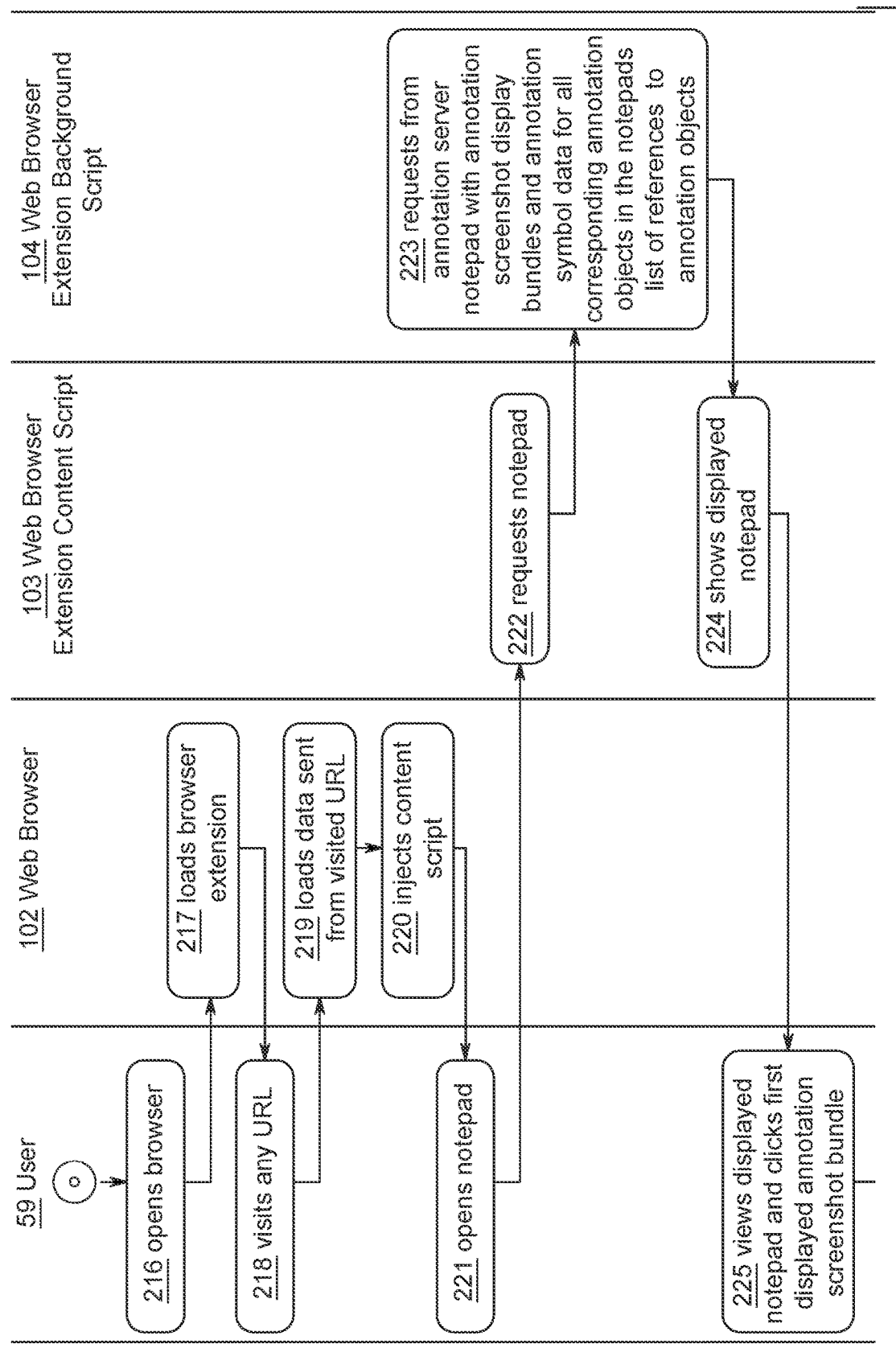
Figure 27B:
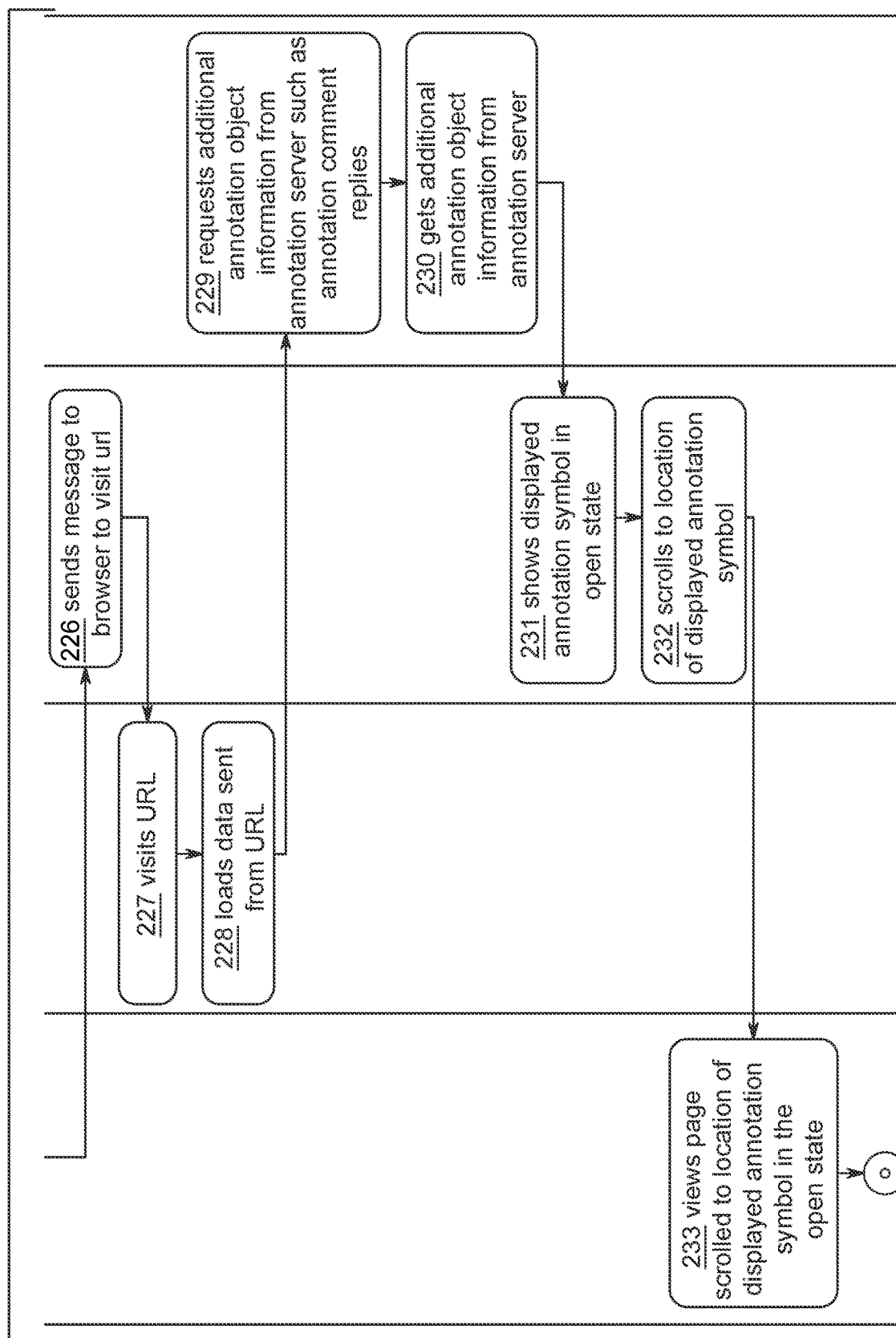
Figure 31:
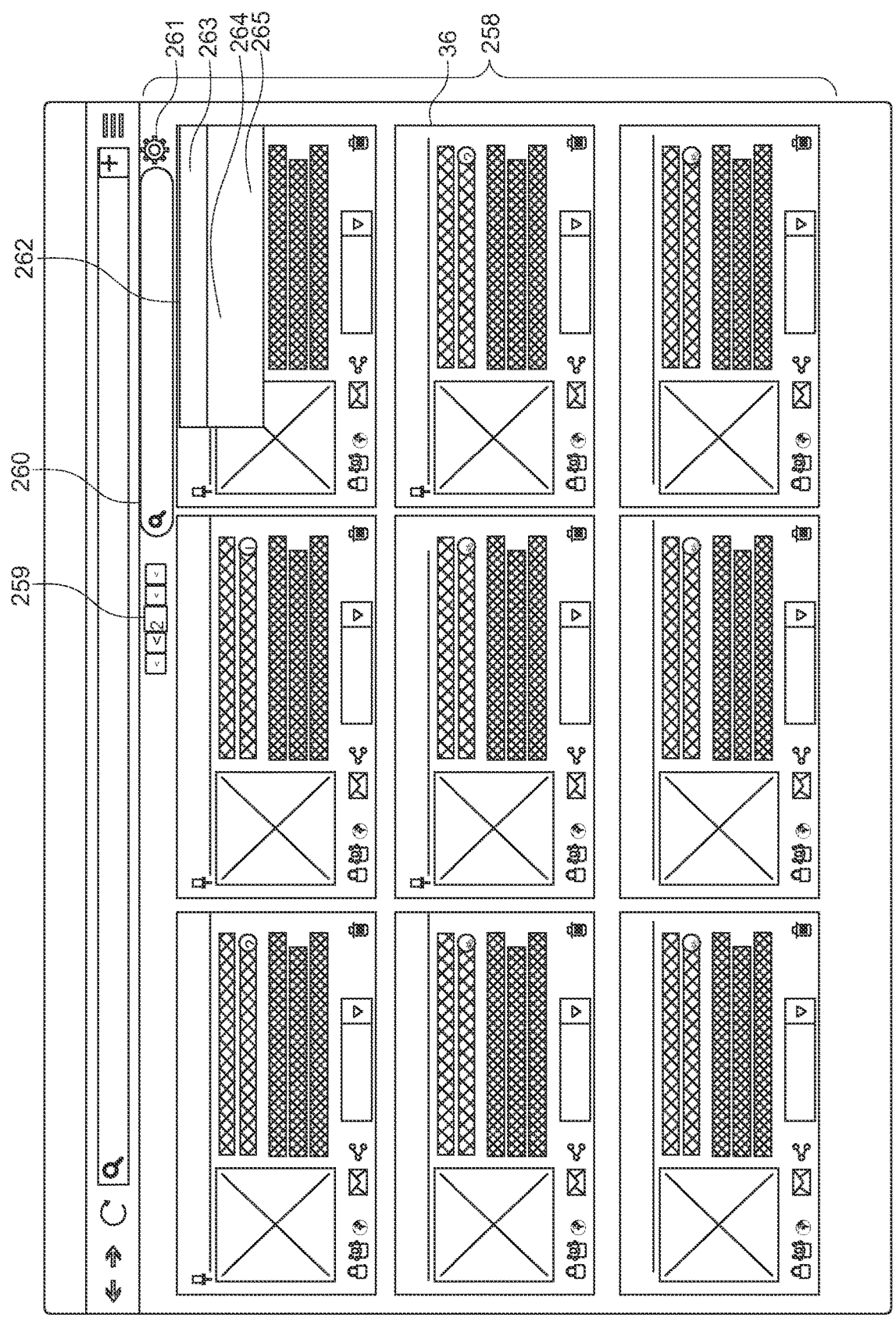
FIG. 31 presents an exemplary embodiment of a collection items page for the US History collection.
Figure 31A:
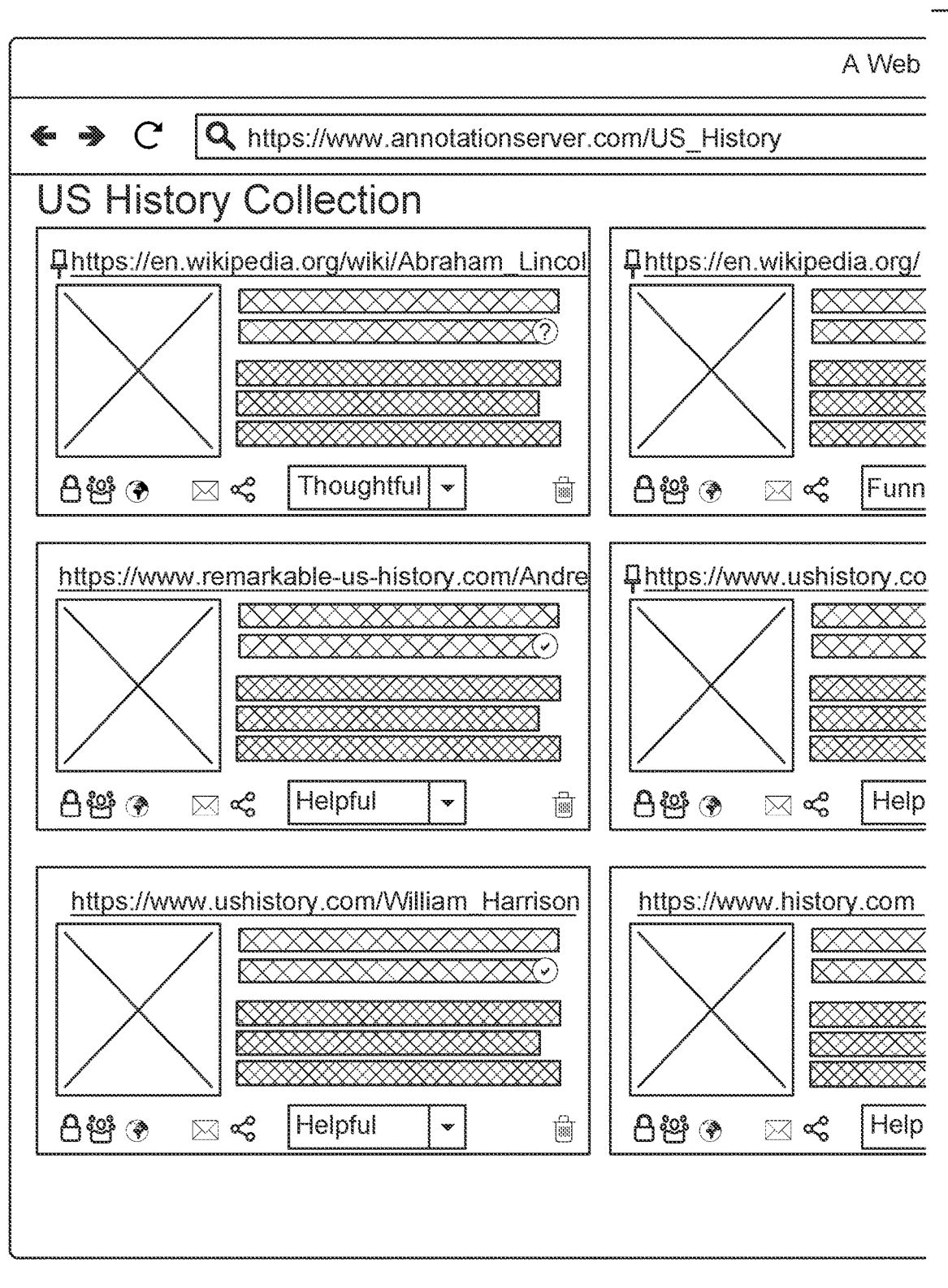
Figure 31B:
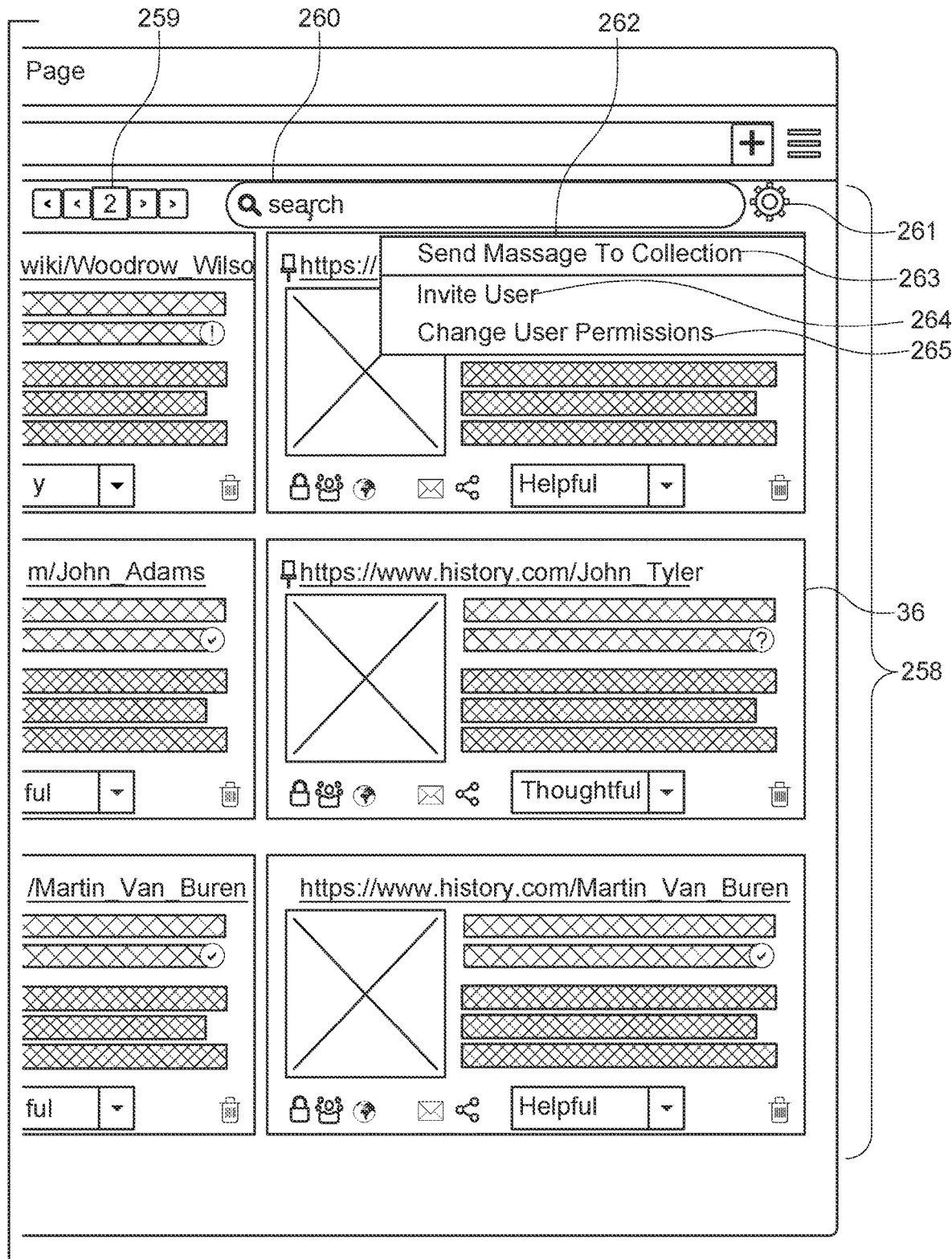
Figure 32:
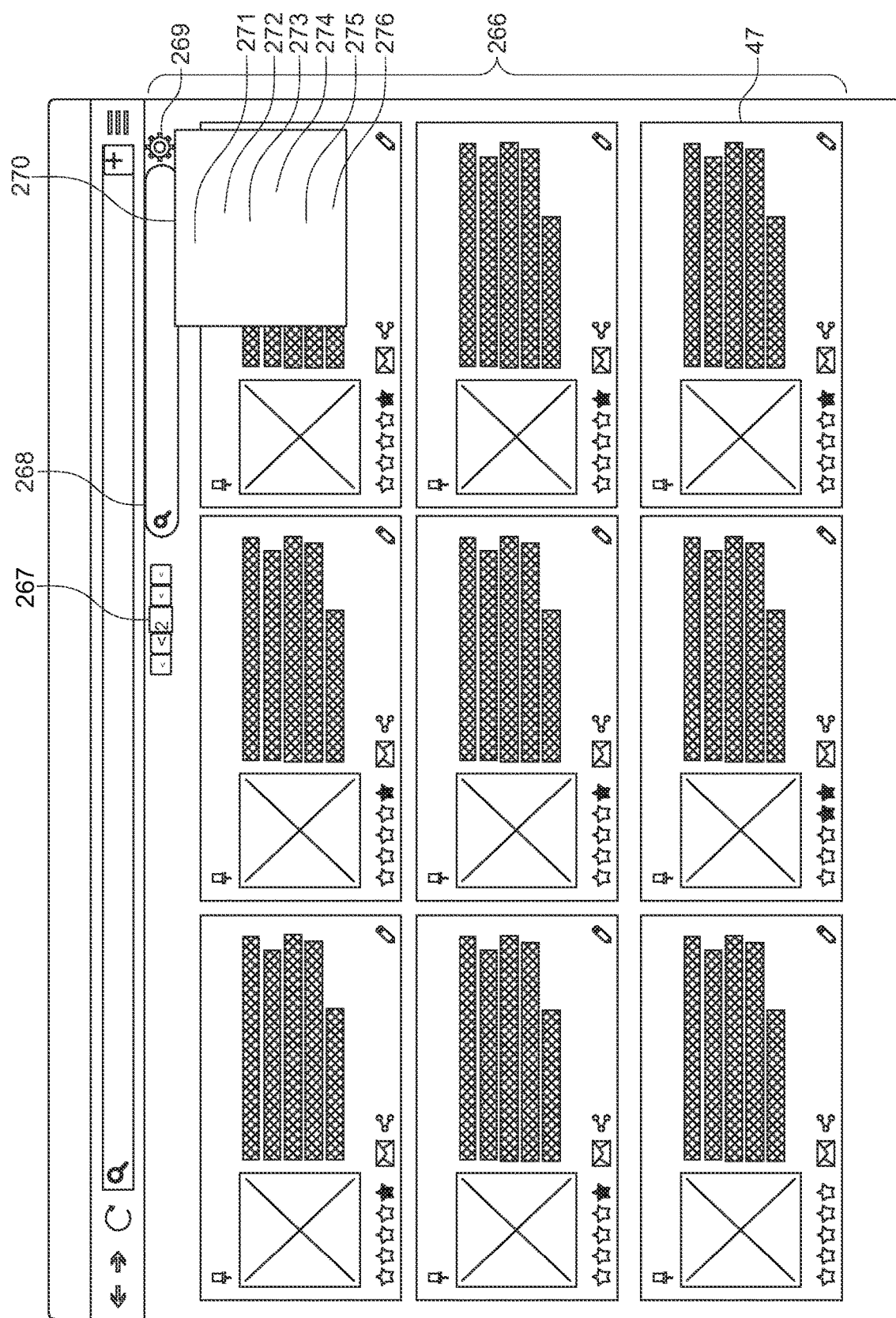
FIG. 32 presents an exemplary embodiment of the collections page.

For a more complete understanding of the invention, reference is made to the following description and accompanying drawings, in which:

FIG. 19A presents a partial view of the top portion of FIG. 19;

FIG. 19B presents a partial view of the bottom portion of FIG. 19;

FIG. 20A presents a partial view of the top portion of FIG. 20;

FIG. 20B presents a partial view of the bottom portion of FIG. 20;

FIG. 22A presents a partial view of the top portion of FIG. 22;

FIG. 22B presents a partial view of the bottom portion of FIG. 22;

FIG. 24A presents a partial view of the top portion of FIG. 24;

FIG. 24B presents a partial view of the bottom portion of FIG. 24;

FIG. 25A presents a partial view of the top portion of FIG. 25;

FIG. 25B presents a partial view of the bottom portion of FIG. 25;

FIG. 26A presents a partial view of the top portion of FIG. 26;

FIG. 26B presents a partial view of the bottom portion of FIG. 26;

FIG. 27A presents a partial view of the top portion of FIG. 27;

FIG. 27B presents a partial view of the bottom portion of FIG. 27;

FIG. 31A presents a partial view of the left portion of FIG. 31;

FIG. 31B presents a partial view of the right portion of FIG. 31;

Figure 32A:
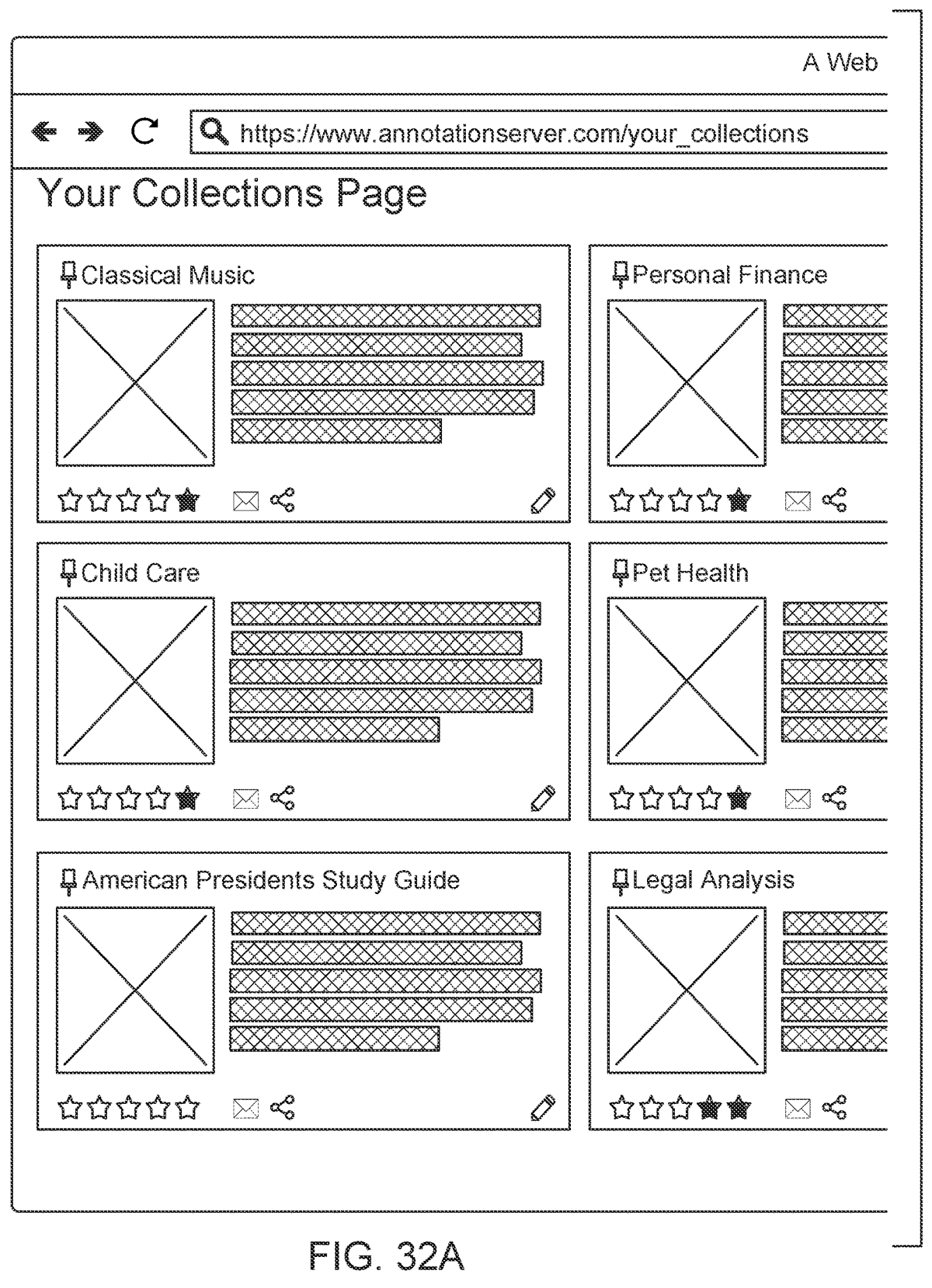

FIG. 32A presents a partial view of the left portion of FIG. 32; and

Figure 32B:
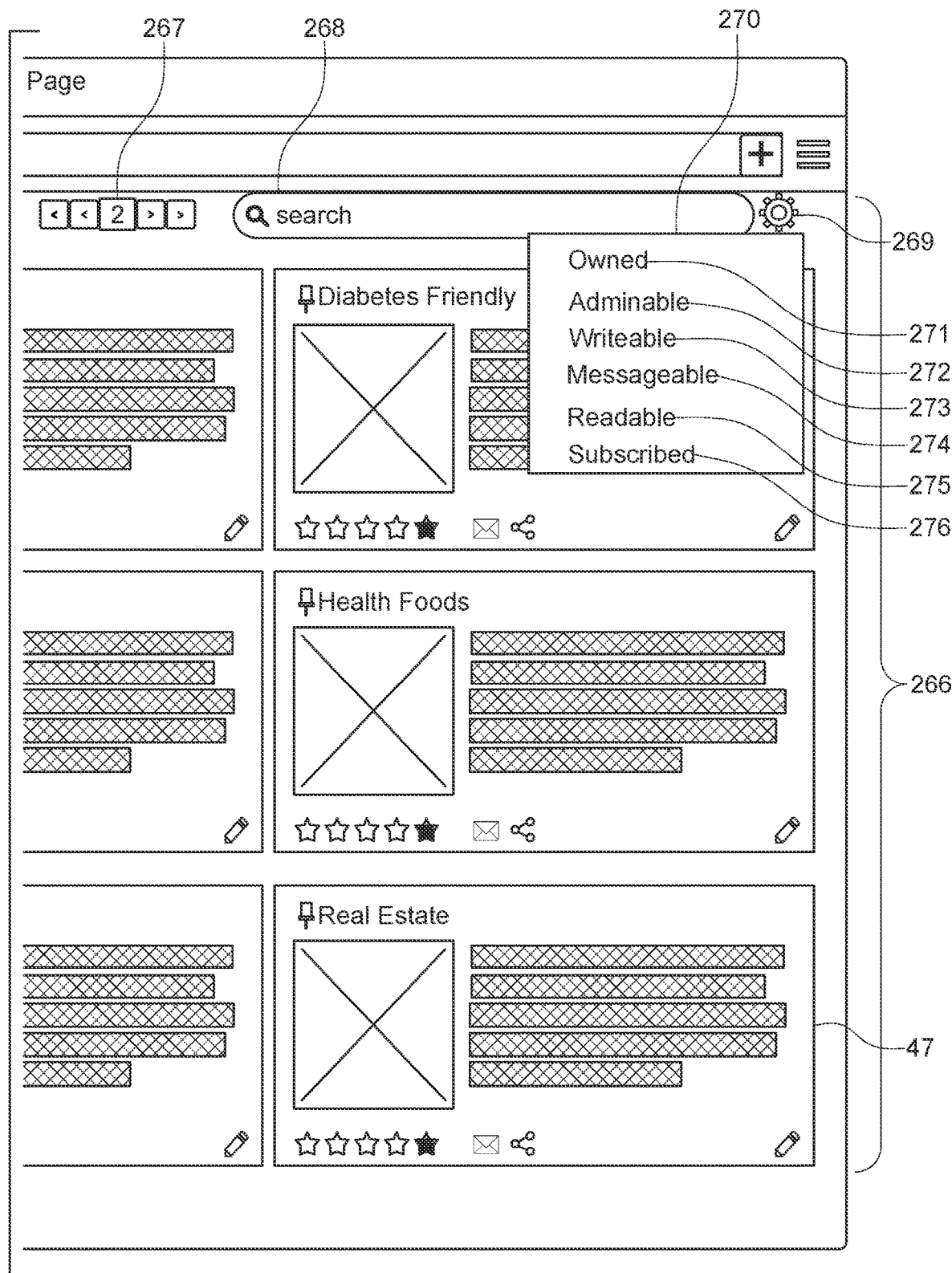

FIG. 32B presents a partial view of the right portion of FIG. 32.

DETAILED DESCRIPTION OF THE INVENTION

Methods, non-transitory computer readable mediums (CRMs), and systems are provided for annotating web pages, documents, pictures, videos, and sound recordings within web browsers; organizing these annotations; viewing these annotations; and connecting these annotations into useful digital notepads that include a set of annotations. A web document has a URL and includes web pages, pdf documents, and other document types displayed in web browsers. Furthermore, these methods, non-transitory CRMs, and systems provide facilities for curating content, sharing content with other users, and managing access controls. The descriptions contain flow charts showing a user's rationale for using the systems and non-transitory CRMs herein. In addition, graphical user interface (GUI) diagrams show the end result of computer readable medium instructions and what systems display. Furthermore, sequence diagrams show the interaction and data flow between various components, and flowcharts describe methods. In addition, swimlanes show the actions of various components.

An annotation is an explanatory note, comment, or drawing added to a text, diagram, picture, document, video, or sound recording. When describing methods, nontransitory CRMs, and systems; terminology is introduced to describe annotations within different contexts along with the data elements and structures to represent annotations and objects that add to the context of annotations within web pages, web documents, documents, pictures, videos, and sound recordings as well as within separate context areas.

Figure 1:
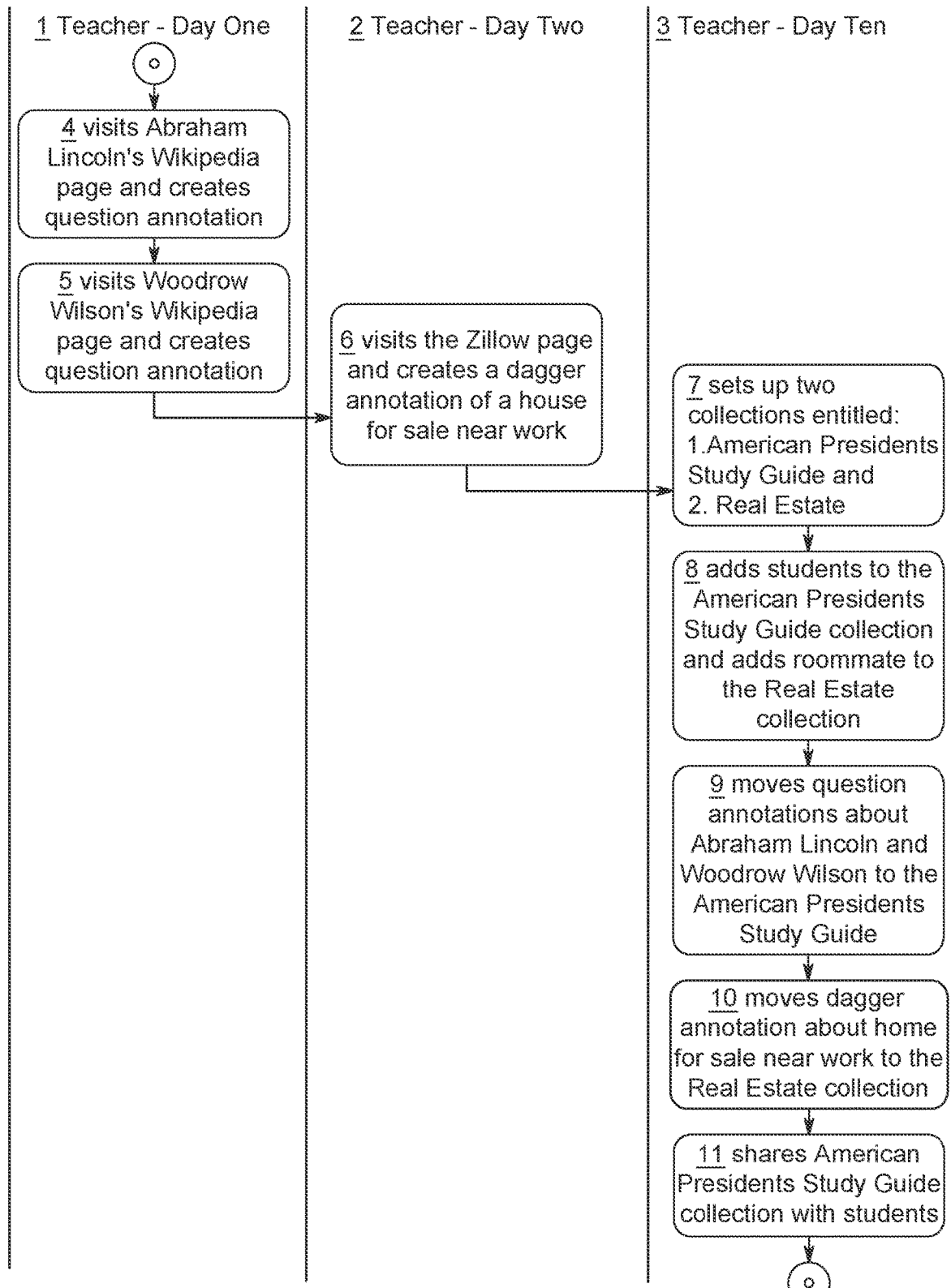
FIG. 1 shows a flow chart of annotations being created, moved to two different collections, and shared with others via the collections.

In FIG. 1, a flowchart of a teacher using an exemplary embodiment of an annotation capable web browser is shown. The teacher has two separate goals. The first goal is to create a list of study questions about presidents for students in the teacher's class. The teacher's class is small, and students can see each other's responses in this example within the exemplary embodiment depicted. The second goal is to find a home for sale near the school where the teacher teaches. As shown in FIG. 1, the teacher on day one [1] visits Abraham Lincoln's Wikipedia page and creates question annotation [4] and then visits Woodrow Wilson's Wikipedia page and creates question annotation [5]. As shown in FIG. 1, the teacher on day two [2] visits the Zillow page and creates a dagger annotation of a house for sale near work [6]. As shown in FIG. 1, the teacher on day ten [3] sets up two collections entitled American Presidents Study Guide and Real Estate [7], adds students to the American Presidents Study Guide collection, and adds roommate to the Real Estate collection [8], moves question annotations about Abraham Lincoln and Woodrow Wilson to the American Presidents study guide [9], moves dagger annotations about home for sale near work to the Real Estate collection [10], and shares American Presidents Study Guide collection with students [11].

Figure 2:
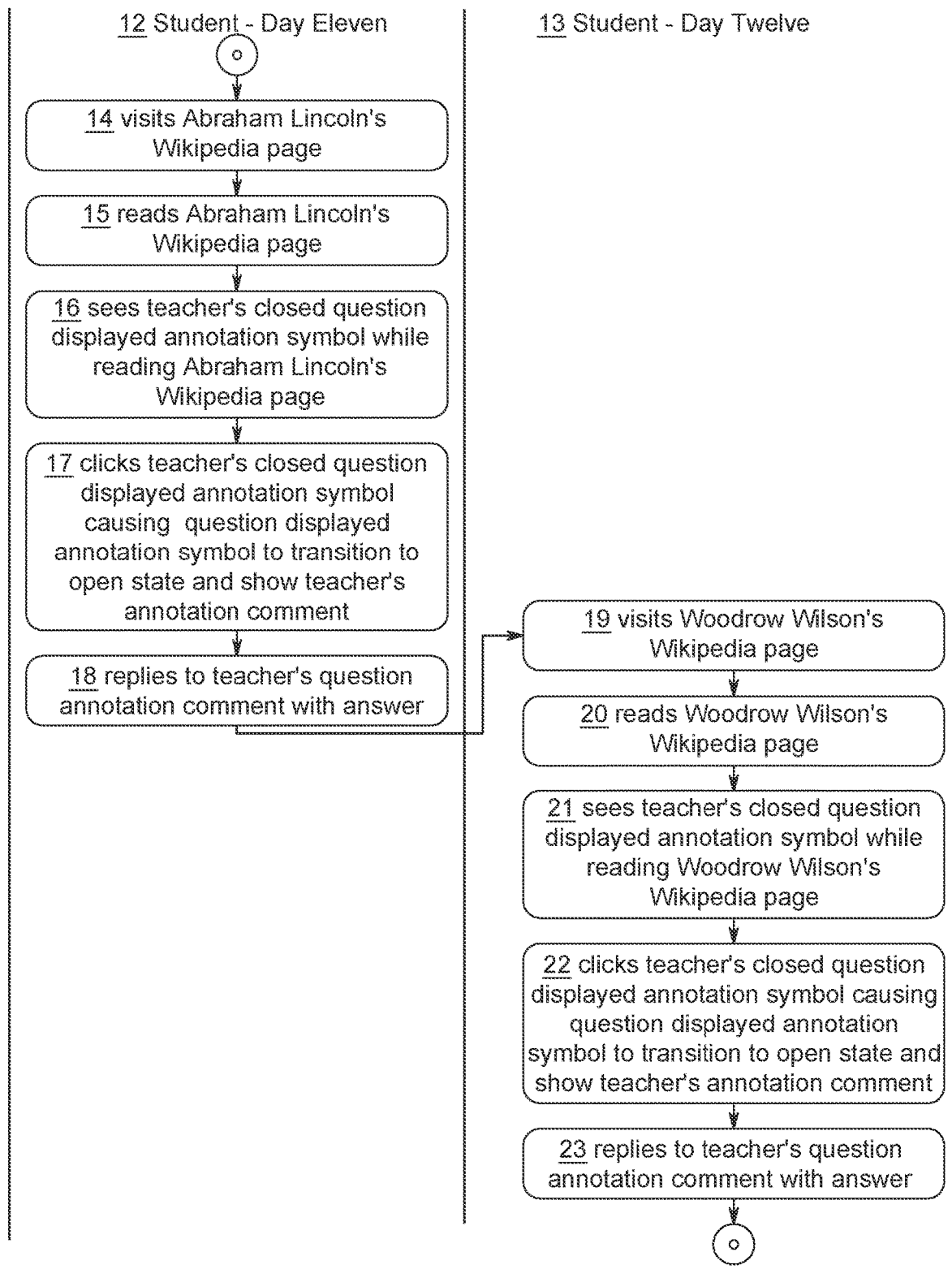
FIG. 2 shows a flow chart of annotations being viewed on two separate web pages on two separate days.

In FIG. 2, a flowchart of a student using an exemplary embodiment of an annotation capable web browser is shown. The student's goal is to answer the study questions provided by the teacher. As shown in FIG. 2, the student on day eleven [12] visits Abraham Lincoln's Wikipedia page [14], reads Abraham Lincoln's Wikipedia page [15], sees teacher's closed question displayed annotation symbol while reading Abraham Lincoln's Wikipedia page [16], clicks teacher's closed question displayed annotation symbol causing question displayed annotation symbol to transition to open state and show teacher's annotation comment [17], and replies to teacher's question annotation comment with answer [18]. As shown in FIG. 2, the student on day twelve [13] visits Woodrow Wilson's Wikipedia page [19], reads Woodrow Wilson's Wikipedia page [20], sees teacher's closed question displayed annotation symbol while reading Woodrow Wilson's Wikipedia page [21], clicks teacher's closed question displayed annotation symbol causing question displayed annotation symbol to transition to open state and show teacher's annotation comment [22], and replies to teacher's annotation comment with answer [23].

Figure 3:
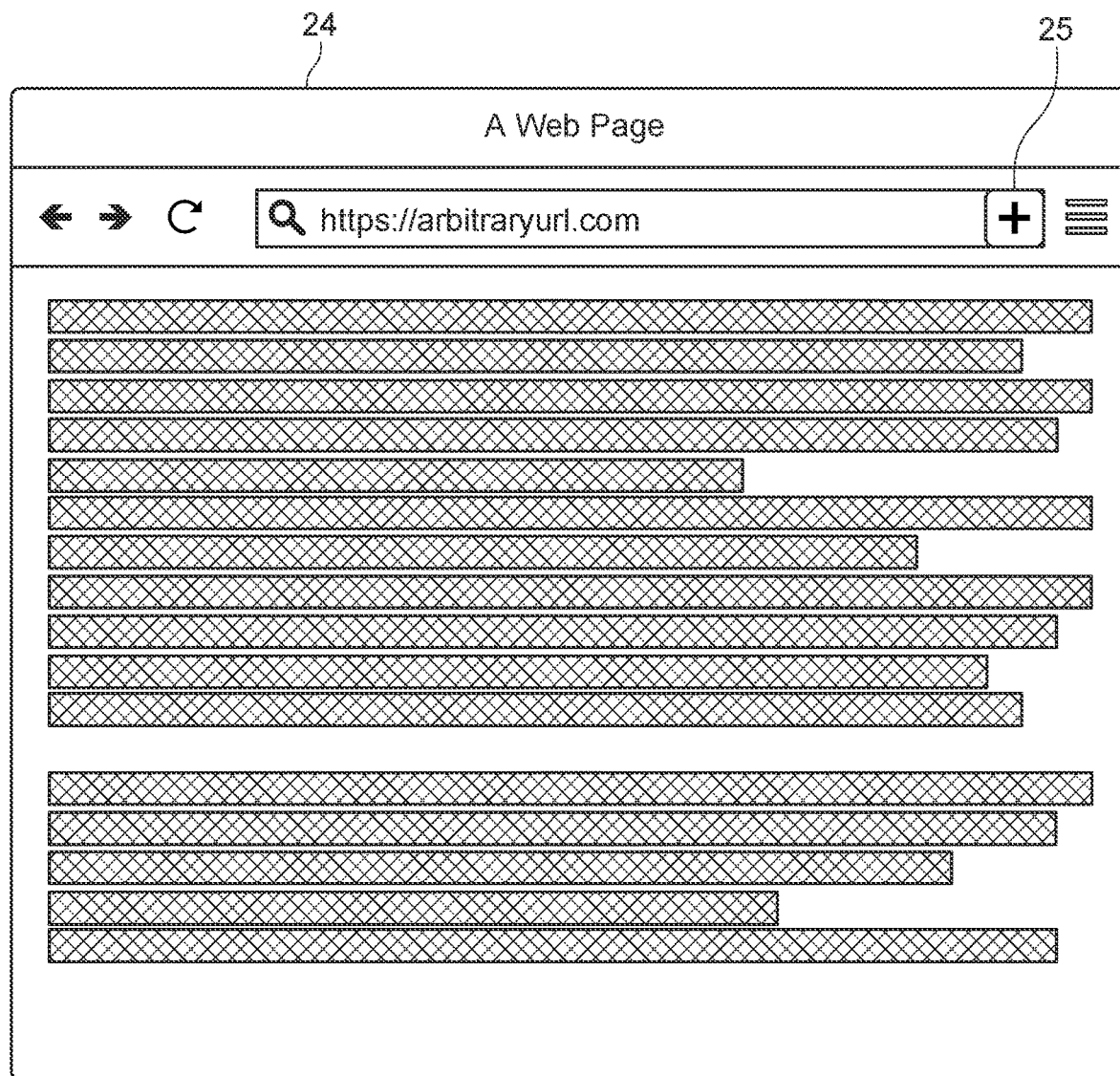
FIG. 3 represents an annotation capable web browser, in an exemplary embodiment wherein a web browser not capable of creating annotations has been augmented with a web browser extension providing annotation capability, before the annotation process has begun.

In FIG. 3, an exemplary embodiment of an annotation capable web browser [24] is presented. The short, wide horizontal rectangles displayed in the viewing area of the web browser that is depicted represents text. There are 11 rectangles representing 11 lines of text in the first paragraph, and there are 5 rectangles representing 5 lines of text in the second paragraph. In this exemplary embodiment, a web browser that supports the addition of web extensions was modified with an exemplary example of a web browser extension [25] that adds annotation capabilities. The web browser extension [25] is a software package typically residing on a non-transitory computer readable medium that can be loaded into memory by a web browser, supporting the addition of web extensions, wherein the web browser application itself is a software application loaded in memory and running on a processor of an electronic computing device. Once the web browser application loads the web browser extension [25] into memory, the web browser extension [25] instruction set can be triggered by the web browser application's instruction set at specified points in the web browser's life cycle. Some of the effects of the web browser extension [25] instruction set on the user interface presented to a user are shown in FIG. 5, FIG. 6, FIG. 7, FIG. 8, FIG. 12, FIG. 13, FIG. 23, FIG. 46, FIG. 47, FIG. 48, and FIG. 49.

Figure 4:
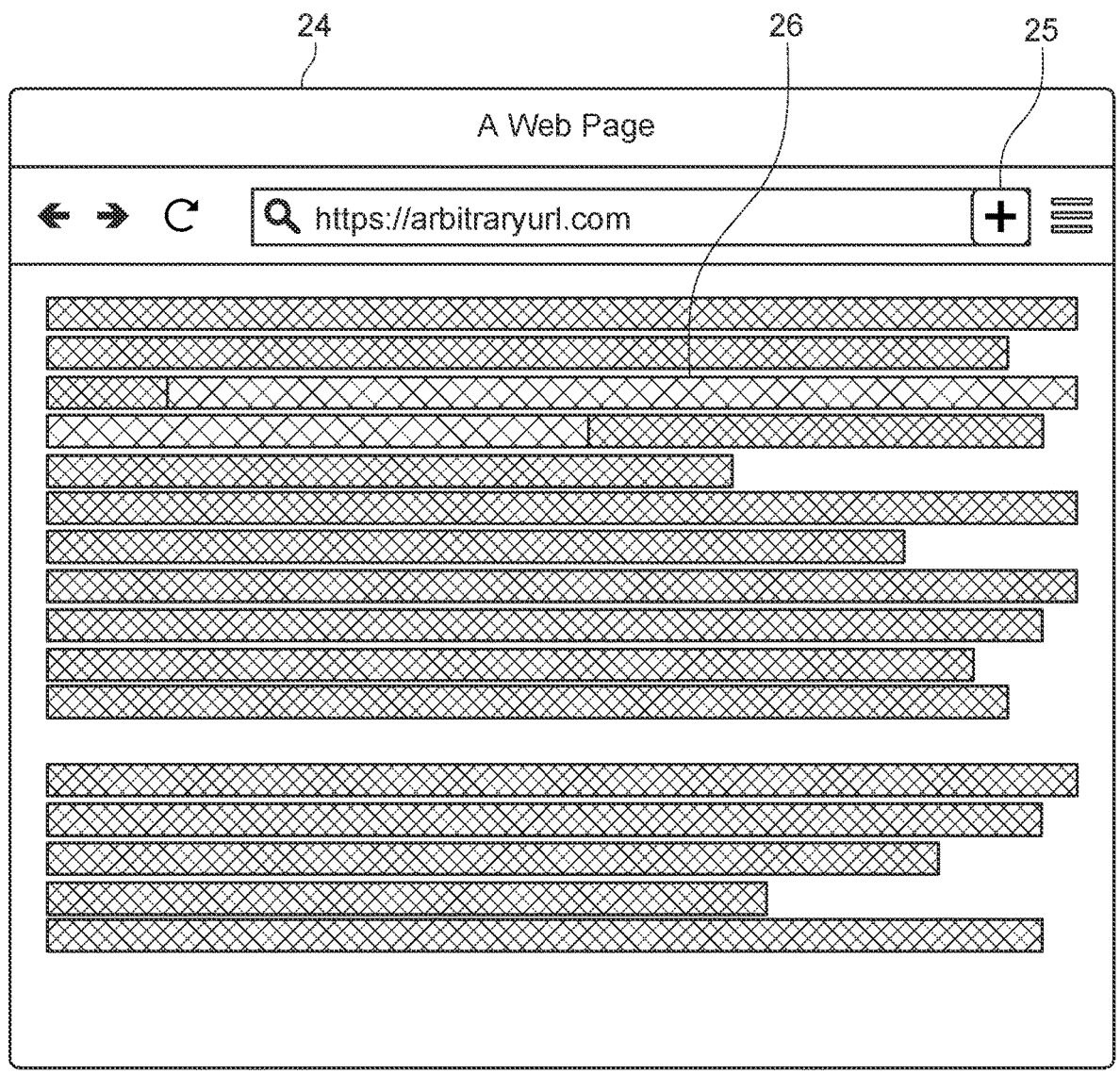
FIG. 4 shows an annotation capable web browser after text has been highlighted.

In FIG. 4, an exemplary embodiment of an annotation capable web browser [24] is shown after the user selects text, which is called ordinary highlighted text [26], and before the web browser extension [25] instruction set is triggered.

Figure 5:
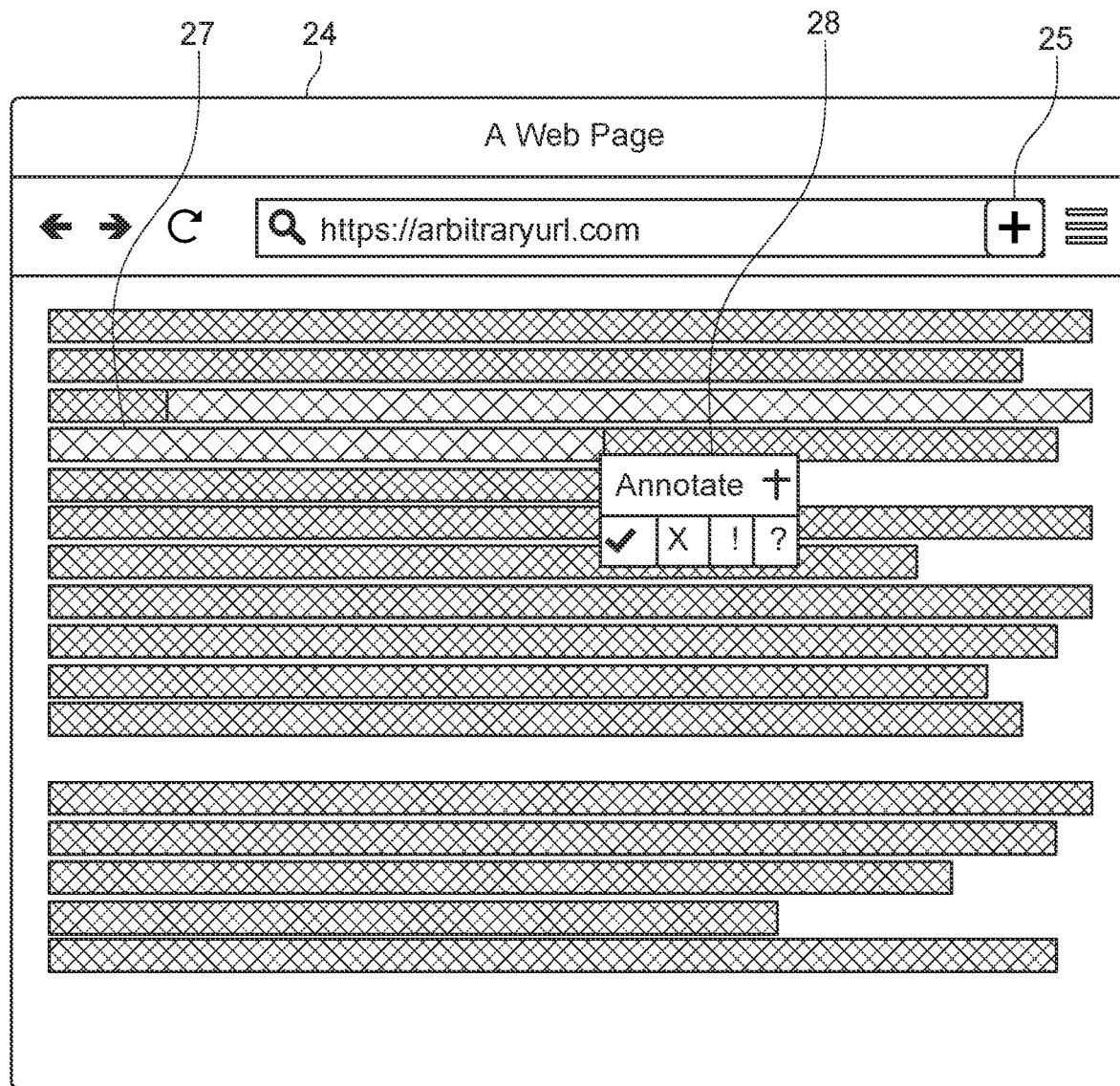
FIG. 5 shows an annotation capable web browser before an annotation symbol has been selected.

In FIG. 5, an exemplary embodiment of an annotation capable web browser [24] is shown after the user selects text and after the web browser extension [25] instruction set is triggered, which causes the annotation symbol selection button bar [28] to appear. Furthermore, the selected text will be called annotation highlighted text [27] to distinguish it from ordinary highlighted text [26] as shown in the state of the exemplary embodiment depicted in FIG. 4. The ordinary highlighted text [26] is the selected text before the web browser extension [25] instruction set is triggered or the selected text in a web browser that does not have annotation capabilities. The web browser extension [25] instruction set handles the input after the user clicks any of the buttons depicted in the annotation symbol selection button bar [28] in FIG. 5.

Figure 6:
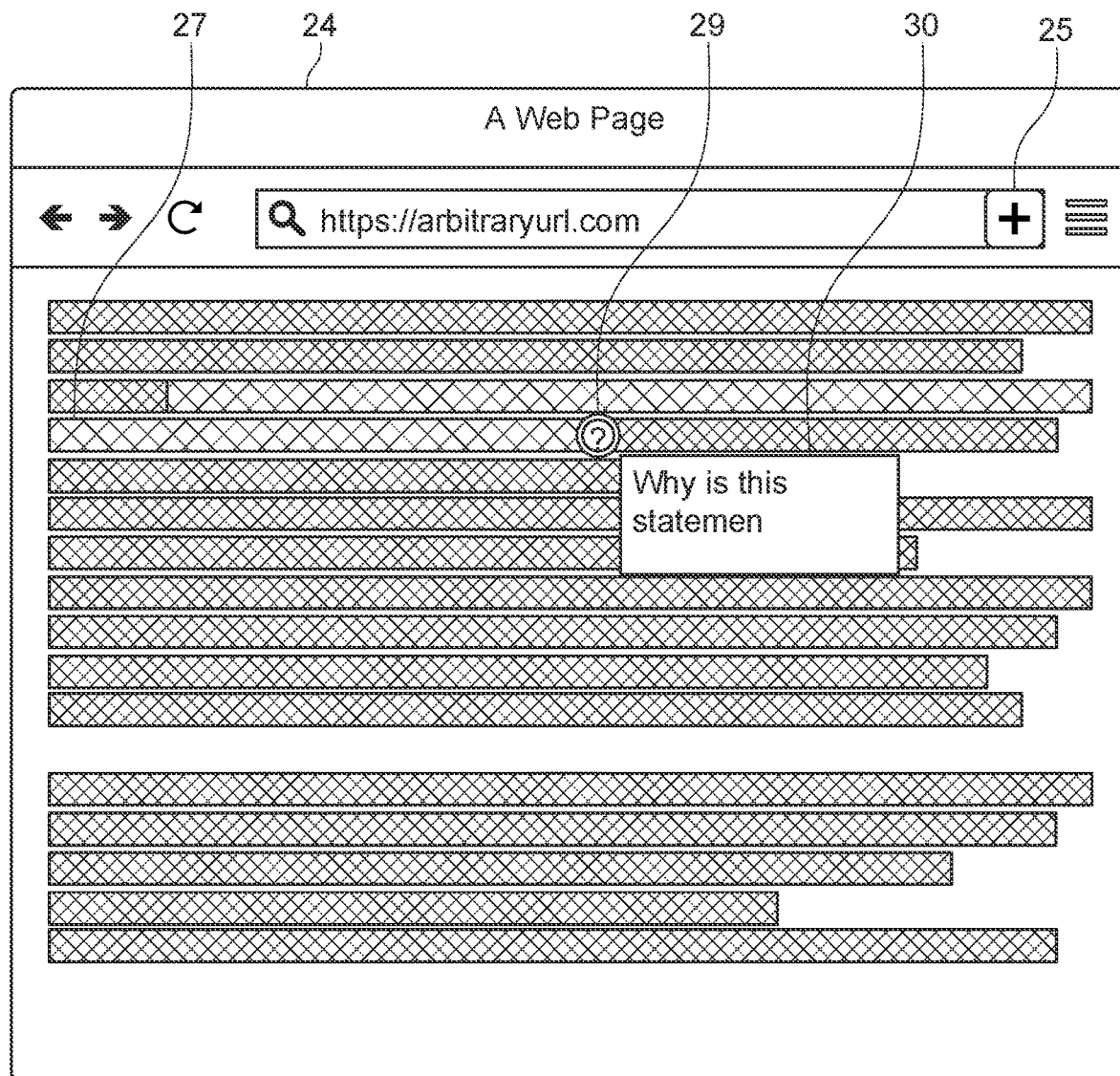
FIG. 6 shows an annotation capable web browser after an annotation symbol has been selected.

In an exemplary embodiment, FIG. 6 depicts the effect of the user clicking the question mark annotation symbol button in the annotation symbol selection button bar [28] illustrated in FIG. 5. In an alternative exemplary embodiment, the annotation symbols shown in the annotation symbol selection button bar [28] in FIG. 5 can be placed on top of each in a vertical column as opposed to a horizontal row. In the exemplary embodiment depicted in FIG. 6, the open question displayed annotation symbol [29] and the annotation comment input box [30] are shown. The open question displayed annotation symbol [29] allows the user to indicate that the user plans to input a question about the annotation highlighted text [27] into the annotation comment input box [30]. The annotation comment input box [30] is an input area for the user of the annotation capable web browser [24] to input text that will be stored by one or more computer systems. Once the user finishes inputting text and conveys the completing of the action of inputting text to the annotation capable web browser [24], the web browser extension [25] instruction set transitions the annotation capable web browser [24] to the state depicted in FIG. 7.

Figure 7:
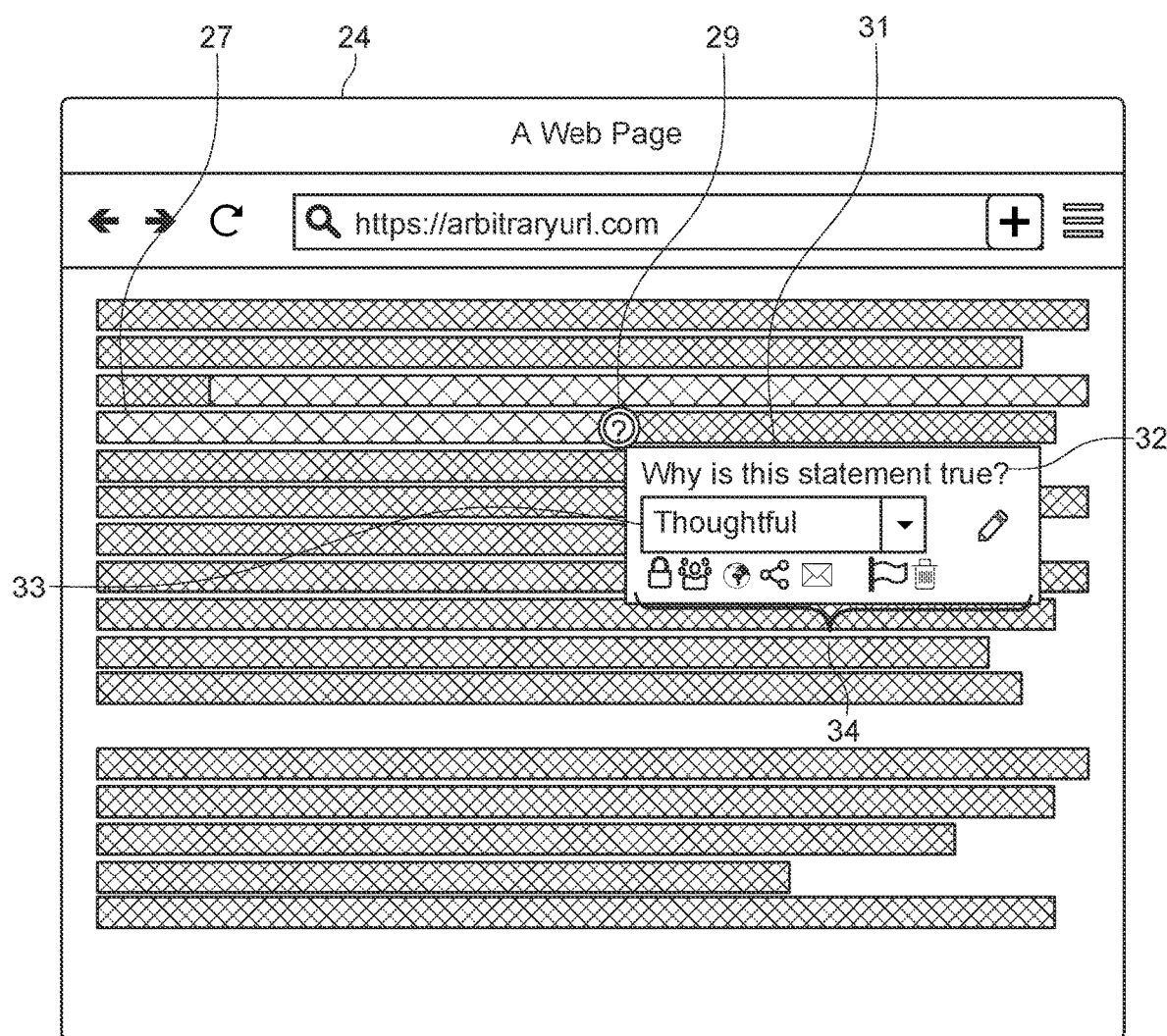
FIG. 7 shows an annotation capable web browser after an annotation has been created and the displayed annotation symbol is in the open state.

In the exemplary embodiment depicted in FIG. 7, the state of the annotation capable web browser [24] is shown after an annotation has been created and the displayed annotation symbol is visually displayed in the open state. The displayed annotation symbol in the open state displays screen elements including the annotation highlighted text [27], the annotation comment [32], the reputation selector [33], the open question displayed annotation symbol [29], and the annotation comment box [31]. The annotation comment [32] comes from the text input by the user as previously described. The annotation comment box [31] also has a contextual variant annotation control bar [34]. The contextual variant annotation control bar [34] allows the user, depending on access control rules, to change privacy settings, share by social media or email, flag an annotation, or delete an annotation. The reputation selector [33] allows the user to select a reputation to assign to the annotation comment [32]. For instance, the user can assign a thoughtful reputation to the annotation comment [32] if the user believes the comment was thoughtful. By clicking outside the annotation highlighted text [27], open question displayed annotation symbol [29], and annotation comment box [31]; the user can cause the displayed annotation symbol to transition to the closed state, which closes the annotation. In an alternative embodiment, the reputation selector [33] can potentially be displayed inside the contextual variant annotation control bar [34] as opposed to being placed adjacent to the annotation comment [32].

Figure 8:
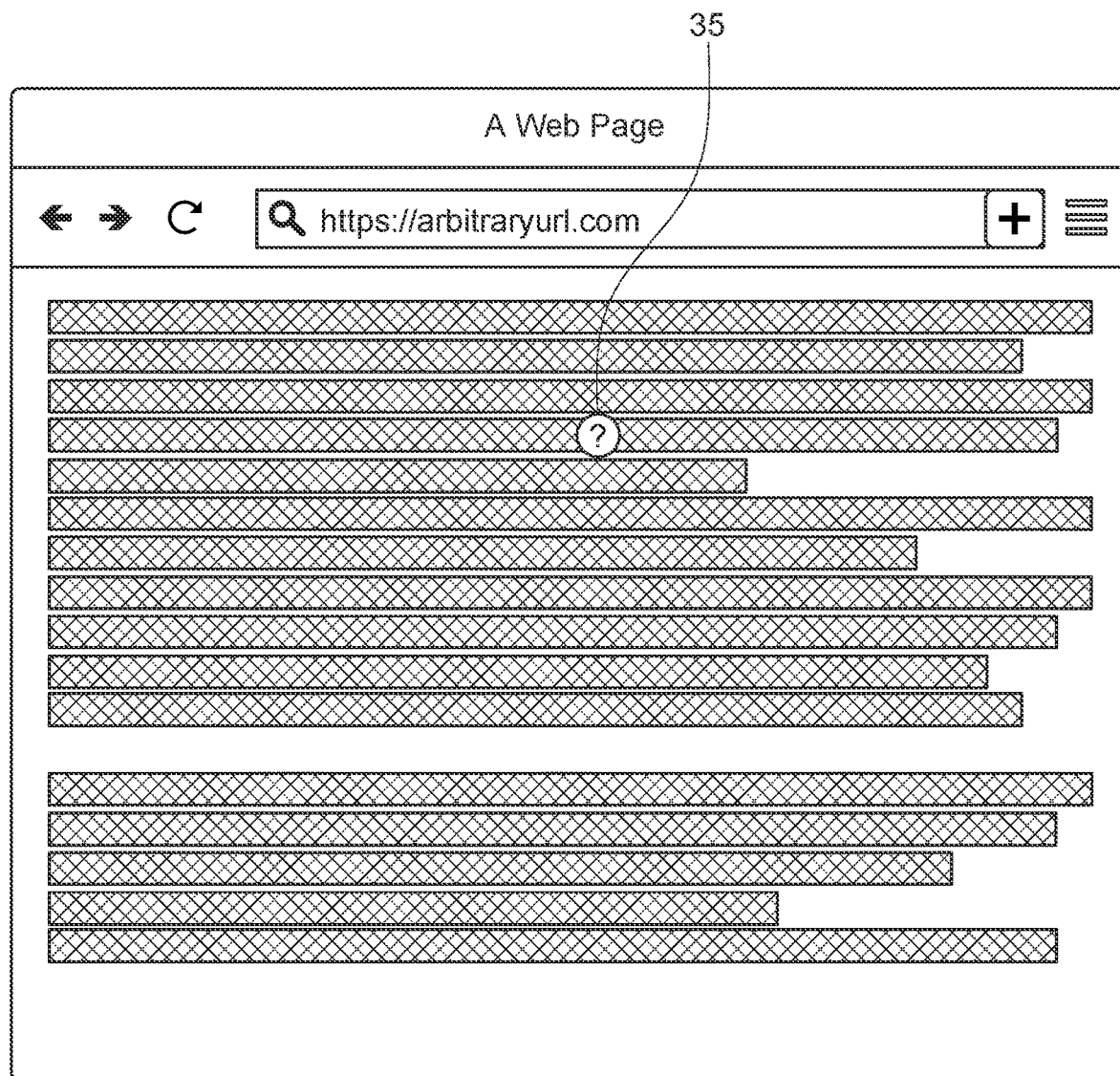
FIG. 8 shows an annotation capable web browser after an annotation has been created and the displayed annotation symbol is in the closed state.

In the exemplary embodiment depicted in FIG. 8, the state of the annotation capable web browser [24] is shown after an annotation has been created and the displayed annotation symbol is displayed in the closed state. The closed question displayed annotation symbol [35] is shown in FIG. 8. The closed question displayed annotation symbol [35] is designed to be visible but not distract the user from the rest of the text.

Figure 9:
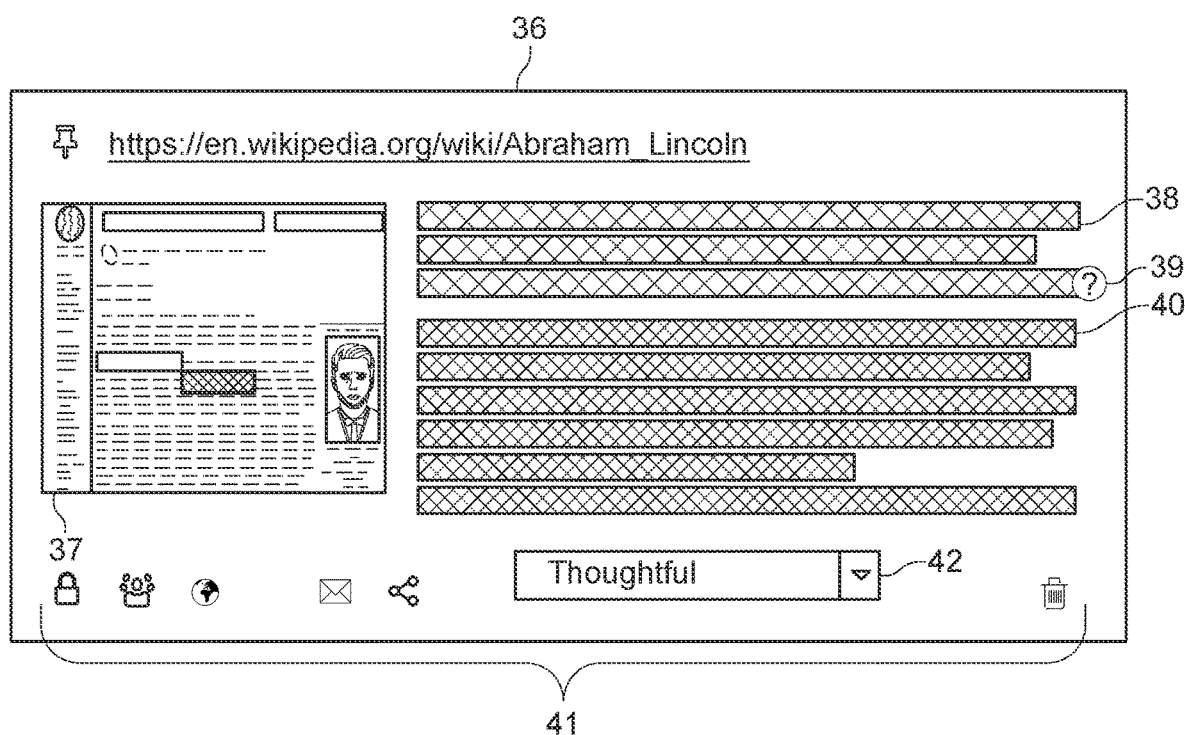
FIG. 9 shows an annotation item box providing context for an annotation when presented in a separate context area and not presented as an overlay on an existing web document adjacent to the highlighted annotation text.

After a user creates an annotation using the annotation capable web browser [24], a bundle of data elements representing an annotation is sent to a server. This bundle of data elements can be used to construct an annotation item box [36], in a separate context area, as shown in the exemplary embodiment depicted in FIG. 9. In the exemplary embodiment depicted in FIG. 9, the annotation item box [36] contains a screenshot with marked text [37], separate context annotation highlighted text [38], separate context question displayed annotation symbol [39], separate context annotation comment [40], separate context variant annotation control bar [41], and separate context reputation selector [42]. The screenshot with marked text [37], in this exemplary embodiment, is a thumbnail size associated marked screenshot intended to allow the user to determine the web page on which the annotation resides and the location of the annotation within the web page. FIG. 7 and FIG. 9 can be viewed as two different contexts of the same exemplary embodiment or two different exemplary embodiments. For the purpose of understanding the separate context annotation highlighted text [38], separate context question displayed annotation symbol [39], and separate context annotation comment [40]; it is helpful to view these two figures as two different contexts of the same exemplary embodiment. The separate context annotation highlighted text [38] presents the annotation highlighted text [27] in the separate context area of the annotation item box [36]. The description of separate context area in this situation indicates that the context is different from the original web page or web document on which the annotation highlighted text [27] occurs. The more separate context question displayed annotation symbol [39] presents the question annotation symbol in the separate context area of the annotation item box [36]. The separate context annotation comment [40] presents the annotation comment [32] in the separate context area of the annotation item box [36]. The separate context variant annotation control bar [41] is intended to allow the user to change the privacy settings, share by social media or email, associate a categorizing reputation to the annotation, and delete the annotation.

If an item box is representative of an annotation, it is referred to as an annotation item box [36], which is depicted in the exemplary embodiment in FIG. 9. In an exemplary embodiment, an item box may represent web pages, documents, pictures, videos, sound recordings, as well as annotations of web pages, documents, pictures, videos, and sound recordings. An item box can be a web page item box, document item box, picture item box, video item box, sound recording item box, annotation item box, picture annotation item box, video annotation item box, sound recording annotation item box, embedded picture annotation item box, embedded video annotation item box, embedded sound recording item box, annotation group item box, derived annotation group item box, and annotation group with derived annotations item box. Collections are representative of groups of items that include annotations, and writeable collections are those collections that a user can modify in some way. One form of modification is adding an item to a writeable collection. Collections are used to organize items including annotations into meaningful groups. As an example, in FIG. 1, a teacher created two collections with one entitled American Presidents Study Guide and another entitled Real Estate.

In the exemplary embodiment depicted in FIG. 9, the annotation item box [36] contains a separate context reputation selector [42] in the separate context variant annotation control bar [41] that allows users, with whom the annotation in the form of the annotation item box [36] is shared, to vote on a reputation by selecting it from the dropdown. This reputation is assigned to the annotation. This reputation has value within a social community. Annotations with reputations for being useful, funny, or thoughtful as well as those expressing dissent with the annotation highlighted text can be selectively displayed based on various criterion chosen by the user and determined to be useful by the annotation server [61], which is shown in some of the other figures. Users can filter annotations based on this criterion, and user's aggregate reputation can also be connected to the reputation of annotations the user creates. In contrast to star-based voting, detailed, annotation-specific semantic information can be gathered from users about the reason an annotation is worthwhile to other users within an online community.

Furthermore, an annotation system functions better when users can reply to annotations in addition to assigning the annotation a reputation. In addition, other users can also vote on the reputation of a reply. This system helps the community identify annotations that may be inaccurate since users are providing feedback through replies and reputations.

Both the exemplary embodiment depicted in FIG. 7 and the exemplary embodiment depicted in FIG. 9 represent annotations. FIG. 7 represents an annotation embedded within the web document that it is annotating while FIG. 9 represents an annotation outside the web document. Since FIG. 9 does not have the surrounding context of the web document, a thumbnail marked screenshot is provided to give users looking at the annotation item box [36] more context. FIG. 7 and FIG. 9 can potentially depict two contexts of the same exemplary embodiment, or they can potentially depict two different exemplary embodiments. Both FIG. 7 and FIG. 9 allow reputation voting. In FIG. 7, a reputation selector [33] allows a user to assign a reputation to the annotation comment [32]. In FIG. 9, a separate context reputation selector [42] allows a user to assign a reputation to the annotation comment [32]. This allows users with whom the annotation is shared to evaluate the annotation's reputation from different contexts.

In the exemplary embodiment depicted in FIG. 9, the annotation item box [36] contains the separate context variant annotation control bar [41] that allows the user to alter the privacy settings. In the exemplary embodiment, a dark grey color indicates the most private setting in which no one except the creator of the annotation can view the annotation, a light grey color indicates the annotation can be shared with users in certain groups, and a white color indicates the annotation can be viewed by all users of the platform.

Figure 10:
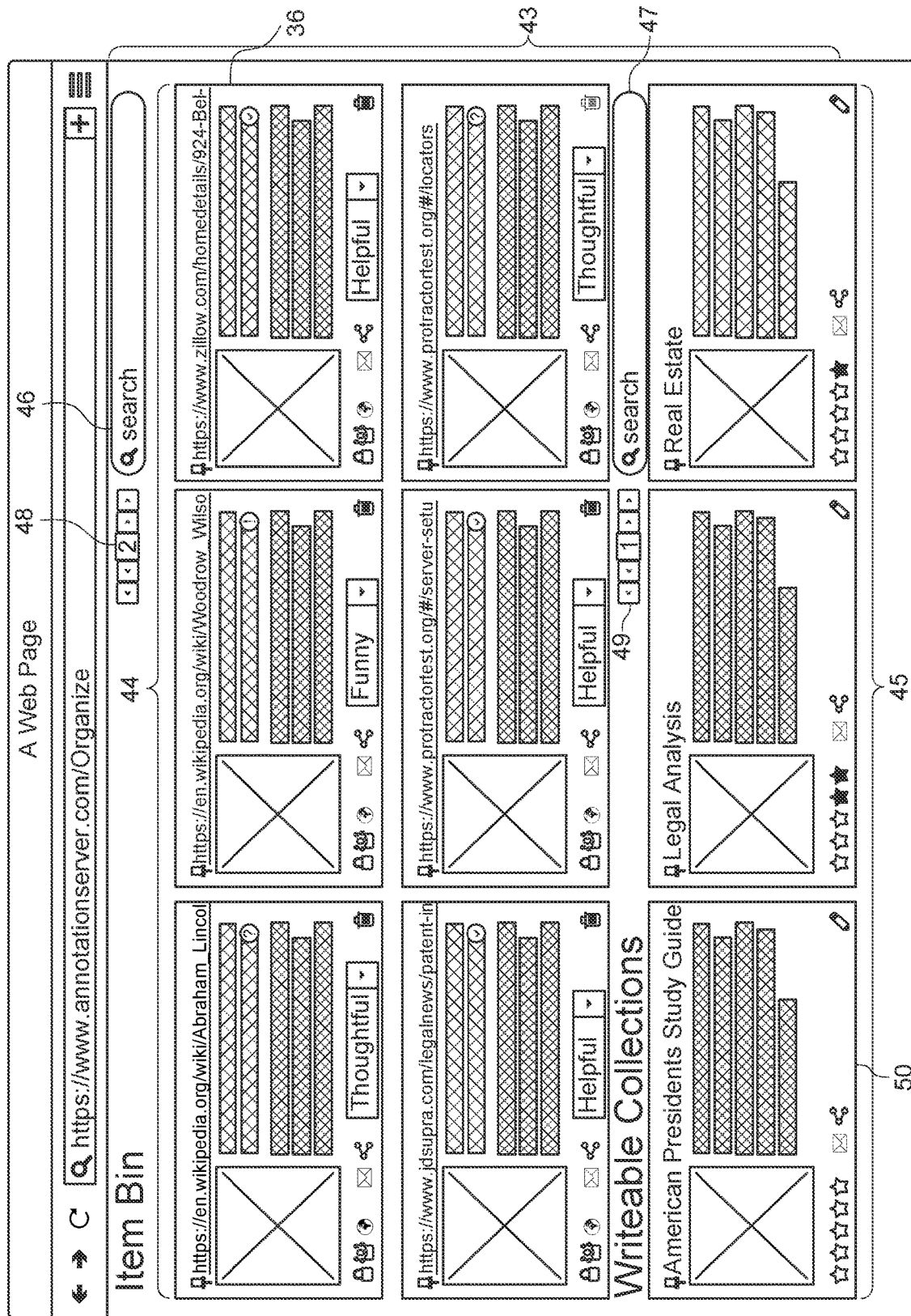
FIG. 10 shows an annotation organization context area presenting annotation item boxes and displayed writeable collections within a separate context area that is separate from the original web documents containing the annotation highlighted texts.

One of the separate context areas in which the annotation item box [36] depicted in FIG. 9 can be rendered is in the annotation organization context area [43] of the exemplary embodiment depicted in FIG. 10. The annotation organization context area [43] of FIG. 10 also contains an item bin [44] to display item boxes and a writeable collection bin [45] to display writeable collections. In FIG. 9, an annotation item box [36] is depicted inside the item bin [44], and a displayed writeable collection [50] is depicted inside the writeable collection bin [45]. Furthermore, the search filter [46] can be used to change the item boxes displayed in the item bin [44]. Furthermore, the collection search filter [47] can be used to change the displayed writeable collections displayed in the writeable collection bin [45]. In addition, the paging mechanism [48] can be used to change the page of item boxes displayed in the item bin [44], and the collection paging mechanism [49] can be used to change the collection page of displayed writeable collections displayed in the writeable collection bin [45].

In the exemplary embodiment depicted in FIG. 10, we see a paging mechanism [48] in the item bin [44] and a collection paging mechanism [49] in the writeable collection bin [45]. These paging mechanisms operate independently. The paging mechanism [48] in the item bin [44] moves forwards and backwards through a page of 6 items in the exemplary embodiment displayed. The items that are shown in FIG. 10 represent annotations. All these items are sequentially ordered. When the paging mechanism is moved forward, the next 6 items in the sequentially ordered set of items are shown. When the paging mechanism is moved backward, the previous 6 items in the sequentially ordered set of items are shown. The collection paging mechanism [49] in the writeable collection bin [45] moves forwards and backwards through a page of 3 collections in the exemplary embodiment displayed. The collections that are shown in FIG. 10 represent a group of items including annotations. Each collection is representative of a group of one or more items, and the items include web page items, document items, picture items, video items, sound recording items, annotation items, picture annotation items, video annotation items, sound recording annotation items, embedded picture annotation items, embedded video annotation items, embedded sound recording items, annotation group items, derived annotation group items, and annotation group with derived annotations items. All these collections are sequentially ordered. When we move the paging mechanism forwards, the next 3 items in the sequentially ordered set of collections is shown. When we move the paging mechanism backwards, the previous 3 items in the sequentially ordered set of collections is shown. As the viewable area of the browser changes after resizing operations, the number of displayed items in the item bin [44] and displayed writeable collections in the writeable collection bin [45] changes. In an alternative exemplary embodiment, an explicit writeable permission may not exist. In this case, the writeable collection bin [45] will include displayed collections. The paging mechanism [48] and collection paging mechanism [49] account for this shift and then operate with the new page sizes.

In FIG. 10, we also see pins in every annotation item box [36] located in the item bin [44] in addition to the paging mechanism [48]. In the exemplary embodiment that is displayed in FIG. 10, 6 items representative of annotations are shown. Each one of these 6 items can be in an unpinned state or a pinned state. As displayed, the page size is 6. If one of these items is pinned, the page size is reduced to 5. As a result of the pinning, the pinned item stays in the viewing area when the paging mechanism [48] is moved forwards or backwards. When the paging mechanism [48] is moved forward, the pinned item remains in the viewing area, and the remaining 5 items are removed from the viewing area. Then, the next 5 items in the sequential ordering replace the 5 items that are removed. If the paging mechanism is moved backwards, the 5 unpinned items are removed from the viewing area, and the previous 5 items in the sequential ordering of items replace the 5 items that were removed from the viewing area. If 2 items are pinned, the page size is reduced to 4. Pinning works similarly for the collections in the writeable collection bin [45].

Whenever an item is pinned, the pinned item is excluded from the set of items sequentially ordered by the annotation server [61], shown in some of the other figures. This avoids having the pinned item appear twice in the viewing area. If 2 items are pinned, the 2 pinned items are excluded from the set of items sequentially ordered by the annotation server [61]. The exclusion of items from the sequential ordering is done in addition to changing the page size. Sequential order exclusion by the annotation server [61] works in a similar way for the collections in the writeable collection bin [45].

Filters such as the search filter [46] shown in the exemplary embodiment in FIG. 10 are used to receive inputs from users. In the case of the item bin [44] search filter [46], it is a search phrase. These inputs are translated into parameter values sent to the annotation server [61], which is shown in some of the other figures. These parameter values are used by the annotation server [61] to input parameters into a request query that is used by the electronic database [62], which is shown in some of the other figures. The request query includes parameter values and a page number. The request query with parameter values is used to specify a set of items and a sequential ordering on those items. The page number specifies a specific page. Furthermore, the request query may include a specified number of items that are to be sent to the web browser running on the client electronic device. This request query contains parameters for filter values such as search phrases and an exclusion list of items to exclude from the specified list of items, wherein the request query along with the parameters and exclusion list of items introduces a sequential ordering on that list of items.

Filters such as the collection search filter [47] shown in the exemplary embodiment in FIG. 10 are used to receive inputs from users. In the case of the writeable collection bin [45] collection search filter [47], it is a collection search phrase. These inputs are translated into parameter values sent to the annotation server [61], which is shown in some of the other figures. These parameter values are used by the annotation server [61] to input parameters into a collection request query that is used by the electronic database [62], which is shown in some of the other figures. The collection request query includes parameter values and a page number. The collection request query with collection parameter values is used to specify a set of collections and a sequential ordering on those collections. The page number specifies a specific page. Furthermore, the collection request query may include a specified number of collections that are to be sent to the web browser running on the client electronic device. This collection request query contains parameters for collection filter values such as the collection search phrase and an exclusion list of collections to exclude from the specified list of collections, wherein this collection request query along with the parameters and exclusion list of collections introduces a sequential ordering on that list of collections.

Figure 11:
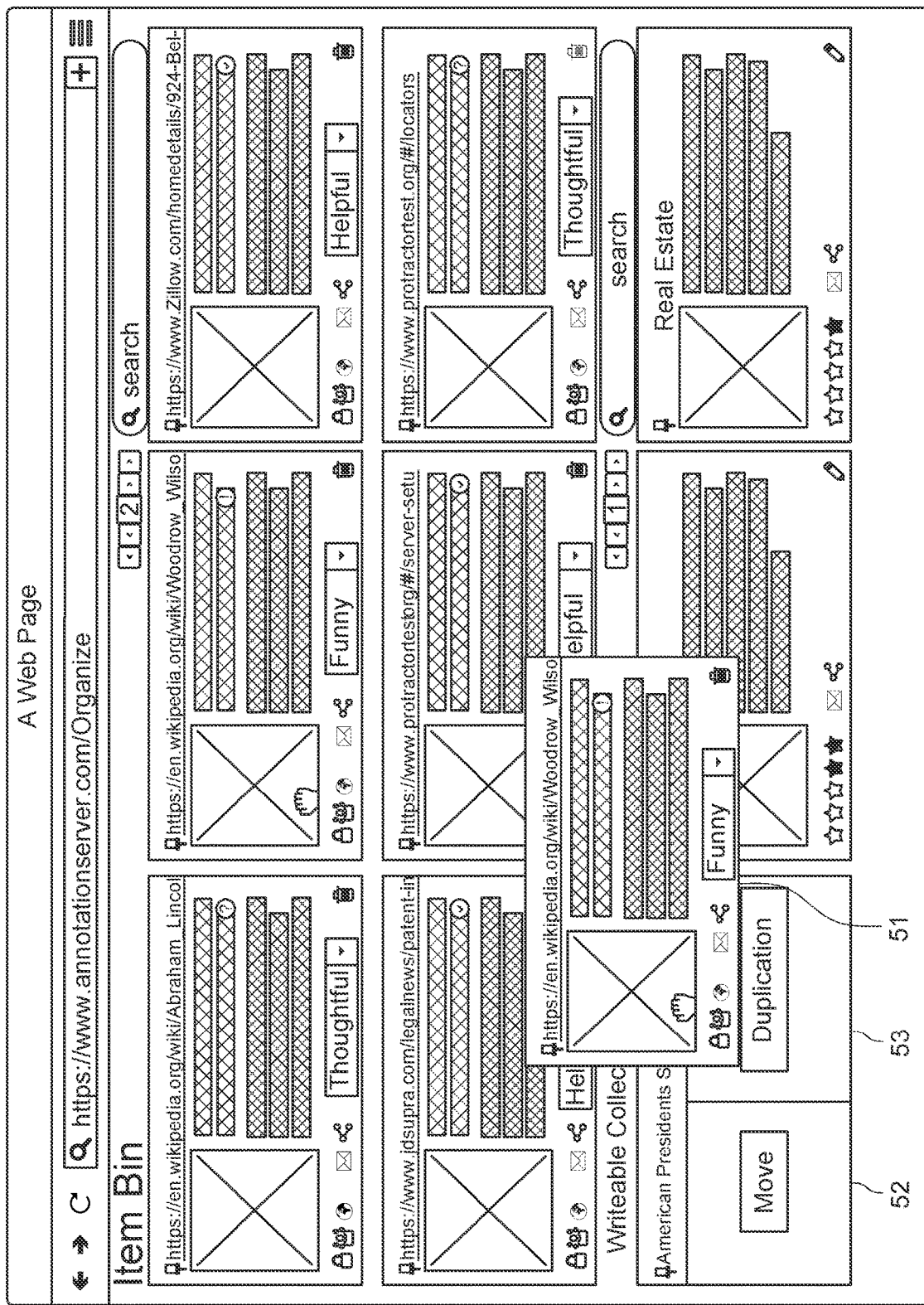
FIG. 11 shows an annotation organization context area showing the process of moving and duplicating annotations into collections, which are groupings of annotations and other items.

After a user creates an annotation, the annotation appears in item bin [44] in the exemplary embodiment depicted in FIG. 10. Using a drag and drop process, the user can either move or duplicate an annotation item box [36] into a collection as in the exemplary embodiment depicted in FIG. 11. In the exemplary embodiment depicted in FIG. 11, a moving annotation item box [51] is depicted. As the moving annotation item box [51] approaches a displayed writeable collection [50] as in the state of the exemplary embodiment depicted in FIG. 10, the visual form of the displayed writeable collection [50] changes as depicted in FIG. 11, displaying screen elements including a move target [52] and a duplication target [53]. In this exemplary embodiment, if the mouse pointer depicting the dragging of the moving annotation item box [51] is in the area denoted by the move target [52] and released, the movement action is triggered. In this exemplary embodiment, if the mouse pointer depicting the dragging of the moving annotation item box [51] is in the area denoted by the duplication target [53] and released, the duplication action is triggered.

Figure 12:
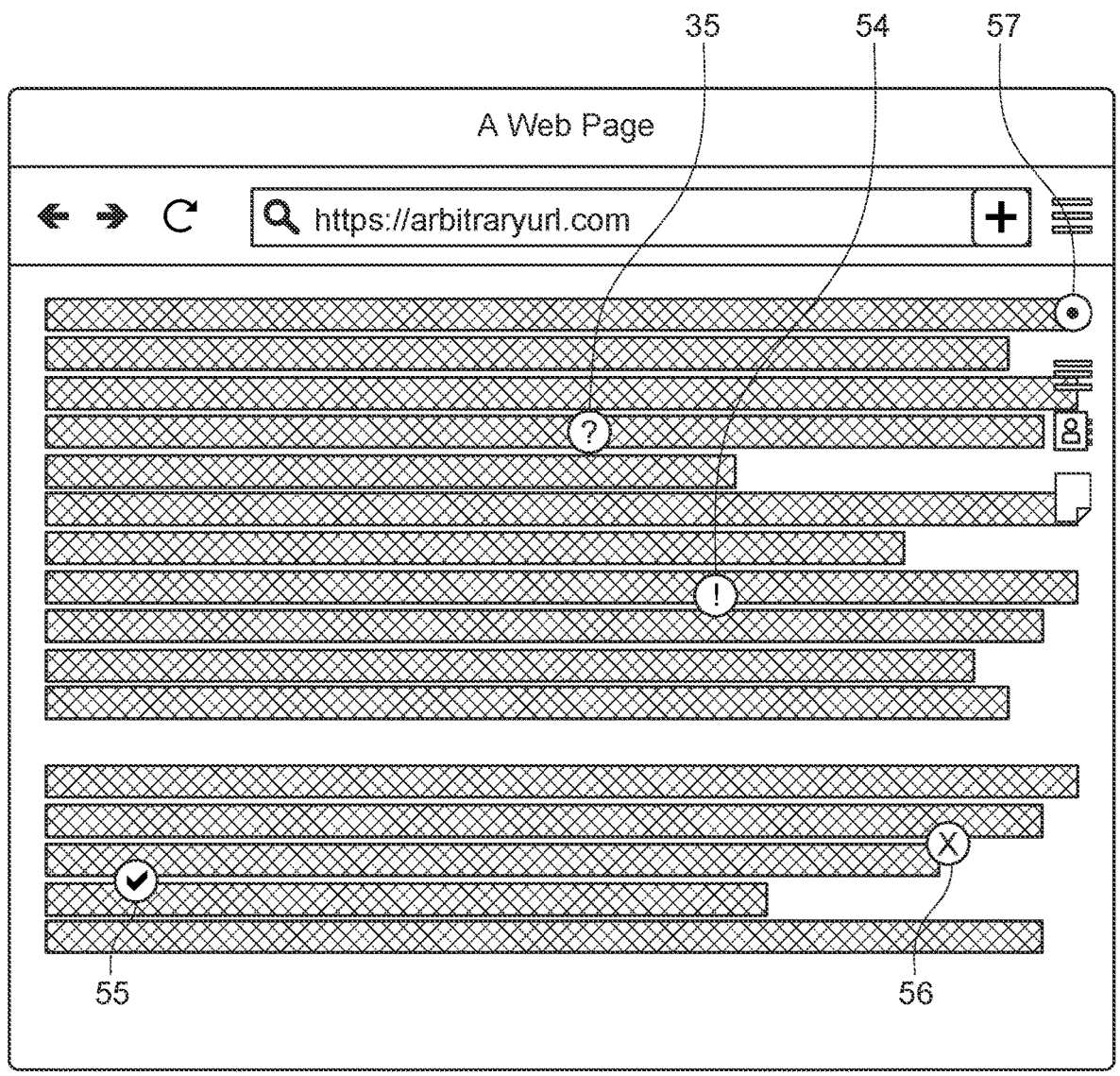
FIG. 12 shows an annotation capable web browser showing a web document with displayed annotation symbols in the closed state.

In the exemplary embodiment depicted in FIG. 12, a user is presented a closed question displayed annotation symbol [35], a closed exclamation displayed annotation symbol [54], a closed check displayed annotation symbol [55], and a closed incorrect displayed annotation symbol [56]. These four annotation symbols are examples of displayed annotation symbols. In the exemplary embodiment, displayed annotation symbols have at least two possible states. These states include open and closed. In the closed state, the displayed annotation symbol is visible. The displayed annotation symbols are designed to have low visibility to avoid distracting the user while reading the web document. In the open state, additional information is displayed in the web browser viewing area. In the exemplary embodiment in FIG. 7, a displayed annotation symbol in the open state is depicted. This displayed annotation symbol is a question displayed annotation symbol. In the exemplary embodiment in FIG. 7, the open question displayed annotation symbol [29] is shown along with the annotation highlighted text [27] and the annotation comment box [31].

Annotation symbols are associated with elements of a group of annotation semantic relationships. Each annotation semantic relationship shows a relationship, typically based on a user selection, between the annotation highlighted text [27] and the annotation comment [32] as depicted in the exemplary embodiment in FIG. 7. Associated to each relationship in the group of annotation semantic relationships is a different annotation symbol. As an example, a closed question displayed annotation symbol [35], as depicted in the exemplary embodiment in FIG. 8, indicates the creator of the annotation marked the annotation comment as being a question about the annotation highlighted text. This closed question displayed annotation symbol [35] allows a user familiar with how the exemplary embodiment works to know that the user can click on the closed question displayed annotation symbol [35] and see an annotation comment that is a question about the annotation highlighted text [27], as depicted in FIG. 7, before the user actually performs the action of clicking.

Once clicked, the closed question displayed annotation symbol [35], as in the state of the exemplary embodiment depicted in FIG. 8, becomes a open question displayed annotation symbol [29] showing the annotation highlighted text [27] and the annotation comment box [31], as in the state of the exemplary embodiment depicted in FIG. 7. Its also possible, in the state of the exemplary embodiment depicted in FIG. 8, for annotation highlighted text [27], open question displayed annotation symbol [29], and annotation comment box [31] to become visible on mouseover of the closed question displayed annotation symbol [35], as in the state of the exemplary embodiment depicted in FIG. 8, and become pinned with a click. To improve automatic recognition for the user, the annotation highlighted text [27] in FIG. 7 can be assigned a color based on its annotation symbol. In other words, the color of the annotation highlighted text [27] is based on the annotation semantic relationship between the annotation highlighted text [27] and the annotation comment.

To further illustrate the exemplary embodiment, observe the following. The closed exclamation displayed annotation symbol [54] indicates the creator of the annotation marked the annotation comment as being an exclamatory statement, which indicates a point of caution or an interesting fact about the annotation highlighted text. A closed check displayed annotation symbol [55], indicates the creator of the annotation marked the annotation comment as being a statement that agrees with the annotation highlighted text. And, a closed incorrect displayed annotation symbol [56] indicates the creator of the annotation marked the annotation comment as being a statement that disagrees with the annotation highlighted text.

In addition to the annotation symbols that have been discussed and the displayed annotation symbols depicted in FIG. 12, an advertisement annotation symbol can be used to indicate another relationship in the group of annotation semantic relationships. This relationship indicates that the annotation comment [32], as in the state of the exemplary embodiment depicted in FIG. 7, is an advertisement related to the annotation highlighted text [27]. In this situation, the closed question displayed annotation symbol [35], as in the state of the exemplary embodiment depicted in FIG. 8, would be replaced by an advertisement displayed annotation symbol.

In the exemplary embodiment depicted in FIG. 12, we see several displayed annotation symbols. In this exemplary embodiment, corresponding to the question annotation symbol, disagreement annotation symbol, agreement annotation symbol, exclamation annotation symbol, and advertisement annotation symbol are five relationships in the group of annotation semantic relationships. These annotation semantic relationships are the question relationship, disagreement relationship, agreement relationship, exclamatory relationship, and advertisement relationship.

In an exemplary embodiment, machine learning and deep learning models can be used to automatically determine the annotation semantic relationship between the annotation highlighted text and annotation comment. Furthermore, the user data that is collected with users determining the annotation semantic relationship and writing annotation comments can be used to train deep learning models, and the by-products of these trained models can be used for other natural language processing purposes. Users can be given the option to opt-in or opt-out of the use of the data that the user creates for the purpose of training deep learning based natural language processing models. A bidirectional long short-term memory (BiLSTM) model with a final max-pooling layer can be used to compute sentence embeddings. Other machine learning and deep learning methods can also be used to create sentence embeddings. Sentence embeddings can be used to determine the similarity of two sentences. Once sentence embeddings are calculated for all sentences in a collection through the analysis of annotation highlighted text, annotation comments, and other sentences occurring in items and replies; these sentence embedding vectors can be used to determine whether an item is similar to other items in a collection or determine the similarity of two collections. Based on this similarity analysis, items can be suggested to users for reading, engaging in discussion with other users, or addition into a collection. Similar collections can be suggested to users based on collections the user searches, reads, or contributes to. In addition, annotations on a web page can link to similar annotations or content in other web pages or documents based on similarity analysis based on sentence embedding vectors. A convolution neural network (CNN) model can be used in conjunction with the sentence similarity classifier to verify the annotation semantic relationship specified by users. The user-provided annotation semantic relationship data can be used in conjunction with user reputation to validate the user selection of annotation semantic relationships and to potentially identify inappropriate content generated and posted by users. Bidirectional encoder representations from transformers (BERT) can be used to identify named entities within web pages and web documents and auto-annotate items of potential interest to a user. These named entities are entities present in Wikipedia or products for sale on online market places. For moderation of user-generated annotations, pre-trained BERT that are fine-tuned for sentiment analysis can be used to flag inappropriate user-generated content.

Figure 13:
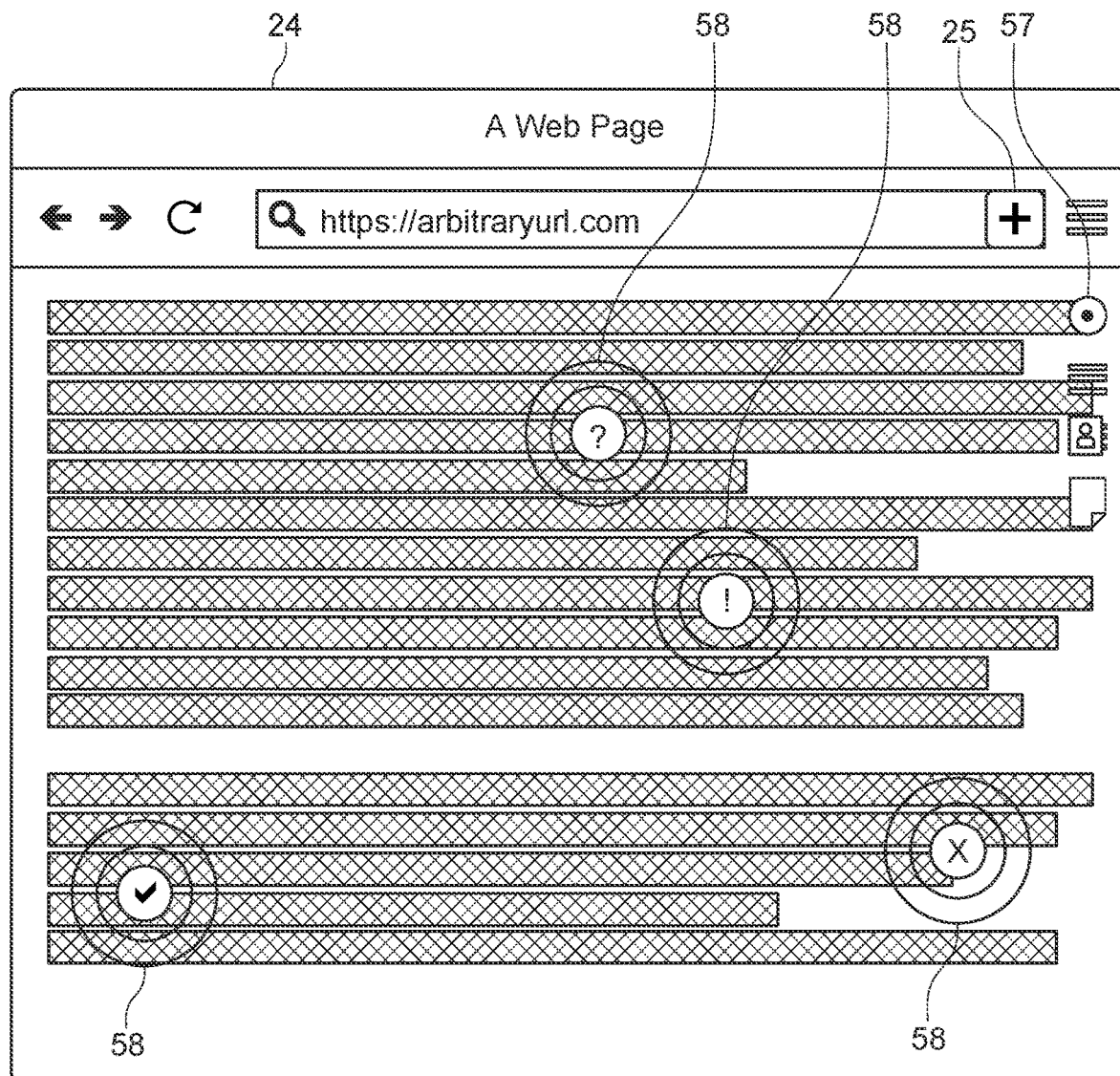
FIG. 13 shows an annotation capable web browser showing a web document with displayed annotation symbols in the closed state with their corresponding displayed annotation symbol beacons.

In the exemplary embodiment depicted in FIG. 13, a user triggers the symbols beacon by pressing the symbols beacon trigger button [57] to make the closed displayed annotation symbols more salient. The symbols beacon can be in the untriggered state or the triggered state. When the symbols beacon trigger button [57] was pressed, the symbols beacon transitioned from the untriggered state to the triggered state. The trigger mechanism for the symbols beacon can also be a sequence of keyboard key presses or mouse button clicks. The trigger mechanism can also be located in a menu option within an annotation capable web browser [24]. Whether it is a button available in the display area of the annotation capable web browser [24], a menu option in the annotation capable web browser [24], a combination of keyboard key presses and mouse button clicks, input gesture on a touch screen device, or input gesture through an input device; it is the web browser extension [25] instruction set that makes these triggers available and triggers one displayed annotation symbol beacon [58] for each displayed annotation symbol.

Next, sequence diagrams are presented showing how messages are sent between the different entities. Messages include user input into an annotation capable web browser [24] or an ordinary web browser as well as electronic messages between electronic devices and computer systems. The annotation capable web browser [24] is shown in the exemplary embodiment in FIG. 3. These sequence diagrams apply to a class of exemplary embodiments. After the sequence diagrams are presented, variations of some of the messages will be presented. By specifying the messages more precisely, a specific exemplary embodiment can be discussed.

Figure 14:
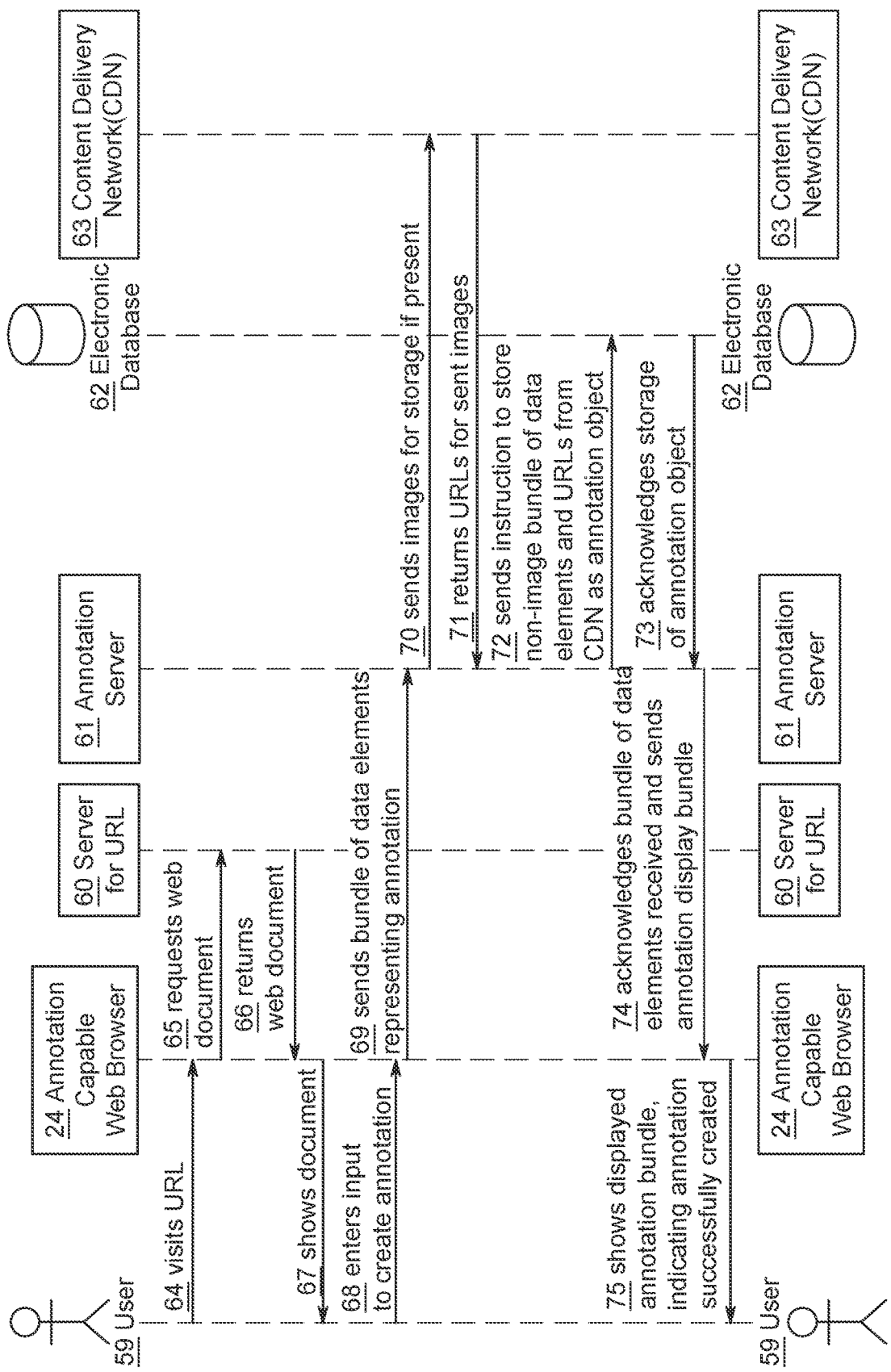
FIG. 14 presents a sequence diagram showing the communication between an annotation capable web server, the web server that provides the data of the visited URL, the annotation server, the electronic database, and the CDN.

FIG. 14 shows a sequence diagram that applies to a class of exemplary embodiments. In FIG. 14, a sequence diagram shows interactions between the user [59], annotation capable web browser [24], server for URL [60], annotation server [61], electronic database [62], and content delivery network [63]. After user [59] visits URL [64], annotation capable web browser [24] requests web document [65] and server for URL [60] returns web document [66], and then annotation capable web browser [24] shows document [67] to user [59]. Next, user [59] enters input to create annotation [68], after which annotation capable web browser [24] sends bundle of data elements representing annotation [69] to annotation server [61], which sends images for storage if present [70] to content delivery network [63], which returns URLs for sent images [71]. Next, annotation server [61] sends instruction to store non-image bundle of data elements and URLs from CDN as annotation object [72] to electronic database [62], which acknowledges storage of annotation object [73]. Afterwards, annotation server [61] acknowledges bundle of data elements received and sends annotation display bundle [74] to annotation capable web browser [24], which shows displayed annotation bundle, indicating annotation successfully created [75], to user [59]. In [69], reference is made to a bundle of data elements representing an annotation. The bundle of data elements can vary depending on the implementation details of the exemplary embodiment and the type of annotation.

In FIG. 14, a sequence diagram was presented that applied to a class of exemplary embodiments. Depending on the characteristics of the bundle of data elements representing an annotation or highlighted text, the annotation server [61] may record different data, and the annotation capable web browser [24] may display different views due to the fact different data is received, and different data is available to choose from when generating a displayed representation of the annotation or highlighted text. Next, screenshot bundles and annotation symbol bundles, which could play the role of the bundle of data elements in FIG. 14, will be discussed in an exemplary embodiment. In addition, FIG. 14 could apply to an exemplary embodiment where the annotation display bundle is a screenshot display bundle or an annotation symbol display bundle. Corresponding to a screenshot bundle is a screenshot display bundle, and corresponding to an annotation symbol bundle is an annotation symbol display bundle. These corresponding pairs are used where FIG. 14 uses bundle of data elements and annotation display bundle.

A screenshot bundle in an exemplary embodiment includes a uniform resource locator (URL) for a document, data for representing a selected piece of text from the document with the selected piece of text representing an annotation, and a marked screenshot of a portion of the document showing the selected piece of text with the selected piece of text being visually marked. The screenshot bundle may also include information for finding the selected piece of text in the document. This information for finding the selected piece of text in the document typically includes document object model (DOM) information. An annotation screenshot bundle is a screenshot bundle that also includes an annotation comment [32], as shown in the exemplary embodiment depicted in FIG. 7. Screenshot bundles can also include data for representing an annotation symbol. Screenshot bundles can be used without an annotation comment [32]. In such cases, data representing highlighted text without an annotation comment [32] along with an associated marked screenshot representative of the highlighted text is in the screenshot display bundle.

An annotation symbol bundle in an exemplary embodiment includes a uniform resource locator (URL) for a document, data for representing a selected piece of text from the document with the selected piece of text representing an annotation, an annotation comment [32], and an annotation symbol. The exemplary embodiment in FIG. 7 may be a helpful reference. The screenshot bundle also includes information for finding the selected piece of text in the document. This information for finding the selected piece of text in the document typically includes document object model (DOM) information. Annotation symbol bundles can also include a marked screenshot of a portion of the document showing the selected piece of text with the selected piece of text being visually marked. Depending on the desired behavior, a marked screenshot may or may not be required.

In an exemplary embodiment, the DOM information for finding the selected piece of text in the document may include information for finding the element in the DOM that contains the first character of the selected text and for finding the element in the DOM that contains the last character of the highlighted text as well as the highlighted text itself. These two elements are called the highlighted text starting element and the highlighted text ending element. The information recorded about the highlighted text starting element and the highlighted text ending element is the tag, id, class, index, content, xpath, and parent. Furthermore, the ancestor element of the highlighted text starting element is recorded.

The tag, id, class, index, and content are recorded for the ancestor element of the highlighted text starting element. To locate the specified highlighted text at a later point in time, the DOM is searched by tag and id, then xpath, then tag and class and index, then tag and class, then tag and index, and then just the tag. A simple xpath search is not sufficient because edits may have been made to the web page, or the web page's DOM structure may change as a result of the execution of JavaScript code that inserts elements into the DOM. In this exemplary embodiment, the goal is to find the selected text even if edits have been made to the web page. To facilitate finding the selected text in different scenarios, multiple search methods are used. Once the highlighted text starting element and highlighted text ending element are located, finding the selected highlighted text is easier.

Another concern is the insertion of elements into the web page's DOM by JavaScript code on the visited web page. These inserted elements can also be annotated. To facilitate this process, the browser's mutation observer can be used. Once the changes are detected, the DOM structure detection code can be rerun. If the highlighted text starting element and highlighted text ending element are found, the highlighted text can be inserted. For annotation highlighted text, the displayed annotation symbol can also be inserted.

If the transmitted screenshot bundle or annotation symbol bundle contains a marked screenshot, a storage set of images is created from this marked screenshot by various operations including resizing, cropping, and image alteration. These operations are carried out to generate images that will look good in different viewing areas on different sized screens. Once this storage set of marked screenshots is created, determining whether to store these marked screenshots in a content delivery network (CDN) is worthwhile. For thumbnail marked screenshots, there might be benefits of storing the data with all the other data in the screenshot bundle or the annotation symbol bundle. For larger marked screenshots, it is usually better to store these images using a CDN that can also make these images available for delivery. The annotation server [61], as shown in some of the figures, typically decides which images in the storage set to store in the electronic database [62], as shown in some of the figures, and which images to send to the CDN. The CDN typically replies with a URL when an image is stored. These URLs are stored with the rest of the screenshot bundle or annotation symbol bundle.

A deliverable screenshot is either an actual image or URL stored in the electronic database [62], as shown in some of the figures. When the data is transmitted to a client device, the URL can be used to fetch the image from the CDN. If the image is sent directly, it can simply be displayed. Ultimately, it is the annotation object that is stored in the electronic database [62]. The annotation object typically includes all the received data in the screenshot bundle or annotation symbol bundle along with deliverable screenshots for each marked screenshot in the storage set.

In order for advertisers to reach customers with relevant advertisements related to the content users are currently engaging with, advertisement screenshot bundles and advertisement annotation symbol bundles can potentially be deployed along with their respective advertisement screenshot display bundles and advertisement annotation symbol display bundles. The displayed advertisement screenshot bundle is the visually displayed form of the data in the advertisement screenshot display bundle, and the displayed advertisement annotation symbol bundle is the visually displayed form of the data in the advertisement annotation symbol display bundle. FIG. 7 can be used for illustrative purposes, but the displayed annotation symbol is replaced by an advertisement displayed annotation symbol. In the exemplary embodiment, the advertisement screenshot bundle contains an annotation comment [32] created by an advertiser that is relevant to the annotation highlighted text [27]. The advertisement annotation symbol bundle contains an annotation symbol denoting an advertisement. While annotation symbol bundles contain an annotation symbol, a screenshot bundle may also include an annotation symbol. While screenshot bundles contain a marked screenshot, an annotation symbol bundle may also contain a marked screenshot. FIG. 9 can be used for illustrative purposes, but the displayed annotation symbol is replaced by an advertisement displayed annotation symbol. Furthermore, the annotation comment is created by an advertiser along with the other elements, but the overall form should resemble other annotation item boxes. When marked screenshots are included, engineering a performant system may require the creation of storage sets and the use of a CDN for distributing these marked screenshots. In the exemplary embodiment, these advertisement screenshot bundles and advertisement annotation symbol bundles are often store and managed through an advertisement server that communicates with the annotation server. The advertisement server is not explicitly shown in the sequence diagrams but can be inserted. To incorporate a single advertisement, the page size can be reduced by one. After the annotation server [61], as shown in some of the figures, prepares a page of items representing annotations, the annotation server [61] can communicate with the ad server to get 1 advertisement.

The semantic web provides semantic descriptions of some web pages and documents available on the WWW through ontologies that are implementations of a certain type of description logic. These ontologies need to be created for different domains, and these ontologies have the ability to express concepts within that domain in a logical form as done with description logics. Collections of pre-existing ontologies are available through projects such as KBPedia and others. Description logics are a family of logics defined in mathematical logic that have some of the characteristics of first-order logic. Depending on the properties of the family of logic, it has different computational characteristics. Using an ontology that exists, logical statements can usually be made. In an exemplary embodiment, these logical statements can be translated into natural language, and some sentences in natural language can be translated into a statement made within a description logic using neural machine translation techniques. Other deep learning techniques can also be used. Machine learning and deep learning models can translate some natural language sentences into statements in a particular ontology. Within this exemplary embodiment, this methodology can be used for advertisement purposes. An advertiser can express concepts and write logic statements about the product or service within an ontology that pertains to the product or service. These logic statements can then be entered into an ad platform. The ad server can then identify web pages and documents that contain natural language text that can be translated into a statement in the ontology chosen by the advertiser to express a concept about the product or service being advertised. Furthermore, the ad server can determine which of these web pages and documents contain natural language text expressing statements similar or logically related to the one expressed by the advertiser. Once these web pages and documents along with the corresponding location within the document are identified, the advertiser can be given the opportunity to advertise at that particular location on the web page or document or somewhere that links to that particular location. Utilizing logic analyzers, different consequences of statements that occur in web pages or documents can be determined. Using this information, the set of web pages or documents along with location within the document can be narrowed to find the best potential fits for an advertiser. Through picture captioning, voice recognition, and text summarization; pictures, videos, and sound recordings can be translated into text. In some cases, this text can be translated into statements within the same ontology used by the advertiser. After this is done, logic analyzers can be used to determine the most suitable candidates to show to the advertiser for consideration by the advertiser. Based on the advertiser's selection, the ad platform can generate ads to place in the ad server. Furthermore, in this exemplary embodiment, ontologies can be created for the purpose of expressing facts about products and services for sale in different domains such as insurance, financial services, legal services, and healthcare. These ontologies can then be used by various groups advertising and selling services in these domains to create logically correct and expressive statements about their products and services to then search for media such as web pages, web documents, pictures, videos, and sound recordings. This media can then reach audiences consuming this media, and the advertiser can know that this audience is likely to have familiarity with the statements made by the advertiser in the ontology. Furthermore, in this exemplary embodiment, the media source itself has a logical relationship with the advertiser's statement, and the advertiser can use this logical relationship to provide more tailored products and more tailored targeting fulfilling a customer's needs.

For FIG. 14 to specify the details of an exemplary embodiment, the bundle of data elements along with details about the storage set and the deliverable screenshot should be specified. The bundle of data elements can be a screenshot bundle with its associated data elements. The bundle of data elements can also be an annotation symbol bundle with its associated data elements. The storage set, the size, resolution, cropping, and other properties of different types of marked screenshots should be determined. This is usually based on considerations of the type of display on which these marked screenshots will be displayed along with the size of the displayed view. In some cases, thumbnail marked screenshots will be in the storage set. When these thumbnails are small in size, storing these images using a CDN may not be the most efficient approach. It may be more efficient to store the image in the electronic database [62], a local file system, or other local location as opposed to a content delivery network [63]. Specifying whether the deliverable screenshot is an actual image or a URL stored in the electronic database is another decision that should be taken into account to specify the details of the implementation. It should be clear to those persons having ordinary skill in the art that a variety of minor variations can be introduced for storing and retrieving images. It should also be clear to those persons having ordinary skill in the art that these variations are interchangeable, and the differences are insubstantial.

The electronic database [62], in FIG. 14 and some of the other figures, can take a variety of forms varying from a relational database to a non-relational database. Furthermore, the electronic database [62] may be a distributed electronic database system implemented on one or more computer systems. The most advantageous characteristics of the database may vary depending on the number of database clients and the usage patterns of these database clients. In the case of the exemplary embodiment, the annotation server [61] is a database client. In order to handle a large number of annotation servers with varying consistency, availability, and persistence needs as well as different latency requirements, the characteristics of the electronic database or distributed electronic database system may vary. Furthermore, distributed electronic database systems can be implemented in a variety of ways.

Furthermore, it should be noted that storing images in an electronic database [62] can sometimes impact performance. In such cases, it is beneficial to store references in the database and use another storage mechanism for certain images. In the case of a content delivery network [63], the reference is a URL. However, it is possible to store a reference that is not a URL and then use an alternative mechanism to store the image in a way that is retrievable using the reference stored in the electronic database. In an exemplary embodiment, the image can be stored on the local file system, and a reference in the database can correspond to the file's path. In such cases, the electronic database and the storage location should be viewed as a distributed electronic database storing the image in a more performant manner. It should be clear to those persons having ordinary skill in the art that a variety of minor variations on this technique can be introduced for storing and retrieving images. It should also be clear to those persons having ordinary skill in the art that these variations are interchangeable, and the differences are insubstantial.

Figure 15:
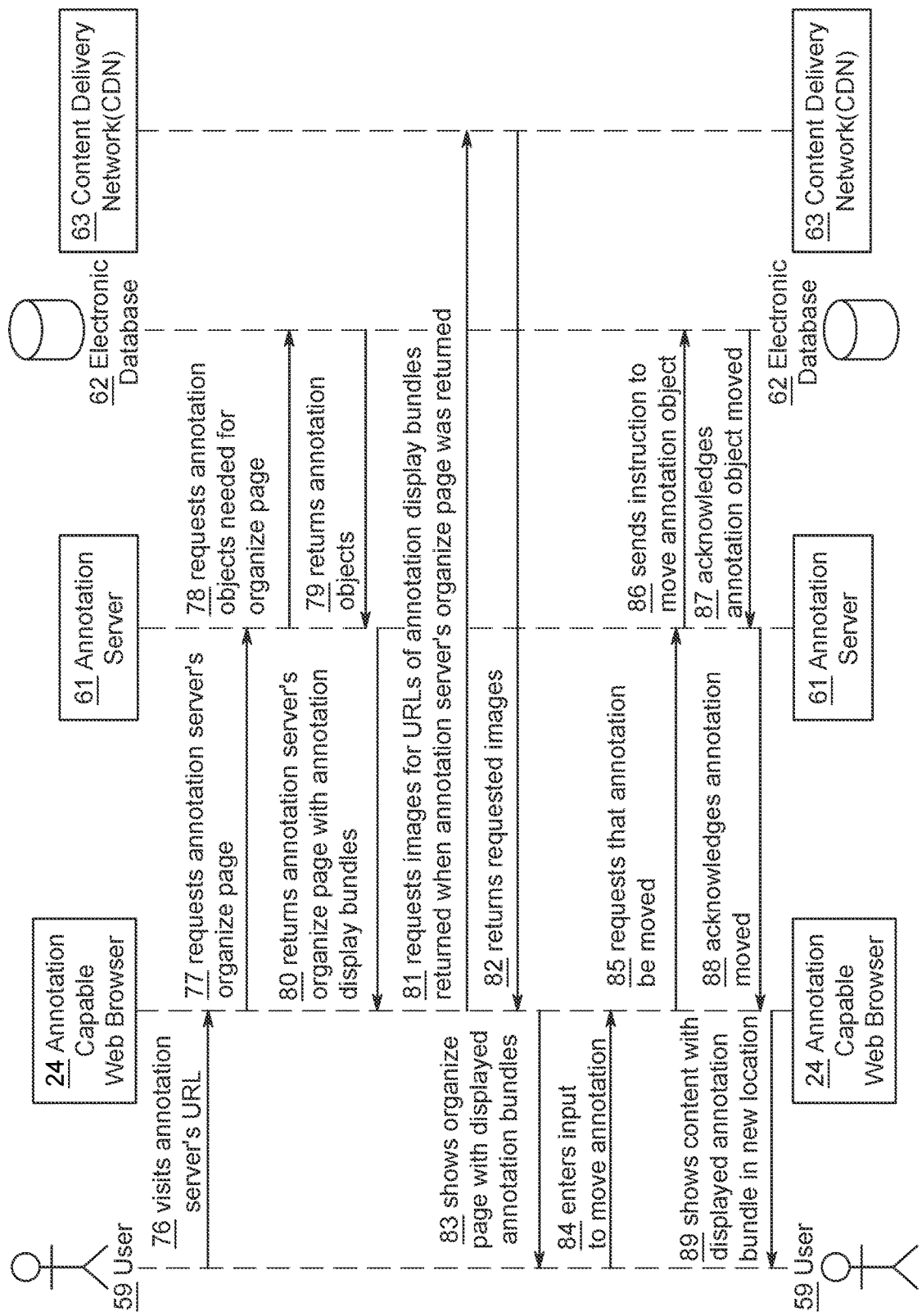
FIG. 15 presents a sequence diagram showing the communication between the web browser, the annotation server, the electronic database, and the CDN for the purpose of organizing annotations.

FIG. 15 shows a sequence diagram that applies to a class of exemplary embodiments. For FIG. 15 to specify the details of an exemplary embodiment, the annotation display bundles and displayed annotation bundles need to be specified. In addition, FIG. 15 can apply to an exemplary embodiment where annotation display bundles are replaced by screenshot display bundles, and displayed annotation bundles are replaced by displayed screenshot bundles. In this case, the screenshot display bundles, with the data elements to include, need to be specified, and the mechanism of retrieving deliverable screenshots should also be specified. The user interface diagrams, data elements described for screenshot bundles, and the considerations previously discussed can be used to specify annotation display bundles and displayed annotation bundles. A displayed screenshot bundle is typically used when there is an annotation highlight and marked screenshot without an annotation comment. A displayed annotation screenshot bundle is used when there is a marked screenshot, annotation highlight, and annotation comment. In FIG. 15, a sequence diagram shows interactions between the user [59], annotation capable web browser [24], annotation server [61], electronic database [62], and content delivery network [63]. After user [59] visits annotation server's URL [76], annotation capable web browser [24] requests annotation server's organize page [77] from the annotation server [61], which requests annotation objects needed for organize page [78] from the electronic database [62], which returns annotation objects [79] to the annotation server [61]. Then, the annotation server [61] returns annotation server's organize page with annotation display bundles [80] to the annotation capable web browser [24], which request images for URLs of annotation display bundles returned when annotation server's organize page was returned [81]. Finally, the content delivery network [63] returns requested images [82] to the annotation capable web browser [24], which shows organize page with displayed annotation bundles [83] to the user [59]. Next, the user [59] enters input to move annotation [84] in the annotation capable web browser [24], which requests that annotation be moved [85] by the annotation server [61], which sends instruction to move annotation object [86] to the electronic database [62]. In response, the electronic database [62] acknowledges annotation object moved [87] to the annotation server [61], which acknowledges annotation moved [88] to the annotation capable web browser [24], which shows content with displayed annotation bundle in new location [89] to the user [59].

The displayed annotation screenshot bundles or annotation item boxes are created using the the data in the annotation screenshot display bundles sent from the annotation server [61], as shown in some of the figures. The annotation screenshot display bundle is created using the data in the annotation objects retrieved from the electronic database [62], as shown in some of the figures. When viewing pages of annotations in a screenshot bundles viewing area like the item bin [44] of the annotation organization context area [43] of the organize web page as shown in the exemplary embodiment in FIG. 10, the data sent by the annotation server [61] is a page of thumbnail display bundles. These thumbnail display bundles include at least the deliverable screenshot for the thumbnail marked screenshot in the storage group of the annotation object stored in the electronic database [62]. FIG. 9 can be used for illustrative purposes. In the exemplary embodiment, the thumbnail display bundles also contain data, in a readable form that can be displayed by a web browser, representing the separate context annotation highlighted text [38], separate context annotation comment [40], and separate context question displayed annotation symbol [39]. Furthermore, the separate context annotation highlighted text [38] and the separate context question displayed annotation symbol [39] are color-coded. All these pieces of data working together give the user more information at a glance. The displayed annotation screenshot bundle can also be shown in an annotation details web page to provide more detailed information about one annotation along with remarks and replies from many users about that annotation.

Figure 16:
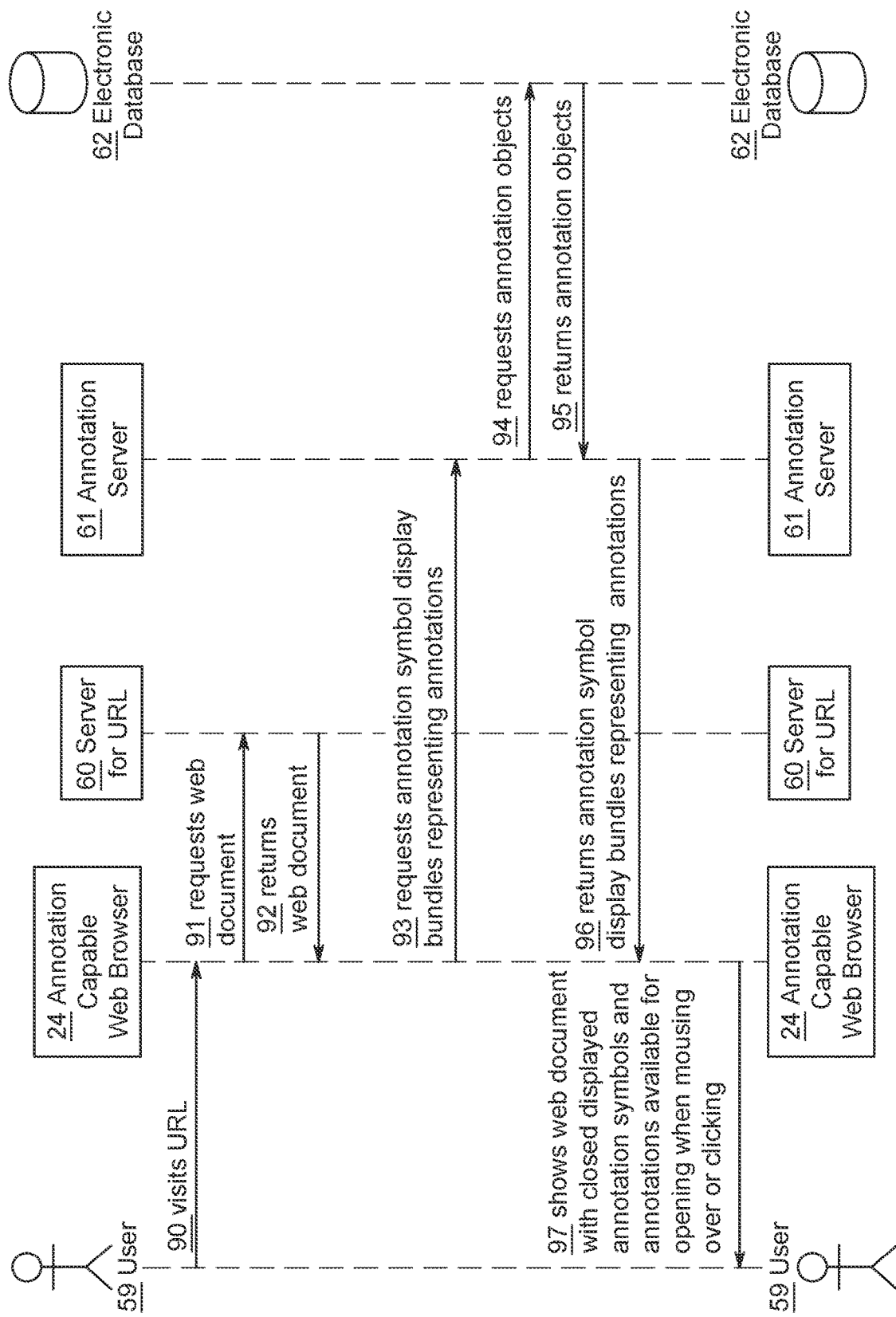
FIG. 16 presents a sequence diagram showing the communication between the annotation capable web browser, the web server that provides the data of the visited URL, the annotation server, and the electronic database.

FIG. 16 shows a sequence diagram that applies to a class of exemplary embodiments. For FIG. 16 to explicitly specify an exemplary embodiment, the annotation symbol display bundles and corresponding displayed annotation symbol bundles, with the data elements to include along with the visual appearance, need to be specified. The user interface diagrams, data elements described for annotation symbol bundles, and the considerations previously discussed can be used to make this specification. In FIG. 16, a sequence diagram shows interactions between the user [59], annotation capable web browser [24], server for URL [60], annotation server [61], and electronic database [62]. After user [59] visits URL [90], annotation capable web browser [24] requests web document [91] from the server for URL [60], which returns web document [92] to annotation capable web browser [24]. Next, the annotation capable web browser [24] requests annotation symbol display bundles representing annotations [93] from the annotation server [61], which requests annotation objects [94] from the electronic database [62]. Afterwards, the electronic database [62] returns annotation objects [95] to the annotation server [61], which returns annotation symbol display bundles representing annotations [96] to the annotation capable web browser [24], which shows web document with closed displayed annotation symbols and annotations available for opening when mousing over or clicking [97].

Figure 17:
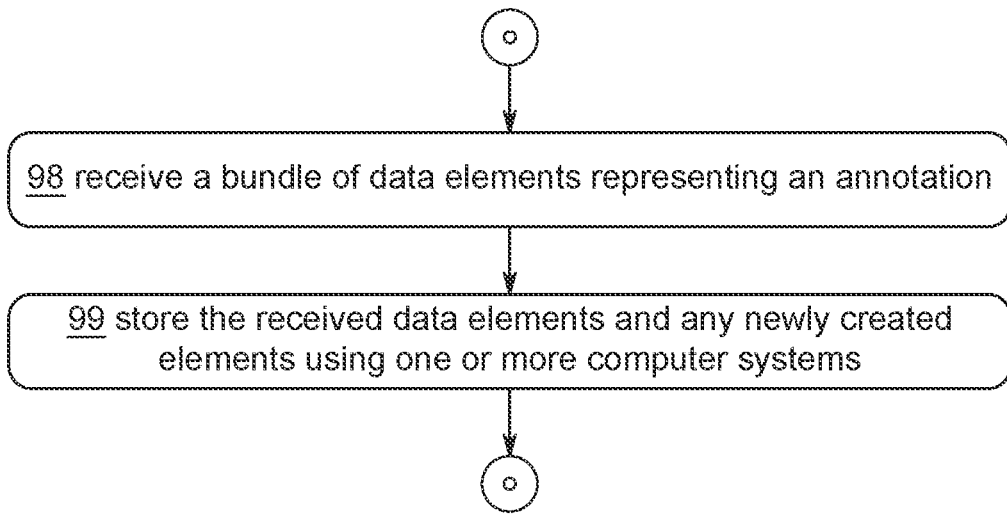
FIG. 17 presents a flow chart showing the receipt and storage of a bundle of data elements.

FIG. 17 shows a flow chart that applies to a class of exemplary embodiments. A specific exemplary embodiment can be specified if the bundle of data elements that is received and stored is precisely specified. For example, we can explicitly specify a screenshot bundle with all its data elements, or we can explicitly specify an annotation symbol bundle with all its elements. In this case, the screenshot bundle or the annotation symbol bundle are the bundle of data elements that are received. Furthermore, the storage set and the storage mechanism of the deliverable screenshots should be specified if the bundle of data elements contains a marked screenshot. These details help illustrate an implementation. In an exemplary embodiment, the storage set can include a marked screenshot for display on large monitors, laptops, tablets, and phones as well as a thumbnail marked screenshot for item boxes. The exact sizes can be adjusted to the most prevalent sizes of these displays currently in use. Furthermore, the server, in a client-server architecture, will receive a bundle of data elements representing an annotation [98] and store the received data elements and any newly created elements using one or more computer systems [99] in order to satisfy requests made by the annotation capable web browser of a client device of a user creating an annotation or a simple highlight. In FIG. 17, a flowchart of a method implemented by one or more computer systems representing the server in a client-server architecture is shown. This method is implemented by a server to enable the sharing of data that may be requested by the client user interface of the same client or a different client. The steps of this method are receive a bundle of data elements representing an annotation [98] and store the received data elements and any newly created elements using one or more computer systems [99].

Figure 18:
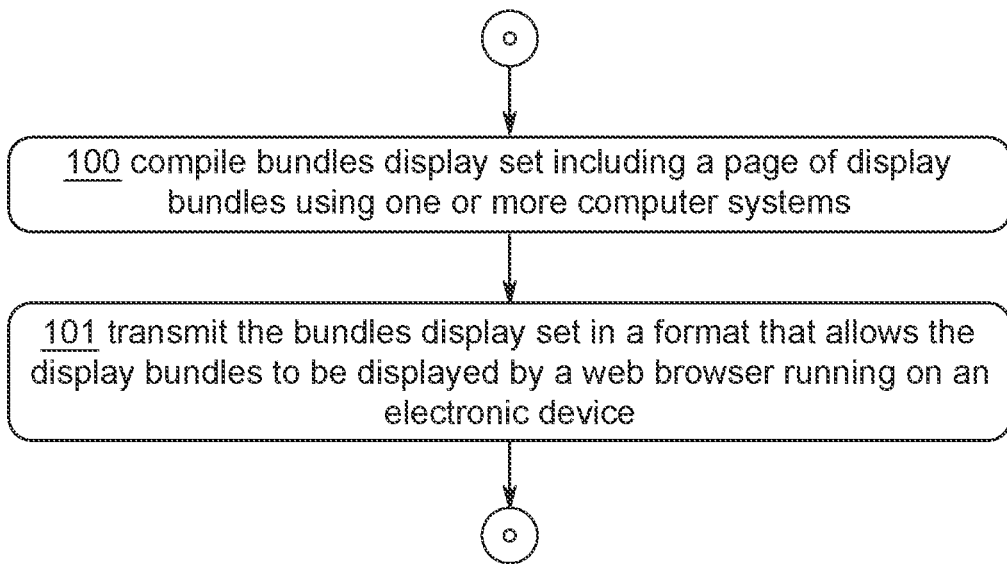
FIG. 18 presents a flow chart showing the compilation and transmission of a bundles display set.

FIG. 18 shows a flow chart that applies to a class of exemplary embodiments. A specific exemplary embodiment can be specified if the data elements included in the bundles display set are precisely specified. This means specifying the data elements in a display bundle. In an exemplary embodiment, the display bundles can be screenshot display bundles or annotation symbol display bundles. If the display bundles are screenshot display bundles, the the bundles display set would be a screenshot bundles display set in FIG. 18. If the display bundles are annotation symbol display bundles, the the bundles display set would be an annotation symbol bundles display set in FIG. 18. Furthermore, the server, in a client-server architecture, will compile bundles display set including a page of display bundles using one or more computer systems [100] and transmit the bundles display set in a format that allows the display bundles to be displayed by a web browser running on an electronic device [101] in order to satisfy requests made by the annotation capable web browser running on a client device of a user viewing a page of annotations within a web document or a separate context area. The flowchart shown in FIG. 18 is implemented by one or more computer systems.

FIG. 19 shows a flowchart that applies to a class of exemplary embodiments. A specific exemplary embodiment can be specified once the bundle of data elements is explicitly specified. For example, we can explicitly specify a screenshot bundle with the data elements to include, or we can explicitly specify an annotation symbol bundle with the data elements to include. In FIG. 19, a flowchart of annotation creation is presented showing the steps carried out by the instruction set of the web browser extension that in the exemplary embodiment transforms a web browser, supporting the addition of browser extensions, into an annotation capable web browser [24], as shown in some of the figures. FIG. 19 shows the steps carried out by the user [59], web browser [102], web browser extension content script [103], and web browser extension background script [104] when creating an annotation. The user [59] opens browser [105], and then web browser [102] loads browser extension [106]. Next, the user [59] visits URL [107], and then web browser [102] loads data sent from visited URL [108] and injects content script [109]. Now, the user [59] views web page [110] and highlights text [111]. At this point, web browser extension content script [103] makes annotation symbol selection button bar available [112] as a result of the execution of the instructions in the web browser extension. Next, the user [59] presses button corresponding to one annotation symbol on annotation symbol selection button bar [113], and the web browser extension content script [103] makes annotation input box available [114] in response. Next, the user [59] enters text and hits enter [115], and the web browser extension content script [103] sends bundle of data elements to background script [116]. At this point, the web browser extension background script [104] receives bundle of data elements from content script [117] and sends bundle of data elements to annotation server [118].

In FIG. 19, after the user [59] enters text and hits enter [115], the web browser extension content script [103] should generate either an annotation symbol bundle or a screenshot bundle. The exemplary embodiment may require an annotation symbol bundle to include a marked screenshot. If the marked screenshot is generated on the server-side, the web page may have to be rerendered, or a screenshot may have to be marked. Doing this would be computationally intensive and error-prone. Generating the marked screenshot using the browser extension does not encounter these problems. The browser extension should ensure that the user's privacy is protected. Screenshots should not include the desktop or other browser tabs. Furthermore, in the exemplary embodiment, the screenshot should be marked with the annotation highlighted text [27] and the annotation comment box [31]. The annotation highlighted text [27] and the annotation comment box [31] appear in FIG. 7, which may be helpful for illustrative purposes in this case. In the exemplary embodiment, a simple delay can be implemented before a screenshot is taken. This delay should be sufficient to ensure the annotation highlighted text [27] and the annotation comment box [31] are present on most devices. In an alternative exemplary embodiment, a more performant method can be implemented, wherein the web browser extension content script [103] searches for the presence of the annotation highlighted text [27] and the annotation comment box [31] in the documents DOM structure and takes a screenshot once these elements are present. The searches for the presence of the annotation highlighted text [27] and the annotation comment box [31] in the documents DOM structure would occur at periodic intervals at a timescale that is shorter than the simple delay time previously discussed. In an exemplary embodiment, the periodic interval could be one third of the length of the simple delay that would have been chosen.

FIG. 20 shows a flowchart that applies to a class of exemplary embodiments. A specific exemplary embodiment can be specified once the displayed annotation symbol bundle is explicitly specified with all its data elements. In FIG. 20, a flowchart of viewing annotations is presented showing the steps carried out by the instruction set of the web browser extension that in the exemplary embodiment transforms a web browser, supporting the addition of browser extensions, into an annotation capable web browser. FIG. 20 shows the steps carried out by the user [59], web browser [102], web browser extension content script [103], and web browser extension background script [104] when viewing an annotation. The user [59] opens browser [119], and the web browser [102] loads browser extension [120]. Next, the user [59] visits URL [121], and then web browser [102] loads data sent from visited URL [122] and injects content script [123]. Now, the web browser extension background script [104] fetches annotation symbol display bundles representing annotations for URL [124] and sends annotation symbol display bundles to content script [125]. Now, the web browser extension content script [103] receives annotation symbol display bundles from background script [126] and displays annotation symbols in closed state on web page [127]. Now, the user [59] views web page with closed displayed annotation symbols [128] and clicks on a closed displayed annotation symbol [129]. In response, the web browser extension content script [103] displays the annotation symbol in open form [130]. Next, user [59] views web page with selected displayed annotation symbol in open form [131].

Figure 33:
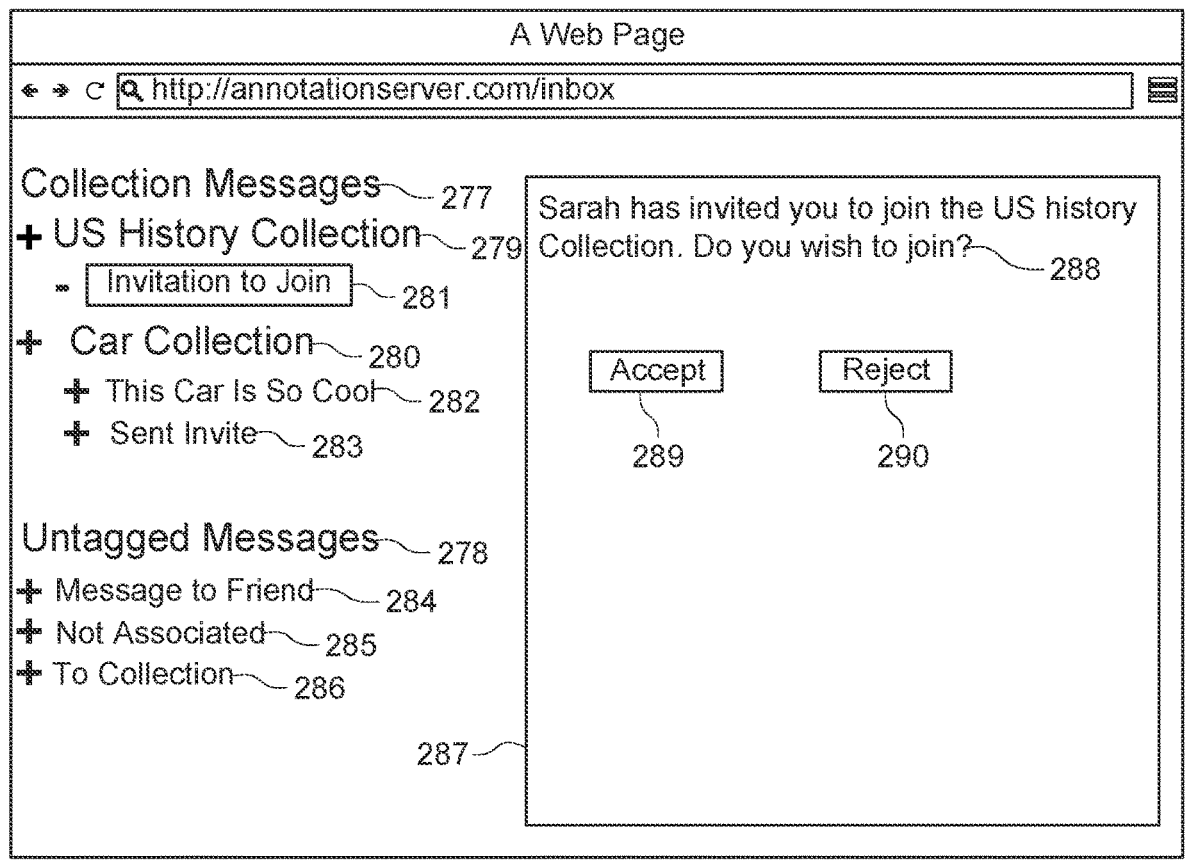
FIG. 33 presents an exemplary embodiment of the inbox page showing a system message.

In the exemplary embodiment depicted in FIG. 31, the collection items web page is shown. The collection items page context area [258] is a display area for the displayed items, collection items paging mechanism [259], collection items search filter [260], and collection actions menu trigger [261]. The collection actions menu [262] shows the send message to collection option [263], invite user option [264], and change user permissions option [265]. The collection actions menu trigger [261] is used to trigger the collection actions menu [262]. The collection items paging mechanism [259] can be used to change the page of displayed collections displayed in the collection items page context area [258]. The send message to collection option [263] creates a message chain with a first text message and sends it to members of the collection that have the readable permission or greater for the collection. The message chain appears in the user's inbox. An exemplary embodiment of the user's inbox is depicted in FIG. 33. In the exemplary embodiment in FIG. 33, a US History collection message chain [281] is shown. A message sent to members of that collection using the send message to collection option [263] will appear in the inboxes of recipients categorized under the collection to which messages were sent. All members of the collection that have a readable permission or greater will be able to read the message, and all members that have the messageable permission and greater will be able to respond. The invite user option [264] can be used to invite new users to the collection. The invitations are sent to the invited user's inbox. The change user permissions option [265] can be used to change the permissions of a member of that collection. Notifications, in the form of a message in a message chain, of the change may be sent to the inbox of the user whose permissions were changed.

Collection item filters such as the collection items search filter [260] shown in the exemplary embodiment in FIG. 31 are used to receive inputs from users. In the case of the collection items page context area [258] collection items search filter [260], it is a collection items search phrase. These inputs are translated into collection item parameter values sent to the annotation server [61], as shown in some figures. These collection item parameter values are used by the annotation server [61] to input collection item parameters into a collection item request query that is used by the electronic database [62], as shown in some figures. The collection item request query includes collection item parameter values and a collection item page number. The collection item request query with collection item parameter values is used to specify a set of collection items and a sequential ordering on those collection items. The collection item page number specifies a specific collection item page.

Furthermore, the collection item request query may include a specified number of collection items that are to be sent to the web browser running on the client electronic device. This collection item request query contains collection item parameters for collection item filter values such as collection item search phrase and an exclusion list of collection items to exclude from the specified list of collection items and a sequential ordering on that list of collection items.

In the exemplary embodiment depicted in FIG. 32, the collections web page is shown. The collections page context area [266] is a display area for the displayed collections, collections page paging mechanism [267], collections page search filter [268], and collections page actions menu trigger [269]. The collections page actions menu [270] shows the owned filter option [271], adminable filter option [272], writeable filter option [273], messageable filter option [274], readable filter option [275], and subscribed filter option [276]. The collections page actions menu trigger [269] is used to trigger the collections page actions menu [270]. The collections page paging mechanism [267] can be used to change the web page of displayed collections displayed in the collections page context area [266]. The owned filter option [271], adminable filter option [272], writeable filter option [273], messageable filter option [274], readable filter option [275], and subscribed filter option [276] filter the collections based on the users permissions. The owned permission is the highest level permission, and the owned permission is given to the creator and owner of the collection. The owned permission allows the user to give other users admin permissions on that collection and do anything the lower level permissions allow. The admin permission is lower than the owned permission and allows users to raise the permissions of non-admins and handle other administrative tasks as well as do anything the lower level permissions allow. The writeable permission is lower than the admin permission and allows users to add items to a collection and do anything the lower level permissions allow. The messageable permission is lower than the writeable permission and allows the user to send messages to other members of the collection and do anything the readable permission allows. The readable permission is lower than the messageable permission and allows the user to view all items in the collection and read all collection messages for that collection. The subscribed permission gives a user the readable permissions on a public collection. The subscribed permission is typically granted without admin intervention to a user that requests the permission since the collection and associated messages are public. To allow users to visualize privacy settings, background colors are assigned based on colors. Colors associated with a shorter wavelength imply greater permissions, and colors with a longer wavelength imply lesser permissions. In other words, colors of a rainbow are associated to permissions. Purple corresponds to owned collections. Blue corresponds to adminable collections. Green corresponds to writeable collections. Yellow corresponds to messageable collections. Orange corresponds to readable collections. And, red corresponds to subscribed collections. For the purpose of design, pastel variants of these colors may be used. Or, another set of backgrounds signifying a spectrum of values can be used. These backgrounds apply to the displayed collections in the exemplary embodiment in FIG. 32. For the exemplary embodiment in FIG. 31, the background of the web page is changed to correspond to the color associated with the permissions of that collection.

In an exemplary embodiment, to facilitate going through a large number of items including annotations that are in a single collection, annotations can be grouped into stacked sets of displayed annotation items. Such stacked sets of displayed annotation items appear as a single item, with the visual appearance of items that are stacked. It is beneficial to place annotations from the same URL, up to 9 annotations or another fixed configurable value, displayed annotation items, in a stacked set of displayed annotation items. In order to facilitate such a display, the paging mechanism should support the return of items in this format. As an illustration, imagine that 8 out of the 10 items are annotation items that belong to the same URL. Once these 8 items are grouped into a stacked set of displayed annotation items, there are 3 items in the collection items page. In order to ensure that 10 items are present even when stacked sets of displayed annotation items are used, more items need to be returned by the annotation server [61]. In the exemplary embodiment, a relational database [246] is used, and a complex structured query language (SQL) query using windowing functions may be required. Typically, object-relational mapping (ORM) systems are used by most modern web frameworks to access the relational database [246]. In the exemplary embodiment, the ORM system did not handle windowing functions. To overcome this limitation, an underlying relational algebra library that is used by the ORM system was used. Using this relational algebra, a complex SQL query using the appropriate windowing functions was generated. This allows the display of collection items pages with stacked sets of displayed annotation items.

Collection filters such as the collections page search filter [268] shown in the exemplary embodiment in FIG. 32 are used to receive inputs from users. In the case of the collections page context area [266] collections page search filter [268], it is a collections search phrase. These inputs are translated into collection parameter values sent to the annotation server [61], as shown in some of the figures. These collection parameter values are used by the annotation server [61] to input collection parameters into a collection request query that is used by the electronic database [62], as shown in some of the figures. The collection request query includes collection parameter values and a collection page number. The collection request query with collection parameter values is used to specify a set of collections and a sequential ordering on those collections. The collection page number specifies a specific collection page. Furthermore, the collection request query may include a specified number of collections that are to be sent to the web browser running on the client electronic device. This collection request query contains collection parameters for collection filter values such as collection search phrase and an exclusion list of collections to exclude from the specified list of collections and a sequential ordering on that list of collections.

In the exemplary embodiment depicted in FIG. 33, the inbox page is shown. The collection message chains section and title [277] includes the US History collection message chains section and title [279] and car collection message chains section and title [280]. Collection message chains are message chains associated with a collection. These collection message chains occur in the "Collection Messages" section under the name of the collection to which the collection message chain belongs. In this exemplary embodiment, the US History collection message chains section and title [279] lists US History collection message chain [281], and the car collection message chains section and title [280] lists car collection message chain one [282] and car collection message chain two [283]. Untagged message chains are those message chains that are not associated to any collection. Untagged message chains appear in the "Untagged Messages" section. In the exemplary embodiment, the untagged message chains section and title [278] includes untagged message chain one [284], untagged message chain two [285], and untagged message chain three [286]. When a user clicks on a message chain, the message chain appears in the message chain context area [287]. In the message chain context area [287], the US History message chain's first system message [288] is shown with the system message accept button [289] and the system message reject button [290]. The user can press system message accept button [289] to accept the invitation to join the collection, or the user can press system message reject button [290] to reject the invitation to join the collection.

In the exemplary embodiment depicted in FIG. 34, the inbox page is shown after the user accepts the invitation to join the collection. The system message notification [291] shows that the user accepted the invitation to join the collection. The message chain message divider [292] separates the messages of one user from the messages of another user. It should also be clear to those persons having ordinary skill in the art that the message chain message divider [292] can be implemented using a variety of visual design techniques to separate the messages of one user from the messages of another user in this context. Next, US History message chain's first text message [293], US History message chain's second text message [294], and US History message chain's third text message [295] are shown. And, message composition section and title [296] is shown along with the message composition box [297] and message send button [298]. This inbox has a permission management system and connection to collections. When a user is granted permission to a message chain, all other messages in the message chain are visible even if the user didn't originally have access when the message chain was created. This facilitates discussion, and access is controlled at the level of a message chain. Furthermore, system message chains typically ensure that admins of the collection are informed about the activities and permissions of members of the group. In addition, users with messageable permissions can send a message chain with a single message to users in a collection or to a select group of people within the collection. Being able to create a collection chain helps clarify the subject of the discussion and direct user's attention to collections or tasks that the user wants to focus on doing.

The inbox is an effective means of inviting users to collections if the user is already on the site. The inbox is also effective for sharing items with others if the user is already on the site. To facilitate item and collection sharing when a user is not on the site, links with cryptographic hashes are used. These links cannot be guessed, and a user that has the link does not need to create an account in order to access the link. Simply possessing the link is sufficient for sharing. In addition, public items including annotations and collections can be shared through social media sites.

In FIG. 21, a flowchart is shown of a nurse using an exemplary embodiment of the annotation capable web browser [24], as shown in some of the figures, with notepad functionality. The nurse wants to teach a patient that rice is not good for diabetics and then show the patient that a favorite dish can be modified to make it more friendly for diabetics. Once this notepad is created, it can be shared with patients. The nurse on day one [132] visits glycemic index Wikipedia page and highlights "American Diabetes Association supports" and creates check annotation along with annotation comment stating, "Most doctors strongly believe that high glycemic index foods have a negative impact on the health of diabetics." [134] and adds annotation to notepad [135]. Next, the nurse visits allrecipes.com and finds a dish such as "Flavorful Spanish Rice and Beans" and highlights "1 cup uncooked white rice" and creates exclamatory annotation along with annotation comment stating, "The glycemic index of rice is very high, but it's possible to make this same recipe with pearled barley." [136] and adds annotation to notepad [137]. Afterwards, the nurse visits Harvard Health website and finds page for glycemic index of 100+ foods and highlights "White rice boiled*" with exclamatory annotation and states, "Most people don't realize that white rice has such a high glycemic index. Notice that it is 73, which is higher than most foods." [138] and adds annotation to notepad [139]. Next, the nurse visits Harvard Health website and finds page for glycemic index of 100+ foods and highlights "Pearled Barley" with dagger annotation and states, "Most people don't realize that pearled barley has such a low glycemic index. Notice that it is 28, which is lower than most foods." [140] and adds annotation to notepad [141]. Afterwards, the nurse visits Target website and finds product page for pearled barley and selects "Pearled Barley—1 lb—Market Pantry" with dagger annotation and states, "Pearled Barley can be made in a rice cooker just like rice. Furthermore, cooked pearled barley has a grain like appearance and feel that makes it a perfect replacement for rice. This can be substituted for rice in recipes that call for rice."; can be substituted for rice in recipes that call for rice." [142] and adds annotation to notepad [143]. After the notepad is created, the nurse on day two [133] shares notepad with a patient that is diabetic and likes to make Spanish Rice [144].

In FIG. 22, a flowchart is shown of a patient using an exemplary embodiment of the annotation capable web browser [24] with notepad functionality to view a notepad created by a nurse. The patient on day two [145] opens notepad link and clicks first displayed annotation screenshot bundle embedded in notepad [147] and reads Glycemic Index Wikipedia title and reads highlighted text "American Diabetes Association supports" after observing checkmark displayed annotation symbol and then reads the annotation comment, "Most doctors strongly believe that high glycemic index foods have a negative impact on the health of diabetics." [148]. Next, the patient clicks second displayed annotation screenshot bundle embedded in notepad [149] and reads allrecipes.com title "Flavorful Spanish Rice and Beans" and then reads the highlighted text "1 cup uncooked white rice" after seeing the exclamatory displayed annotation symbol and then reads the annotation comment, "The glycemic index of rice is very high, but it's possible to make this same recipe with pearled barley." [150]. Afterwards, the patient clicks third displayed annotation screenshot bundle embedded in notepad [151] and reads Harvard Health website title "Glycemic Index of 100+ Foods" and then reads highlighted text "White rice boiled*" after seeing the exclamatory displayed annotation symbol and then reads the annotation comment, "Most people don't realize that white rice has such a high glycemic index. Notice that it is 73, which is higher than most foods." [152]. Next, the patient clicks fourth displayed annotation screenshot bundle embedded in notepad [153] and reads Harvard Health website title "Glycemic Index of 100+ Foods" and then reads highlighted text after seeing the dagger displayed annotation symbol and then reads "Pearled Barley" and then reads the annotation comment, "Most people don't realize that pearled barley has such a low glycemic index. Notice that it is 28, which is lower than most foods." [154]. Afterwards, the patient clicks fifth displayed annotation screenshot bundle embedded in notepad [155] and reads Target website title and notices it is a product page for pearled barley and reads highlighted text "Pearled Barley—1 lb—Market Pantry" after seeing the dagger displayed annotation symbol and then reads annotation comment stating, "Pearled Barley can be made in a rice cooker just like rice. Furthermore, cooked pearled barley has a grain like appearance and feel that make it a perfect replacement for rice. This can be substituted for rice in recipes that call for rice." [156]. After understanding the contents of the notepad, the patient on grocery shopping day [146] goes to Target and buys Pearled Barley and makes "Flavorful Spanish Barley and Beans" [157].

Figure 23:
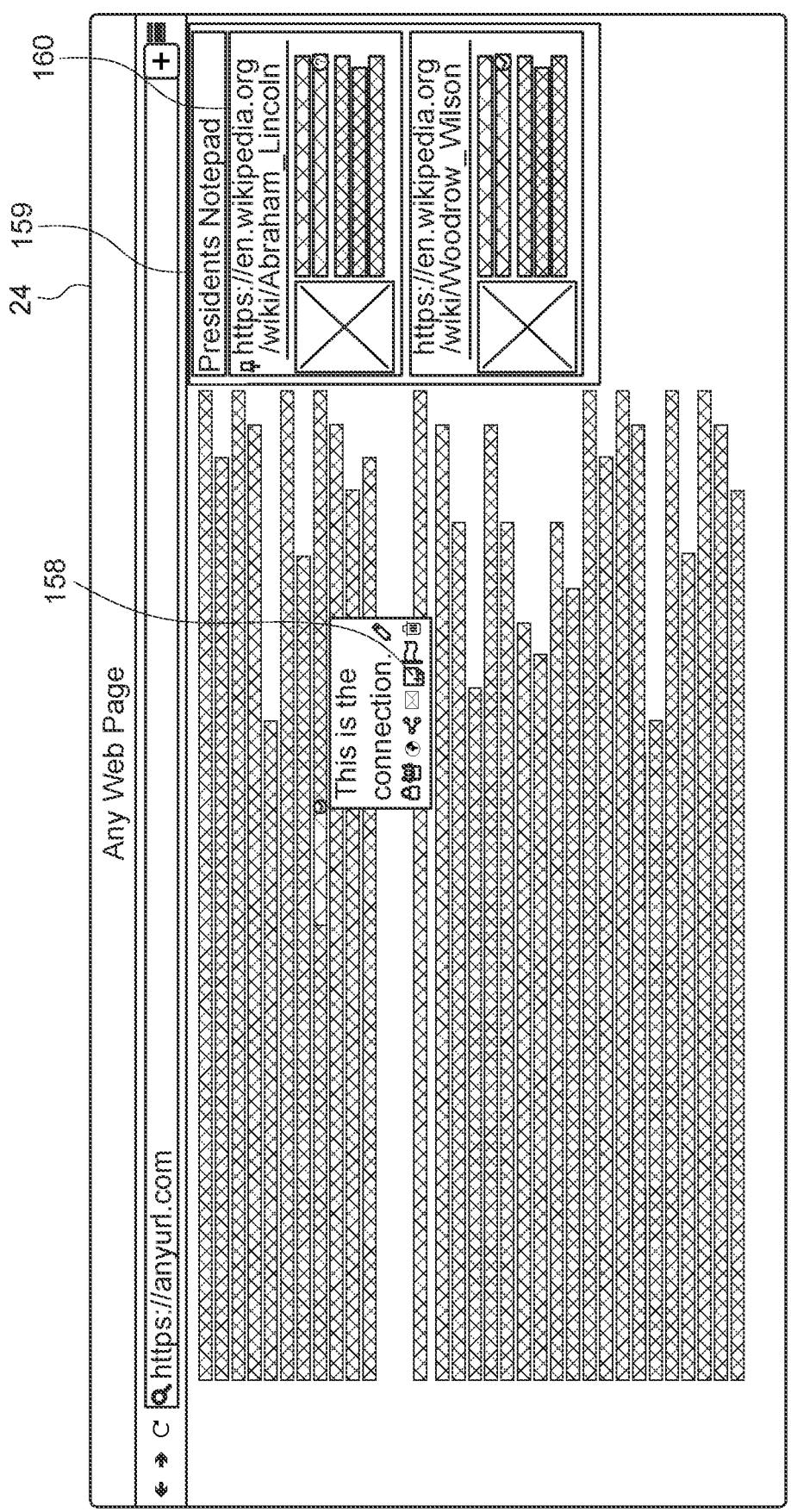
FIG. 23 presents the user interface of the notepad within the extension.

In the exemplary embodiment depicted in FIG. 23, an annotation capable web browser [24] with the notepad feature is presented. The annotation capable web browser with notepad feature tracks whether or not an active notepad is present, and it allows the user to choose the active notepad from a group of notepads accessible to the user. FIG. 23 depicts an active notepad [159] and a notepad embedded annotation [160]. When the active notepad [159] is present, the annotation capable web browser with notepad feature is in the state of active notepad present, and when an active notepad [159] is not present the annotation capable web browser with notepad feature is in the state of active notepad not present. Displayed notepads include many notepad embedded annotation [160]. A notepad embedded annotation [160] is a container that includes a displayed annotation bundle showing the data contained in an annotation display bundle. In the exemplary embodiment, the notepad embedded annotation [160] includes a displayed annotation screenshot bundle that also includes an annotation symbol. In an alternative embodiment, a notepad embedded annotation [160] can include the displayed screenshot bundle without the annotation symbol or annotation comment. A user can add an annotation to a notepad by clicking the add to notepad icon [158] button depicted in FIG. 23. A notepad includes a list of references to annotation objects. The electronic database [62], as shown in some of the figures, stores notepad objects along with the list of references to annotation objects. The annotation server [61], as shown in some of the figures, retrieves the notepad object and annotation objects from electronic database [62] and sends the notepad to the annotation capable web browser [24] when it receives a request from the annotation capable web browser [24]. Once an active notepad [159] is shown as a displayed notepad; a user can navigate to an annotation simply by clicking on a notepad embedded annotation [160] as depicted in notepad embedded annotation [160] in FIG. 23. In a class of exemplary embodiments, each notepad is associated with a bundles display set. In an exemplary embodiment, each notepad could be associated with a screenshot bundles display set. In another exemplary embodiment, each notepad could be associated with an annotation screenshot bundles display set.

Notepads include a wealth of information through links to other sources along with annotation comments. This information can potentially be augmented by descriptions written by the notepad creator. Using these notepads, presentations can be created in a variety of formats including PDF, Microsoft Word, and a variety of other open source and proprietary document formats. These presentations are created by sequentially including for each annotation, the associated screenshot with marked text [37], separate context annotation highlighted text [38], separate context question displayed annotation symbol [39], and the separate context annotation comment [40] as shown in FIG. 9. In addition, this information can be augmented with text summaries of the linked articles generated using natural language processing techniques along with image captioning techniques. Furthermore, the user can create a written description to add at specified points, and these written descriptions will be in the presentation output.

In the exemplary embodiment depicted in FIG. 24, a sequence diagram shows, in the exemplary embodiment, interactions between the user [59], annotation capable web browser with notepad feature [161], server for URL [60], annotation server [61], electronic database [62], and content delivery network [63] for the purpose of creating a notepad. First, the user [59] visits URL [162] in annotation capable web browser with notepad feature [161], which requests web document [163] from server for URL [60], which returns web document [164] to annotation capable web browser with notepad feature [161], which shows web document [165] to user [59]. Next, the user [59] enters input to create "Flavorful Spanish Barley and Beans" notepad [166] in annotation capable web browser with notepad feature [161], which sends request to create "Flavorful Spanish Barley and Beans" notepad [167] to annotation server [61], which sends instruction to create notepad object [168] to the electronic database [62]. Then, the electronic database [62] acknowledges creation of notepad object [169] to annotation server [61], which acknowledges creation of notepad [170] to annotation capable web browser with notepad feature [161], which shows displayed notepad [171] to user [59]. Next, the user [59] enters input to create glycemic index annotation [172], which sends annotation screenshot bundle [173] to the annotation server [61], which sends images for storage if required [174] to the content delivery network [63]. The content delivery network [63] returns URLs for stored images [175] to annotation server [61], which sends instruction to create glycemic index annotation object with CDN URLs [176] to the electronic database [62]. Next, the electronic database [62] acknowledges annotation object creation [177] to annotation server [61], which acknowledges annotation screenshot bundle received and sends annotation screenshot display bundle [178] to annotation capable web browser with notepad feature [161], which shows displayed annotation screenshot bundle [179] to user [59]. Next, the user [59] adds glycemic index annotation to notepad [180] in annotation capable web browser with notepad feature [161], which requests glycemic index annotation object reference be added to notepad [181] by the annotation server [61], which sends instructions to add glycemic index annotation object reference to notepad object [182] to the electronic database [62]. Then, the electronic database [62] acknowledges annotation object reference addition [183] to the annotation server [61], which acknowledges glycemic index annotation object reference addition to notepad [184] to the annotation capable web browser with notepad feature [161], which shows web document with notepad at side with displayed annotation screenshot bundle added [185] to the user [59].

In the exemplary embodiment depicted in FIG. 25, a sequence diagram shows, in the exemplary embodiment, interactions between the user [59], annotation capable web browser with notepad feature [161], server for URL [60], annotation server [61], electronic database [62], and content delivery network [63] for the purpose of viewing a notepad. First, the user [59] visits any URL [186] in annotation capable web browser with notepad feature [161], which requests "Flavorful Spanish Barley and Beans" notepad [187] from the annotation server [61], which requests notepad object [188] from the electronic database [62]. Then, the electronic database [62] returns notepad object [189] to the annotation server [61], which returns notepad [190] to the annotation capable web browser with notepad feature [161]. Next, the annotation capable web browser with notepad feature [161] requests glycemic index annotation screenshot display bundle with annotation symbol data [191] from the annotation server [61], which requests glycemic index annotation object [192] from the electronic database [62], which returns annotation object with CDN URLs [193] to the annotation server [61], which returns annotation screenshot display bundle with CDN URLs and annotation symbol data [194] to the annotation capable web browser with notepad feature [161]. Next, the annotation capable web browser with notepad feature [161] requests images from CDN using CDN URLs [195] from the content delivery network [63], which returns images from CDN for the specified URLs [196] back to the annotation capable web browser with notepad feature [161], which shows displayed notepad [197] to the user [59]. Next, the user [59] clicks first displayed annotation screenshot bundle [198] in the annotation capable web browser with notepad feature [161], which requests web document [199] from the server for URL [60], which returns web document [200] back to the annotation capable web browser with notepad feature [161], which shows displayed annotation symbol in open state on web document [201]. Then, the annotation capable web browser with notepad feature [161] shows web document, with notepad at side with displayed annotation symbol in open state and browser scrolled to appropriate location [202], to the user [59].

In the exemplary embodiment depicted in FIG. 26, a flowchart of notepad creation is presented showing the steps carried out by the instruction set of the web browser extension that in the exemplary embodiment transforms a web browser, supporting the addition of browser extensions, into an annotation capable web browser with the notepad feature. The user [59] opens browser [203], and then the web browser [102] loads browser extension [204]. Next, the user [59] visits URL [205]. Afterwards, the web browser [102] loads data sent from visited URL [206] and injects content script [207]. Afterwards, the user [59] views web page [208] and creates notepad [209]. As a result, the web browser extension content script [103] creates notepad [210], and then web browser extension background script [104] sends request to annotation server to create notepad [211]. Next, the web browser extension content script [103] shows displayed notepad [212], and the user [59] views displayed notepad and adds already created annotation to notepad [213]. Afterwards, the web browser extension content script [103] adds already created annotation to notepad [214], and the web browser extension background script [104] sends request to add annotation object reference to notepad to annotation server [215].

In the exemplary embodiment depicted in FIG. 27, a flowchart of notepad viewing is presented showing the steps carried out by the instruction set of the web browser extension that in the exemplary embodiment transforms a web browser, supporting the addition of browser extensions, into an annotation capable web browser with the notepad feature. The user [59] opens browser [216], and the web browser [102] loads browser extension [217]. Afterwards, the user [59] visits any URL [218]. Next, the web browser [102] loads data sent from visited URL [219] and injects content script [220]. Afterwards, the user [59] opens notepad [221], and the web browser extension content script [103] requests notepad [222]. Next, the web browser extension background script [104] requests from annotation server notepad with annotation screenshot display bundles and annotation symbol data for all corresponding annotation objects in the notepads list of references to annotation objects [223], and the web browser extension content script [103] shows displayed notepad [224]. Afterwards, the user [59] views displayed notepad and clicks first displayed annotation screenshot bundle [225], and the web browser extension content script [103] sends message to browser to visit URL [226]. Then, the web browser [102] visits URL [227] and loads data sent from URL [228]. Next, the web browser extension background script [104] requests additional annotation object information from annotation server such as annotation comment replies [229] and gets additional annotation object information from annotation server [230]. Next, the web browser extension content script [103] shows displayed annotation symbol in open state [231] and scrolls to location of displayed annotation symbol [232]. Afterwards, the user [59] views page scrolled to location of displayed annotation symbol in the open state [233].

Figure 28:
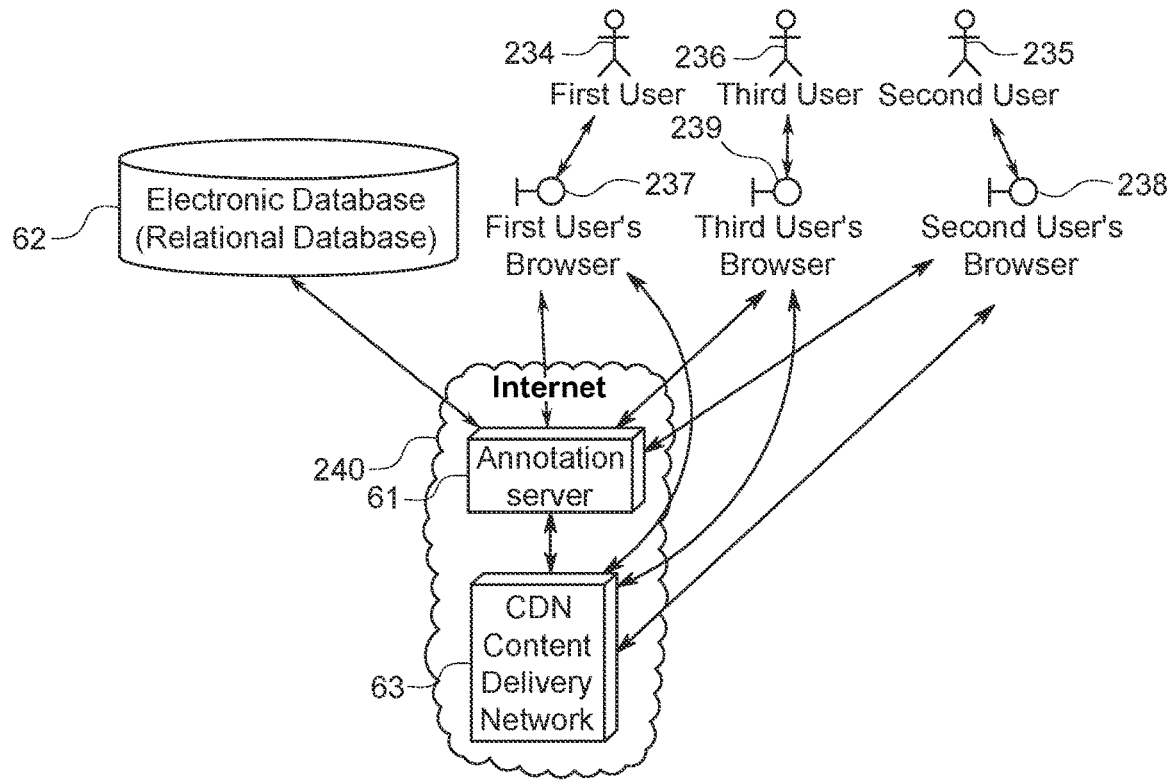
FIG. 28 presents an exemplary embodiment of a system diagram.

In the exemplary embodiment depicted in FIG. 28, a system diagram is presented showing how first user [234], second user [235], third user [236], first user's browser [237], second user's browser [238], third user's browser [239], annotation server [61], content delivery network [63], and electronic database [62] interact. Users communicate with the annotation server [61], which pushes images to the content delivery network [63]. Users also communicate with the content delivery network [63] to get images and other files. Users do not directly communicate with the electronic database [62]. In this exemplary embodiment, the annotation server [61] is placed on one computer system, and the electronic database [62] is placed on a second computer system. Placing the electronic database [62] on the same machine as the annotation server [61] will reduce the number of machines used. A question that should be addressed is the number of simultaneous users of the system. Once this question is addressed, the system can potentially be sized. The content delivery network [63] in this exemplary embodiment is operated by a third party. A content delivery network (CDN) may be offered by a third party. Many third parties offer CDNs. These CDNs can be configured with a web interface, and files can be uploaded and accessed via an application programming interface (API). This API may be a representational state transfer (REST) API. Configuring and using such a third party CDN based on that third party's documentation should be clear to those of ordinary skilled in the art.

Figure 29:
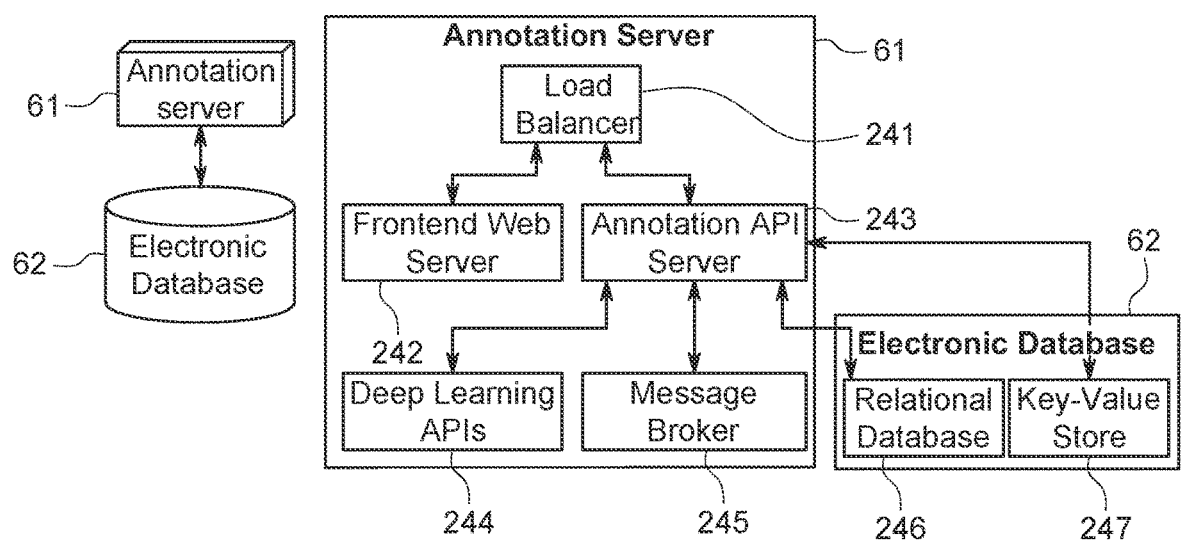
FIG. 29 presents another exemplary embodiment of a component diagram for the annotation server and electronic database.

In the exemplary embodiment depicted in FIG. 29, a component diagram is presented showing how a more robust system can be built that allows different components to be isolated. Separating concerns can be advantageous to improving security and facilitating reproducible software deployment to a network of machines. The added security, separation of concerns, and reproducible deployments can facilitate scaling the system to handle a large number of users. FIG. 29 shows a simple version of the annotation server [61] and the electronic database [62] communicating next to an alternative exemplary embodiment that shows an annotation server [61] including a load balancer [241], frontend web server [242], annotation API server [243], deep learning api [244], and message broker [245]. Also shown is the electronic database [62] including a relational database [246] and a key-value store database [247]. In this exemplary embodiment, the load balancer [241], frontend web server [242], annotation API server [243], deep learning api [244], message broker [245], relational database [246], and key-value store database [247] are each running on a separate machine with one or more central processing units (CPUs), memory, and non-transitory computer readable storage medium. Furthermore, the deep learning api [244] has at least one of a graphical processing unit (GPU), tensor processing unit (TPU), or field-programmable gate array (FPGA). In the exemplary embodiment depicted in FIG. 29, the load balancer [241] machine has one central processing unit (CPU) with 4 cores, 8 GB of random-access memory (RAM), and a 250 GB solid-state drive (SSD), and the frontend web server [242] machine has one CPU with 4 cores, 8 GB of RAM, and a 250 GB SSD. The annotation API server [243] machine has two CPUs with 32 cores in each CPU for a total of 64 cores, 64 GB of RAM, and a 2 TB SSD. The deep learning api [244] machine has one CPU with 32 cores, 128 GB of RAM, two GPUs with 11 GB of RAM each, and a 2 TB SSD. The message broker [245] machine has one CPU with 4 cores, 32 GB of RAM, and a 1 TB SSD. The relational database [246] machine has one CPU with 32 cores, 128 GB of RAM, and a 2 TB SSD, and the key-value store database [247] machine one CPU with 4 cores, 128 GB of RAM, and a 1 TB SSD. Machines meeting these hardware specifications would allow this system to support many users with multiple simultaneous users.

In the exemplary embodiment depicted in FIG. 29, hardware specifications were described. The rationale for these specifications will now be discussed. The load balancer [241] simply routes requests to the appropriate location. As a result, this machine's non-transitory computer readable storage space requirements should be satisfied by a 250 GB SSD. In comparison to computation performed by the rest of the system, the load balancer [241] has lower computational load and lower memory load. As a result, 2 GB per core is sufficient, and 4 cores are sufficient given the rest of the system. As the system scales, CPU cores executing more instructions per second and more CPU cores may help keep the load balancer [241] from being a bottleneck. However, the load balancer [241] is unlikely to be a bottleneck given the specifications that were given for the exemplary embodiment depicted in FIG. 29. The frontend web server [242] also does not require much non-transitory computer readable storage space, many CPU cores, or much memory. This machine does not store user data, and the frontend code it stores can be supported by the allotted storage space. Furthermore, the CPU cores of the frontend web server [242] machine simply transmit requested resources to the user, and the user does not request the frontend code as often as the user's browser makes API calls to the annotation API server [243] during typical usage. As a result, CPU cores for the frontend web server [242] machine have lower computational load and memory requirements than the annotation API server [243] machine. The annotation API server [243] machine has a greater computational load since API requests are made by the web browsers of users during the creation, organization, and viewing of annotations. The annotation API server [243] machine's total compute capacity may become a bottleneck with a large number of simultaneous users. In the exemplary embodiment, this machine has 64 CPU cores and 64 GB of RAM. If the annotation API server [243] code is written in a thread safe manner, 1 GB of RAM per CPU core is sufficient. If the code is not thread-safe or the web framework is memory intensive, it may be advisable to use 2 GB of RAM per CPU core for the annotation API server [243]. To scale the annotation API server [243] to support more users, it will be more cost-effective if more machines are added than to provision each machine with more CPU cores and more RAM. The size of the hard disk for the annotation API server [243] is mainly to allow for the storage of log files. The deep learning api [244] may benefit from 2 GPUs with enough GPU RAM to run deep learning models. The CPU cores and RAM handle CPU intensive data processing steps and to get data into memory for the GPUs to consume. The 2 TB SSD can store large deep learning models and other data for these models. The message broker [245] should operate whenever the system is operational, but it will not face a lack of computational capability. The 32 GB of RAM is present to ensure enough RAM is available for storing large messages that may contain images. Since these images are not stored for long periods of time, 32 GB of RAM is sufficient. Furthermore, 4 cores are sufficient for the message broker [245]. The message broker [245] has lower computational processing requirements in terms of instructions per second than the annotation API server [243] in this exemplary embodiment. The key-value store database [247] uses one core in this exemplary embodiment. However, the key-value store database [247] uses RAM to store in memory reputations of various item objects such as annotation objects and user reputation votes for these item objects. Furthermore, disk space is used for logging and for temporarily storing backups of the key-value store database in memory. The relational database [246] has 128 GB of RAM to ensure all the data in the database can be stored in RAM during operation, has a 2 TB SSD to ensure sufficient storage space is available for logging, and it has 32 cores to provide the computation capability to handle queries sent by the annotation API server [243].

In order to scale the system depicted in the exemplary embodiment in FIG. 29, the following steps can be taken. The new, exemplary embodiment will have one or more load balancer [241], one or more frontend web server [242], one or more annotation API server [243], and one or more deep learning api [244]. Load balancers, frontend web servers, annotation API servers, and deep learning API servers can be added to improve performance of the overall system. Often, message brokers can be organized into a message broker cluster. A message broker cluster can be used to scale the new, exemplary embodiment. Most key-value store database [247] software also has the ability to create key-value store database clusters.

To ensure the relational database [246] can handle the most users in the new, exemplary embodiment, using a relational database [246] that uses threads as opposed to processes is ideal. In some cases, threads take about 256 KB of memory per thread, whereas processes take 10 MB of memory per process. This allows relational databases whose connections rely on threads to have more than 20 times more open connections than relational databases whose connections rely on processes. Even with the use of connection pooling tools used by relational databases that rely on processes for open connections, thread based connections are better for the style of connections made by the annotation API server [243]. The annotation API server [243] relies on transactions and has performance needs. As a result, using SQL transaction pooling as opposed to SQL session pooling or SQL statement pooling is ideal. SQL session pooling suffers from poor performance, and SQL statement pooling makes transactions more difficult to implement than using SQL transaction pooling. When using SQL transaction pooling, thread based connections lead to the best performance when computer instructions need to execute on a processor not being used by the relational database [246] since a connection remains open while work is being done on an external processor. As a result, the relational database [246] may be given fewer SQL statements to execute than the relational database [246] can handle. This results in an overall lower throughput.

To further enhance the ability of the relational database [246], read-scaling the relational database [246] by creating read-replicas is advantageous. The system can be scaled further by reducing the write-load on the relational database [246]. The write load can be reduced by implementing reputation voting through the key-value store database [247] in the new, exemplary embodiment. To further scale the capacity of the relational database, the number of CPU cores and RAM of the relational database [246] machine, in the new, exemplary embodiment, can be increased. Another step that can be taken is to use an in-memory relational database [246] that implements SQL without the full durability guarantees of most relational databases. Such systems can use an in-memory database with check-point saving and write-ahead logging to not lose, in the event of a power loss, database data except the database data that arrived at the in-memory database within the last few seconds. Beyond these steps, the relational database can be further scaled by using a high performance computing (HPC) cluster with remote direct memory access (RDMA) through Infiniband networking to allow the relational database to use memory beyond what is available locally in one machine. Since this HPC cluster can be scaled to hundreds or thousands of machines, the corresponding relational database [246] could support a large number of simultaneous users.

Figure 30:
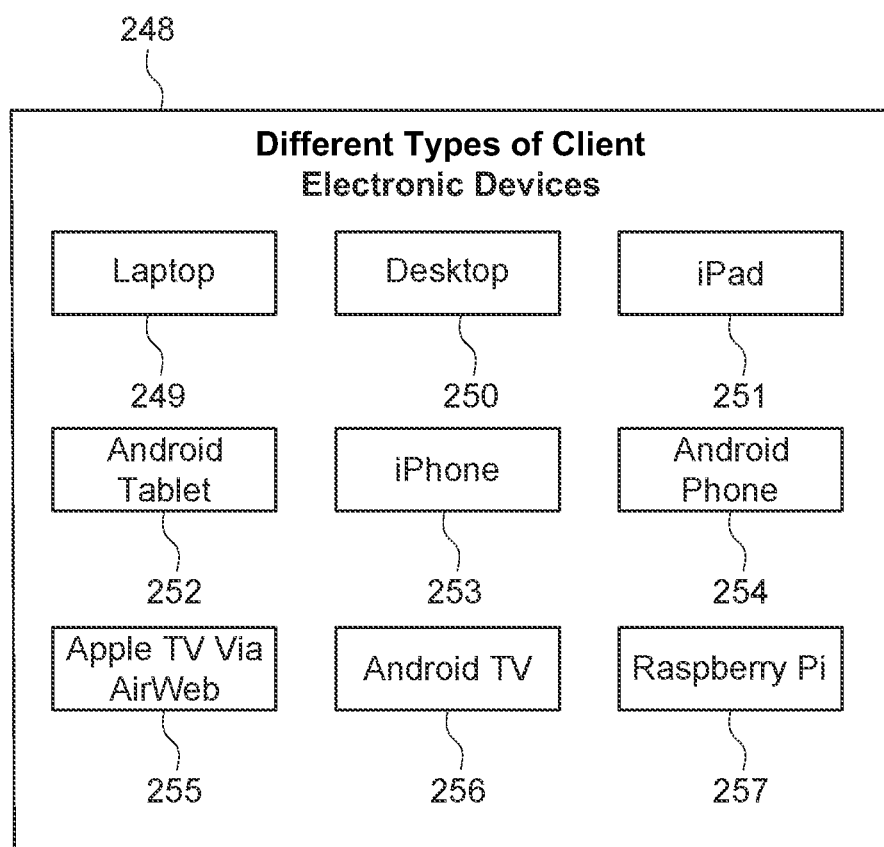
FIG. 30 presents an exemplary embodiment showing client electronic devices for the annotation server.

In the exemplary embodiment depicted in FIG. 30, different types of client electronic devices [248] that can communicate with the annotation server [61] and the content delivery network [63] are shown. The devices shown are a laptop [249], desktop [250], iPad [251], Android tablet [252], iPhone [253], Android Phone [254], Apple TV via AirWeb [255], Android TV [256], and Raspberry Pi [257]. laptop [249], desktop [250], Android tablet [252], Android Phone [254], and Raspberry Pi [257] support an annotation capable web browser with notepad feature through the installation of a web browser and a web browser extension. The Yandex browser provides a web browser supporting web extensions on Android devices such as the Android tablet [252] and Android Phone [254]. iPad [251] and iPhone [253] support an annotation capable web browser through the installation of the Safari web browser and an app extension. Apple TV via AirWeb [255] and Android TV [256] may not currently be suitable for the installation of an annotation capable web browser including a web browser and a web browser extension. Furthermore, the form factor may not be ideal for the creation of annotations. However, it is possible to create progressive web applications for these devices that communicate with an annotation server. That would allow the display of annotated material much like a digital photo frame displays pictures. That would allow these devices to display the wealth of annotations created using other devices shown in FIG. 30.

Annotations of pictures, videos, and sound recordings will now be discussed. GUI diagrams in exemplary embodiments will be presented showing the end result of what systems display and of non-transitory computer readable medium instructions run in a web browser running on a processor. In the exemplary embodiments, the non-transitory computer readable medium instructions may be for web browsers running on a processor, or the non-transitory computer readable medium instructions may be incorporated into an annotation capable web browser. As previously discussed, an annotation capable web browser in an exemplary embodiment is a web browser with a web browser extension. When using an annotation capable web browser, pictures, videos, and sound recordings embedded within any web page can be annotated. The web site being annotated does not need to contain computer readable medium instructions to annotate embedded pictures, videos, and sound recordings. When using an ordinary web browser, pictures, videos, and sound recordings can be annotated if the non-transitory computer readable medium instructions are delivered via a particular web site, and the annotation of content occurs on that particular website.

In addition to annotation capable web browsers annotating documents and media on the world wide web, software applications for mobile devices and internet televisions can also use non-transitory computer readable medium instructions implementing the methods, techniques, and interfaces described herein in order to annotate pictures, videos, and sound recordings available to a group of users on the Internet or local intranet.

After discussing the GUI, bundles of data created for transmitting data between components will be discussed. Once the relevant bundles of data are discussed, methods and system architecture will be discussed in the context of the system architecture and components that were already discussed.

Figure 35:
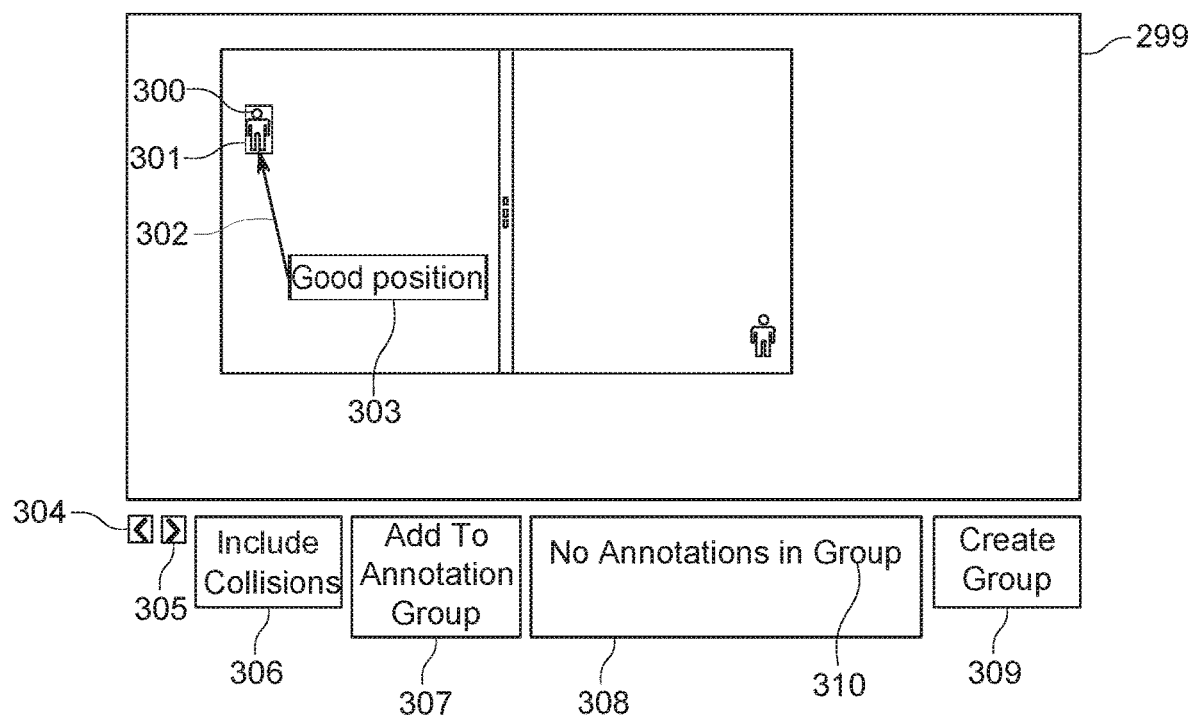
FIG. 35 shows the picture annotation viewing and picture annotation group creation interface.

In the exemplary embodiment depicted in FIG. 35, a picture [299] is shown with the picture annotation subject [300], picture annotation subject bounding box [301], picture annotation arrow [302], and picture annotation comment in box [303]. The picture annotation subject [300] is an entity of interest in the picture. The picture annotation subject [300] could be a person, car, soccer ball, tennis ball, or other object that is identifiable within a picture by a human or computer system. The picture annotation subject bounding box [301] is a bounding box drawn around the picture annotation subject [300] by a user or computer system. The picture annotation comment in box [303] is created by the user, and the annotation comment should relate to the picture annotation subject [300]. The picture annotation arrow [302] is a line that may have arrowheads on either side that connects the picture annotation subject bounding box [301] and the picture annotation comment in box [303]. The picture annotation subject bounding box [301], picture annotation arrow [302], and picture annotation comment in box [303] were created by a user and are the objects included in a picture annotation. The user can select a rectangle tool from a panel somewhere on the web page or floating toolbar and draw a picture annotation subject bounding box [301]. Furthermore, the user can enter text and position the picture annotation comment in box [303]. The picture annotation subject bounding box [301] and picture annotation comment in box [303] are connected by a picture annotation arrow [302]. The objects of the picture annotation may not all be visible at the same time. As an example, it is possible for only the picture annotation subject bounding box [301] to be visible, with the other objects of the picture annotation becoming visible after a user mouses over the picture annotation subject [300] or the picture annotation subject bounding box [301]. The visible elements of the picture annotation are those elements that are visible without having to mouseover some other element. The mouseover elements of the picture annotation are those elements that become visible when the user mouses over the visible elements of the picture annotation.

Below the picture [299] is a control panel including the picture previous annotation arrow button [304], picture next annotation arrow button [305], picture include collisions button [306], picture add to candidate annotation group button [307], picture candidate annotation group list box [308], and picture create annotation group button [309]. The label of the picture add to candidate annotation group button

[307] has the shorter name "Add To Annotation Group". However, a picture annotation is first added to the picture candidate annotation group, which later becomes the picture annotation group after the user clicks picture create annotation group button [309]. Picture annotations include objects such as picture annotation subject bounding box [301], picture annotation arrow [302], and picture annotation comment in box [303]. A picture annotation may contain more than one picture annotation subject [300]. In the electronic database [62], picture annotations are stored as picture annotation objects. These picture annotation objects are then assigned a sequential ordering by the electronic database [62], which gives a sequential ordering to picture annotations. This ordering on picture annotations gives meaning to the concept of previous and next picture annotation. The picture previous annotation arrow button [304] removes the objects included in the current picture annotation, assuming the current picture annotation is not a candidate picture annotation, from the displayed view and then adds the objects in the previous picture annotation to the displayed view. The picture next annotation arrow button [305] removes the objects included in the current picture annotation, assuming the current picture annotation is not a candidate picture annotation, from the displayed view and then adds the objects in the next picture annotation to the displayed view. A picture annotation group includes multiple picture annotations. Before the picture annotation group is created, the picture annotations need to be selected. During the selection process, the picture annotations are candidate picture annotations. The candidate picture annotations are listed in the picture candidate annotation group list box [308]. FIG. 35 depicts a scenario in which picture annotations have not yet been added to the picture candidate annotation group list box [308]. Thus, the message in the picture candidate annotation group list box [308] is the picture candidate annotation group list empty message [310].

The picture include collisions button [306] determines the display properties of picture annotations colliding with the candidate picture annotations listed in the picture candidate annotation group list box [308]. The possible states include exclude collisions and include collisions. If the picture include collisions button [306] is clicked, picture annotations colliding with the candidate picture annotations listed in the picture candidate annotation group list box [308] will be shown. In the exemplary embodiment depicted in FIG. 35, the button's label will change to "Exclude Collisions". If this button is clicked one more time, picture annotations colliding with the candidate picture annotations listed in the picture candidate annotation group list box [308] will not be shown. If the picture create annotation group button [309] is clicked, an item will be created that displays a picture annotation group including all the picture annotations listed in the picture candidate annotation group list box [308] at the time the picture create annotation group button [309] was clicked.

In alternative embodiments, the picture annotation subject bounding box [301] and picture annotation arrow [302] may not be displayed. In an alternative embodiment, just the picture annotation subject bounding box [301] and picture annotation comment in box [303] are present. Or, in another alternative embodiment, just the picture annotation comment in box [303] is present near the picture annotation subject [300].

Figure 36:
FIG. 36 shows the picture annotation group creation interface with one annotation group list item added to the candidate annotation group list.

In the exemplary embodiment depicted in FIG. 36, a picture [299] is shown with the first picture candidate annotation group list item [311] added to the picture candidate annotation group list box [308]. This state is produced by clicking the picture add to candidate annotation group button [307] in the state of the exemplary embodiment depicted in FIG. 35. After the picture annotation has been added to the candidate picture annotation group list, the state of the exemplary embodiment depicted in FIG. 37 is produced by clicking the picture next annotation arrow button [305] in the state of the exemplary embodiment depicted in FIG. 36.

Figure 37:
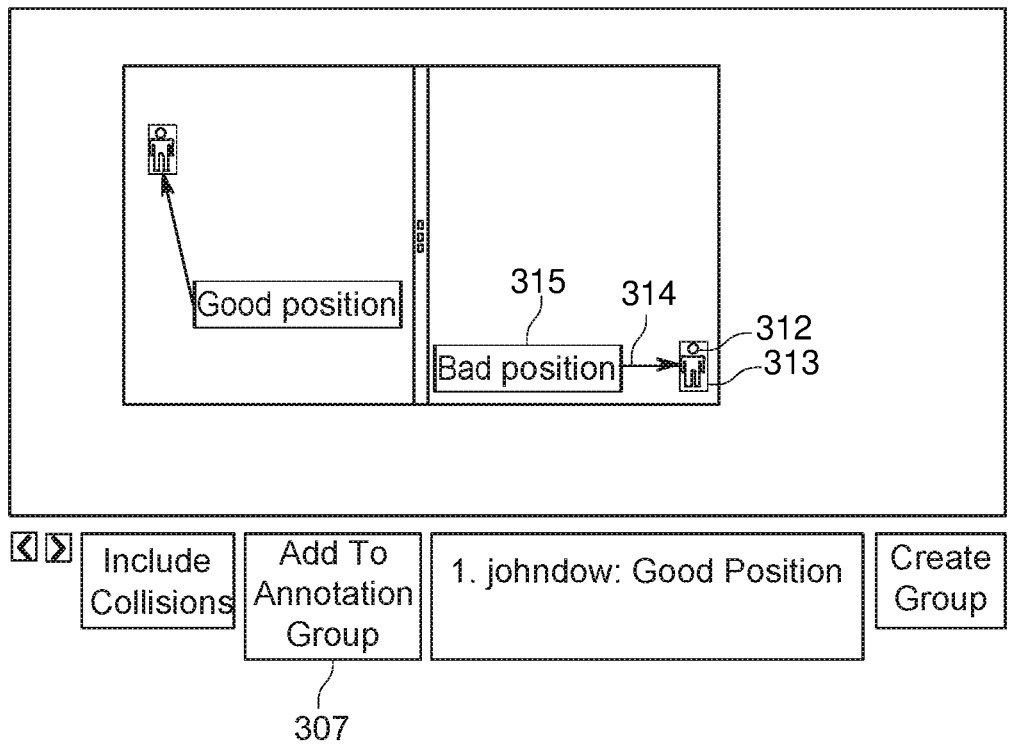
FIG. 37 shows the picture annotation group creation interface with one annotation group list item with a second non-colliding picture annotation not added to the candidate annotation group list.

In the exemplary embodiment depicted in FIG. 37, a second picture annotation subject [312] is shown along with the user created second picture annotation subject bounding box [313], second picture annotation arrow [314], and second picture annotation comment in box [315]. If the picture add to candidate annotation group button [307] is clicked in the state of the exemplary embodiment shown in FIG. 37, the state of the exemplary embodiment shown in FIG. 38 is produced.

In the exemplary embodiment depicted in FIG. 38, a second picture candidate annotation group list item [316] is shown. If the picture create annotation group button [309] is pressed, an annotation group including the two annotations depicted in the picture candidate annotation group list box [308] in FIG. 38 would be created.

In the exemplary embodiment depicted in FIG. 39, the user has previously clicked the picture include collisions button [306] in FIG. 36 allowing colliding picture annotations to be shown. After pressing the picture next annotation arrow button [305] from the state depicted in FIG. 36, the state depicted in FIG. 39 could result. In FIG. 39, a colliding picture annotation arrow [317] and colliding picture annotation comment in box [318] are shown.

Figure 40:
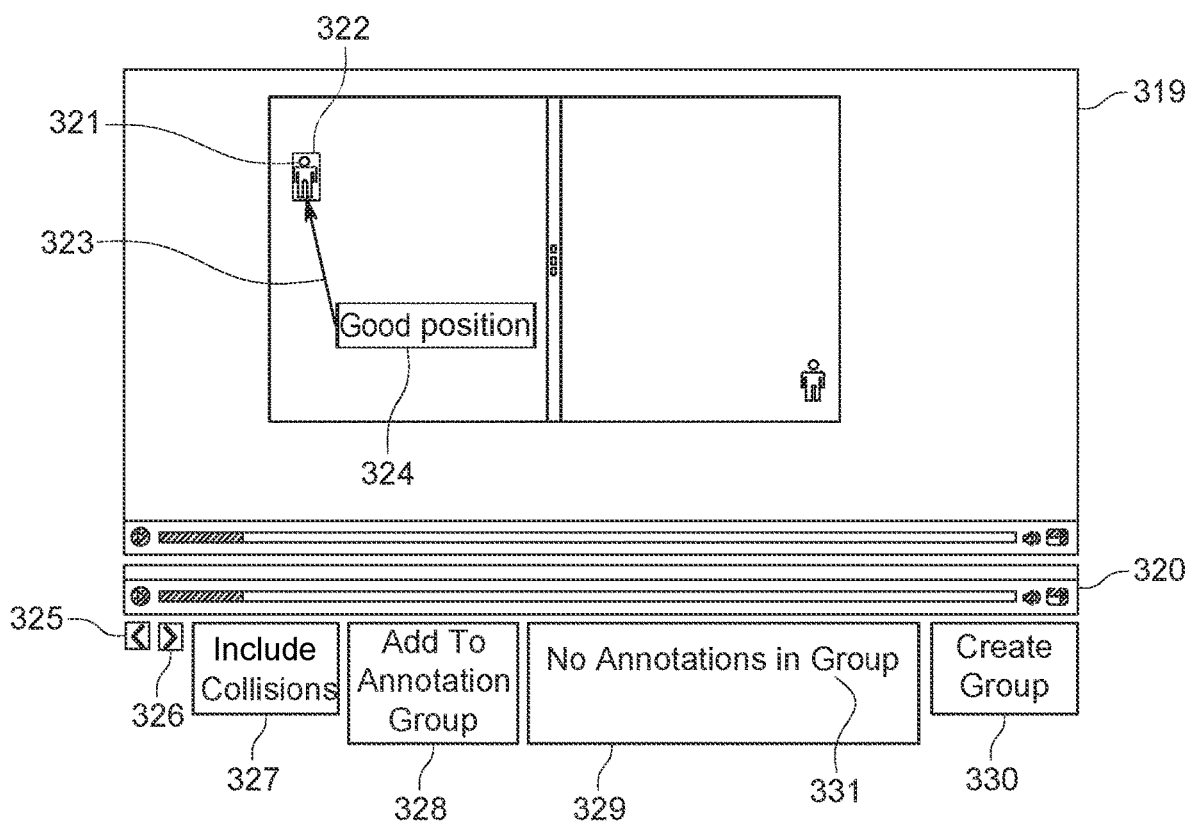
FIG. 40 shows the video annotation viewing and video annotation group creation interface.

In the exemplary embodiment depicted in FIG. 40, a video [319] is shown with the video annotation playback [320]. The video [319] shows the video annotation subject [321], video annotation subject bounding box [322], video annotation arrow [323], and video annotation comment in box [324]. The video annotation subject [321] is an entity of interest in the video. The video annotation subject [321] could be a person, car, soccer ball, tennis ball, or other object that is identifiable within a video by a human or computer system. The video annotation subject bounding box [322] is a bounding box drawn around the video annotation subject [321] by a user or computer system. The video annotation comment in box [324] is created by the user, and the annotation comment should relate to the video annotation subject [321]. The video annotation arrow [323] is a line that may have arrowheads on either side that connects the video annotation subject bounding box [322] and the video annotation comment in box [324]. The video annotation subject bounding box [322], video annotation arrow [323], and video annotation comment in box [324] were created by a user and are the objects included in a video annotation. The user can select a rectangle tool from a panel somewhere on the web page or a floating toolbar and draw the initial video annotation subject bounding box [322]. Furthermore, the user can enter text and position the video annotation comment in box [324] and connect them with a video annotation arrow [323]. As the video [319] plays, so does the video annotation playback [320]. While video annotation playback [320] plays, the user creating a video annotation can move the video annotation subject bounding box [322] with the mouse to ensure the video annotation subject bounding box [322] is properly positioned throughout the video. The user can move the video annotation comment in box [324] with the mouse to ensure the video annotation comment in box [324] is properly positioned throughout the video. Once the motion paths of the video annotation subject bounding box [322] and video annotation comment in box [324] are known, the motion path of the video annotation arrow [323] along with its rotation over time, contraction over time, dilation over time, and position over time can be calculated to correspond to the motion paths of the video annotation subject bounding box [322] and video annotation comment in box [324]. The user can also pause the video and resize the video annotation subject bounding box [322] and video annotation comment in box [324]. The objects of the video annotation may not all be visible at the same time. As an example, it is possible for only the video annotation subject bounding box [322] to be visible with the other objects of the video annotation becoming visible after a user mouses over the video annotation subject [321] or the video annotation subject bounding box [322]. The visible elements of the video annotation are those elements that are visible without having to mouseover some other element. The mouseover elements of the video annotation are those elements that become visible when the user mouses over the visible elements of the video annotation.

Below the video [319] is a control panel including the video previous annotation arrow button [325], video next annotation arrow button [326], video include collisions button [327], video add to candidate annotation group button [328], video candidate annotation group list box [329], and video create annotation group button [330]. The label of the video add to candidate annotation group button [328] has the shorter name "Add To Annotation Group". However, a video annotation is first added to the video candidate annotation group, which later becomes the video annotation group after the user clicks video create annotation group button [330]. Video annotations include objects such as video annotation subject bounding box [322], video annotation arrow [323], and video annotation comment in box [324]. A video annotation may contain more than one video annotation subject [321]. In the electronic database [62], video annotations are stored as video annotation objects. These video annotation objects are then assigned a sequential ordering by the electronic database [62], which gives a sequential ordering to video annotations. This ordering on video annotations gives meaning to the concept of previous and next video annotation. The video previous annotation arrow button [325] removes from the displayed view the objects included in the current video annotation, assuming the current video annotation is not a candidate video annotation, and then adds the objects in the previous video annotation to the displayed view. The video next annotation arrow button [326] removes from the displayed view the objects included in the current video annotation, assuming the current video annotation is not a candidate video annotation, and then adds the objects in the next video annotation to the displayed view. A video annotation group includes multiple video annotations. Before the video annotation group is created, the video annotations need to be selected. During the selection process, the video annotations are candidate video annotations. The candidate video annotations are listed in the video candidate annotation group list box [329]. FIG. 40 depicts a scenario in which video annotations have not yet been added to the video candidate annotation group list box [329]. Thus, the message in the video candidate annotation group list box [329] is the video candidate annotation group list empty message [331].

The video include collisions button [327] determines the display properties of video annotations colliding with the candidate video annotations listed in the video candidate annotation group list box [329]. For video annotations, collision means that two video annotations collide at some point in time. The collision may be depicted in red on the play line of the video annotation playback [320]. If the video include collisions button [327] is clicked, video annotations colliding with the candidate video annotations listed in the video candidate annotation group list box [329] will be shown. In the exemplary embodiment depicted in FIG. 40, the buttons label will change to "Exclude Collisions". If this button is clicked one more time, video annotations colliding with the candidate video annotations listed in the video candidate annotation group list box [329] will not be shown. If the video create annotation group button [330] is clicked, an item will be created that displays a video annotation group including all the video annotations listed in the video candidate annotation group list box [329] at the time the video create annotation group button [330] was clicked. If the video add to candidate annotation group button [328] is clicked in the state depicted in the exemplary embodiment in FIG. 40, the state depicted in the exemplary embodiment in FIG. 41 will be produced with the first video candidate annotation group list item [335] added to the video candidate annotation group list box [329].

In alternative embodiments, the video annotation subject bounding box [322] and video annotation arrow [323] may not be displayed. In an alternative embodiment, just the video annotation subject bounding box [322] and video annotation comment in box [324] are present. Or, in another alternative embodiment, just the video annotation comment in box [324] is present near the video annotation subject [321].

In the exemplary embodiment depicted in FIG. 40, the video [319] player controls are separate from the video annotation playback [320]. In an alternative embodiment, it is possible to integrate both controls into one playback control. This may be a more complex input interface, but it reduces the number of elements displayed on the screen. This comment about integrating the two playback controls also applies to the exemplary embodiments depicted in FIG. 41, FIG. 42, FIG. 43, FIG. 44, and FIG. 45.

Figure 41:
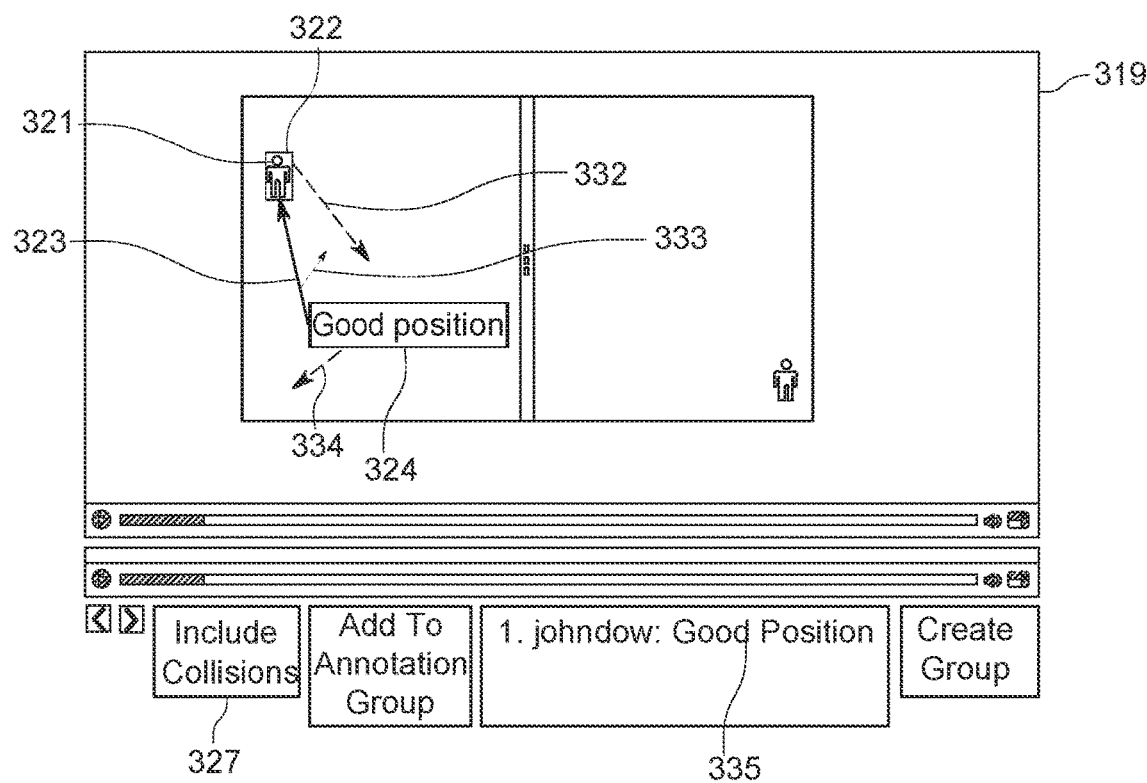
FIG. 41 shows the video annotation viewing and video annotation group creation interface with one video annotation added to the candidate annotation group list box with motion paths for video annotation elements.

In the exemplary embodiment depicted in FIG. 41, the video annotation subject bounding box motion path [332], video annotation arrow motion path [333], and video annotation comment input box motion path [334] are shown. The video annotation subject bounding box motion path [332] shows the motion path of the video annotation subject bounding box [322], which should serve as the bounding box for the video annotation subject [321] as the video annotation subject [321] moves throughout the video. The video annotation arrow motion path [333] shows the motion path of the video annotation arrow [323] as the video annotation arrow [323] moves as the video [319] progresses in time. The video annotation arrow [323] translates, rotates, dilates, and contracts in time since the video annotation subject bounding box [322] and video annotation comment in box [324] move in time. The video annotation comment input box motion path [334] shows the motion path of the video annotation comment in box [324] as the video annotation comment in box [324] moves as the video [319] progresses in time.

Figure 42:
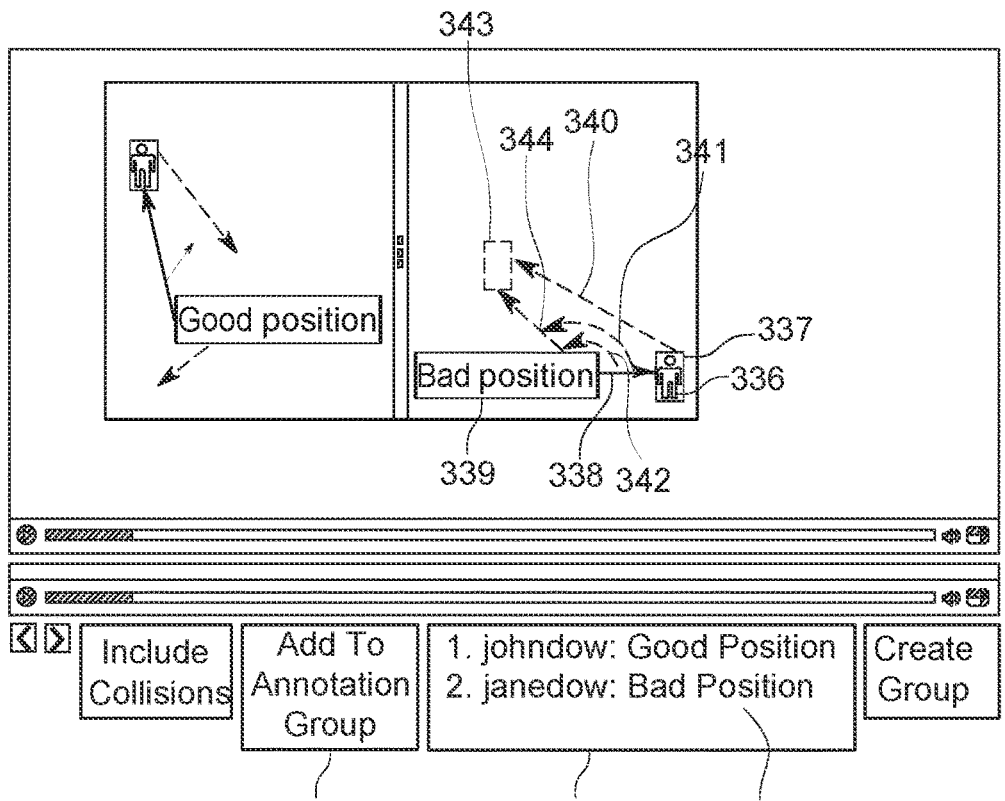
FIG. 42 shows the video annotation group creation interface with two annotation group list items added to the candidate annotation group list with motion paths for the second video annotation elements.

In the exemplary embodiment depicted in FIG. 42, the second video annotation subject [336], second video annotation subject bounding box [337], second video annotation arrow [338], second video annotation comment in box [339], second video annotation subject bounding box motion path [340], second video annotation arrow motion path one [341], second video annotation arrow motion path two [342], final second video annotation subject bounding box location

[343], and final second video annotation arrow location [344] are shown. The second video annotation subject bounding box [337] follows the second video annotation subject [336] along the second video annotation subject bounding box motion path [340] to the final second video annotation subject bounding box location [343]. The second video annotation arrow [338] transforms to the final second video annotation arrow location [344] over time. The transformation which includes movement, rotation, and contraction is depicted by the second video annotation arrow motion path one [341] and second video annotation arrow motion path two [342]. The second video annotation comment in box [339] stays fixed in time. The second video candidate annotation group list item [345] is shown in the video candidate annotation group list box [329], which happens when the user clicks the video add to candidate annotation group button [328].

Figure 43:
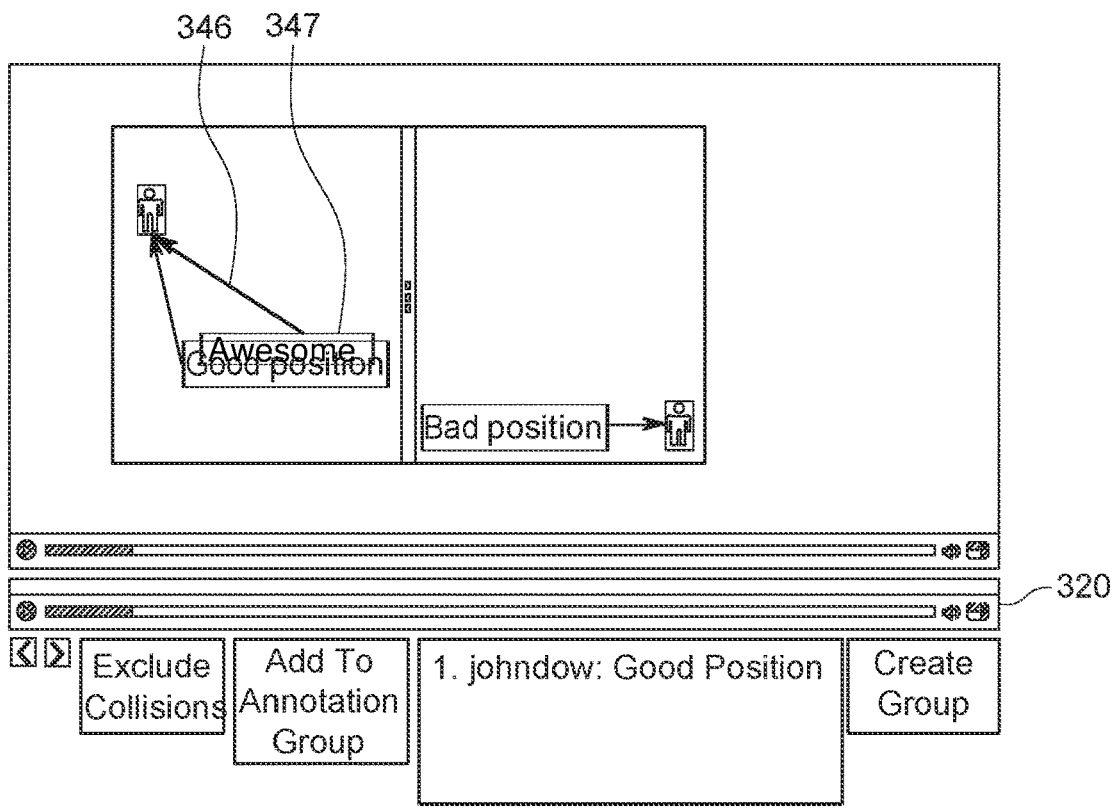
FIG. 43 shows the video annotation group creation interface with one annotation group list item added to the candidate annotation group list with a second colliding video annotation not added to the candidate annotation group list.

In the exemplary embodiment depicted in FIG. 43, the user has previously clicked the video include collisions button [327] in the state depicted in the exemplary embodiment of FIG. 41. As a result, video annotations with collisions with video annotations in the candidate annotation group list are shown. After clicking the video next annotation arrow button [326] after clicking the video include collisions button [327] in the state depicted in the exemplary embodiment of FIG. 41, the colliding video annotation arrow [346] and colliding video annotation comment in box [347] may be shown. In the state depicted in the exemplary embodiment in FIG. 43, a collision is depicted. However, the collision may occur at a point not depicted in a particular video frame. In such cases, the collision may be depicted in red in the timeline of the video annotation playback [320] within the exemplary embodiment.

Figure 44:
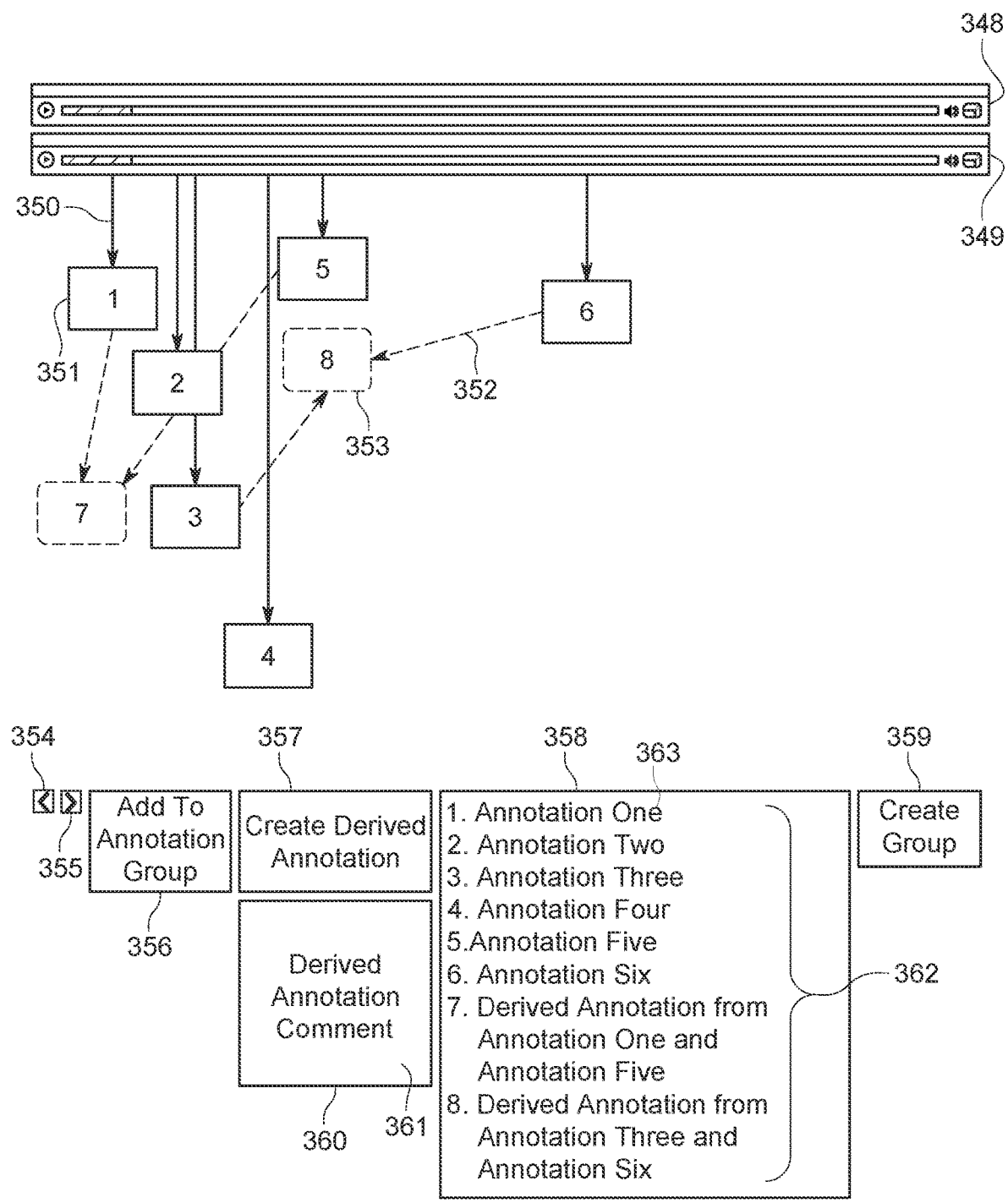
FIG. 44 shows the sound annotation viewing and sound annotation group creation interface with timeline sound annotations and a derived sound annotation creation interface.

In the exemplary embodiment depicted in FIG. 44, a sound recording playback [348] and sound recording annotation playback [349] are shown. Below the sound recording annotation playback [349] is shown the sound recording annotation arrow [350], sound recording annotation comment box [351], sound recording annotation connection arrow [352], and sound recording derived annotation comment box [353]. Below the sound recording annotation playback [349] is a control panel including the sound recording previous annotation arrow button [354], sound recording next annotation arrow button [355], sound recording add to candidate annotation group button [356], sound recording create derived annotation button [357], sound recording candidate annotation group list box [358], sound recording create annotation group button [359], and sound recording derived annotation comment input box [360]. The label of the sound recording add to candidate annotation group button [356] has the shorter name "Add To Annotation Group". However, a sound recording annotation is first added to the sound recording candidate annotation group, which later becomes the sound recording annotation group after the user clicks sound recording create annotation group button [359].

Figure 49:
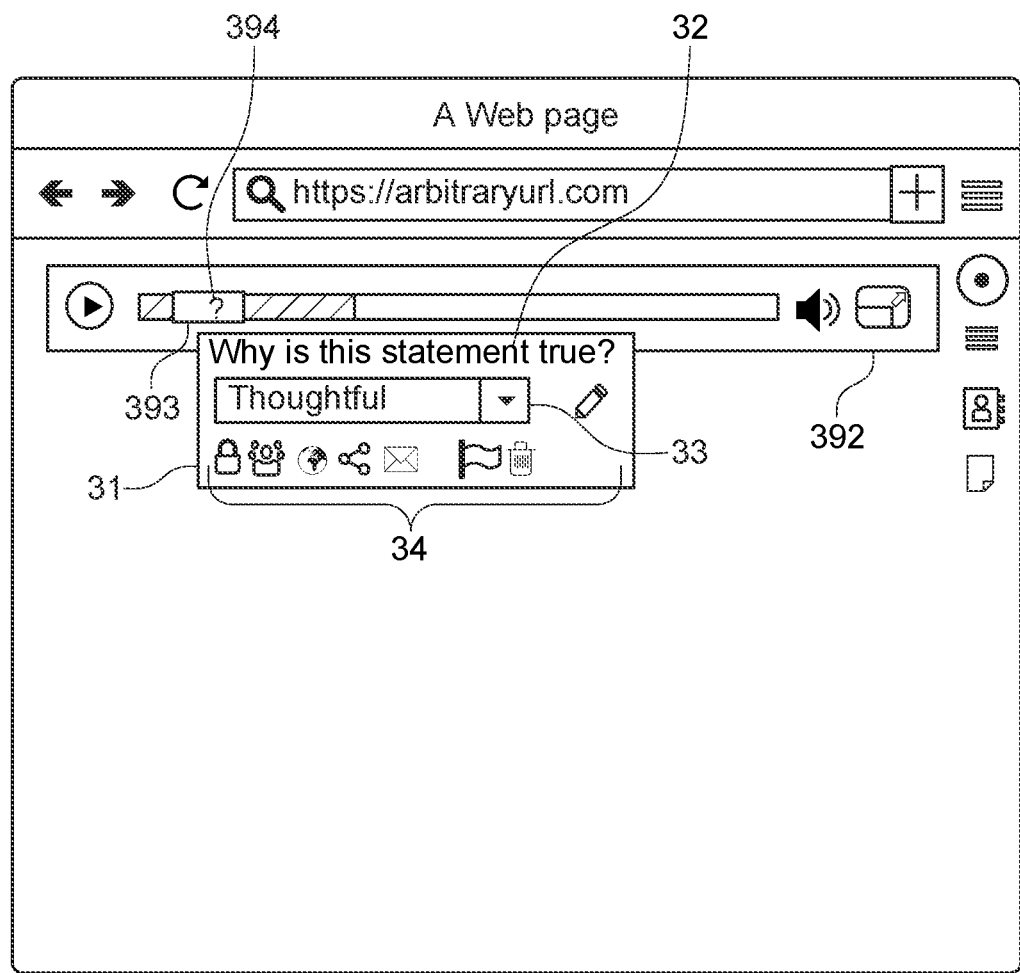
FIG. 49 shows an annotation capable web browser after a sound annotation has been created and the embedded displayed sound annotation is in the open state during the sound annotation playback range.

To create a sound recording annotation in the exemplary embodiment depicted in FIG. 44, the user selects a short segment of the sound recording annotation playback [349] using the mouse. After the selection is made, a sound recording annotation arrow [350] and sound recording annotation comment box [351] appear, originating from the middle of the selection allowing the user to create a sound recording annotation comment in the sound recording annotation comment box [351]. Sound recording annotations include objects such as the sound recording annotation arrow [350] and sound recording annotation comment box [351]. The short segment of the sound recording annotation playback [349] can be marked as shown by embedded sound recording annotation playback range [393] in FIG. 49. While FIG. 49 shows an embedded sound recording and the marked short segment is on the playback bar for the sound recording playback [348], the same style of marked segment can be used on the sound recording annotation playback [349]. The segment can also be left unmarked, or the marked segment can appear after mousing over the selected segment, sound recording annotation arrow [350], or sound recording annotation comment box [351]. In addition, a question sound annotation symbol can be introduced that behaves similarly to the question embedded sound annotation symbol [394] in FIG. 49.

A sound recording annotation may contain more than one selected segment of sound. In the electronic database [62], sound recording annotations are stored as sound recording annotation objects. These sound recording annotation objects are then assigned a sequential ordering by the electronic database [62], which gives a sequential ordering to sound recording annotations. This ordering on sound recording annotations gives meaning to the concept of previous and next sound recording annotation. The sound recording previous annotation arrow button [354] removes from the displayed view the objects included in the current sound annotation, assuming the current sound annotation is not a candidate sound annotation, and then adds the objects in the previous sound annotation to the displayed view. The sound recording next annotation arrow button [355] removes from the displayed view the objects included in the current sound recording annotation, assuming the current sound recording annotation is not a candidate sound recording annotation, and then adds the objects in the next sound recording annotation to the displayed view. Sound recording annotation groups are a group of sound recording annotations that the user wants to group together. These groupings display as a single item, and one or more sound recording annotations from the sound recording annotation group can be used to create derived sound recording annotations relating these one or more sound recording annotations. Furthermore, a derived sound recording annotation with the sound recording annotations on which it depends can appear as a single item. Sound recording annotations can be added to the sound recording annotation group by clicking the sound recording add to candidate annotation group button [356]. As a result, the new sound recording annotation appears in the sound recording candidate annotation group list box [358]. Once the sound recording annotations have been added to the sound recording annotation group, the user can create sound recording derived annotations. Sound recording derived annotations are annotations that link other sound recording annotations and then add a comment in a sound recording derived annotation comment box [353] connected to multiple sound recording annotation comment boxes. The sound recording derived annotation comment box [353] is connected to each sound recording annotation comment box [351] using a sound recording annotation connection arrow [352]. A sound recording derived annotation is created by selecting the desired sound recording annotations and then clicking the sound recording create derived annotation button [357]. Then, the user types the sound recording derived annotation comment [361] in the sound recording derived annotation comment input box [360] and hits enter. In the sound recording candidate annotation group list box [358] is the sound recording candidate annotation group list items [362]. This list includes both the sound recording annotations and the sound recording derived annotations. The first item in sound recording candidate annotation group list items [362] is the first sound recording candidate annotation group list item [363].

Figure 45:
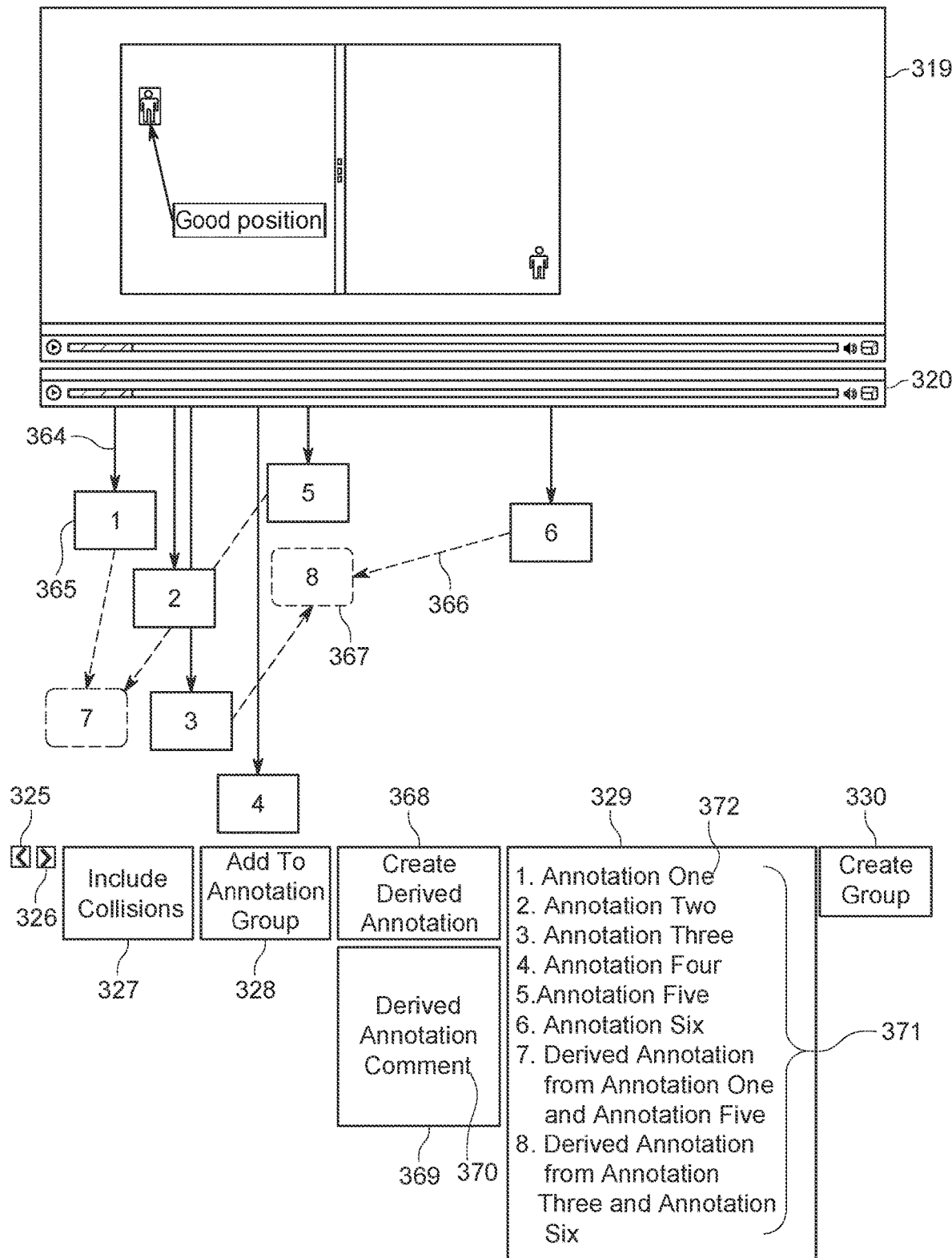
FIG. 45 shows the video annotation viewing and video annotation group creation interface with timeline video annotations and a derived video annotation creation interface.
Figure 46:
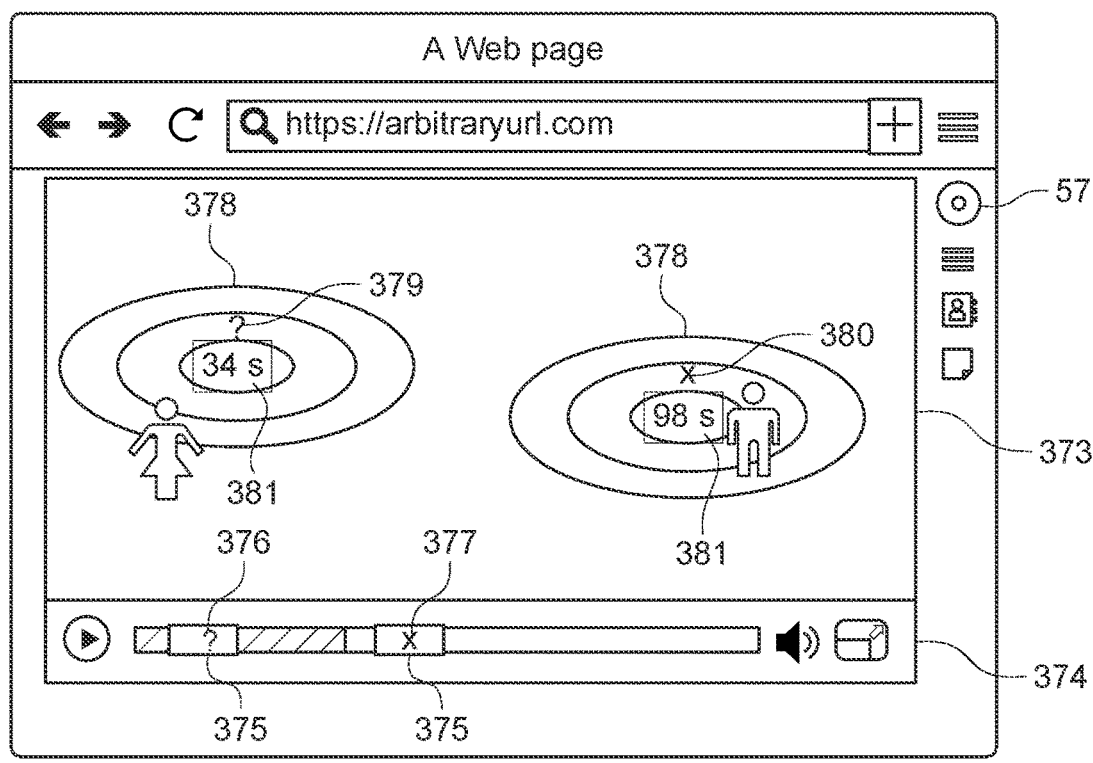
FIG. 46 shows an annotation capable web browser showing a video with embedded video annotation beacons.

In the exemplary embodiment depicted in FIG. 45, a video [319] and video annotation playback [320] are shown. Below the video annotation playback [320] is shown the video annotation arrow [364], video annotation comment box [365], video annotation connection arrow [366], and video derived annotation comment box [367]. Below the video annotation playback [320] is a control panel including the video previous annotation arrow button [325], video next annotation arrow button [326], video include collisions button [327], video add to candidate annotation group button [328], video create derived annotation button [368], video candidate annotation group list box [329], video create annotation group button [330], and video derived annotation comment input box [369]. The label of the video add to candidate annotation group button [328] has the shorter name "Add To Annotation Group". However, a video annotation is first added to the video candidate annotation group, which later becomes the video annotation group after the user clicks video create annotation group button [330]. To create a video annotation in the exemplary embodiment, the user selects a short segment of the video annotation playback [320] using the mouse. After the selection is made, a video annotation arrow [364] and video annotation comment box [365] appears originating from the middle of the selection allowing the user to create a video annotation comment in the video annotation comment box [365]. The short segment of the video annotation playback [320] can be marked as shown by embedded video annotation playback range [375] in FIG. 46. While FIG. 46 shows an embedded video and the marked short segment is on the playback bar for the video [319], the same style of marked segment can be used on the video annotation playback [320]. The segment can also be left unmarked, or the marked segment can appear after mousing over the selected segment, video annotation arrow [364], or video annotation comment box [365]. In addition, a question video annotation symbol can be introduced that behaves similarly to the question embedded video annotation symbol [376] in FIG. 46.

As previously stated for a different exemplary embodiment, the video annotations include objects such as video annotation subject bounding box [322], video annotation arrow [323], and video annotation comment in box [324]. A video annotation may contain more than one video annotation subject [321]. In the electronic database [62], video annotations are stored as video annotation objects. These video annotation objects are then assigned a sequential ordering by the electronic database [62], which gives a sequential ordering to video annotations. This ordering on video annotations gives meaning to the concept of previous and next video annotation. The video previous annotation arrow button [325] removes from the displayed view the objects included in the current video annotation, assuming the current video annotation is not a candidate video annotation, and then adds the objects in the previous video annotation to the displayed view. The video next annotation arrow button [326] removes from the displayed view the objects included in the current video annotation, assuming the current video annotation is not a video candidate annotation, and then adds the objects in the next video annotation to the displayed view. Video annotation groups are a group of video annotations that the user wants to group together. These groupings display as a single item, and one or more video annotations from the video annotation group can be used to create derived video annotations relating these one or more video annotations. Furthermore, a derived video annotation with the video annotations on which it depends can appear as a single item. Video annotations can be added to the video candidate annotation group by clicking the video add to candidate annotation group button [328]. As a result, the new video annotation appears in the video candidate annotation group list box [329]. Once the video annotations have been added to the video candidate annotation group, the user can create video derived annotations. Video derived annotations are annotations that link other video annotations and then add a comment in a video derived annotation comment box [367] connected to multiple video annotation comment boxes. The video derived annotation comment box [367] is connected to each video annotation comment box [365] using a video annotation connection arrow [366]. A video derived annotation is created by selecting the desired video annotations and then clicking the video create derived annotation button [368]. Then, the user types the video derived annotation comment [370] in the video derived annotation comment input box [369] and hits enter. In the video candidate annotation group list box [329] is the video candidate annotation group list items [371]. This list includes both the video annotations and the video derived annotations. The first item in video candidate annotation group list items [371] is the first video candidate annotation group list item [372]. The video create annotation group button [330] can be clicked to create an annotation group including the video candidate annotations in the video candidate annotation group list box [329]. The video include collisions button [327] acts in the same way as the video include collisions button [327] in the exemplary embodiments depicted in FIG. 40, FIG. 41, FIG. 42, and FIG. 43.

In the exemplary embodiment depicted in FIG. 46, an embedded video [373] and embedded video playback [374] are shown. The embedded video [373] and embedded video playback [374] exist within a web page that is being viewed with an annotation capable web browser. In the exemplary embodiment depicted in FIG. 46, the embedded video annotation playback range [375], question embedded video annotation symbol [376], disagreement embedded video annotation symbol [377], embedded video annotation beacon [378], embedded video annotation beacon question symbol [379], embedded video annotation beacon disagreement symbol [380], and embedded video annotation beacon play time [381] are shown. The symbols beacon trigger button [57] triggers the display of one complete displayed video annotation beacon for each video annotation in the embedded video [373] unless the embedded video [373] contains more than 3 video annotations. When more than 3 video annotations are present, alternative display methodologies may allow the user to better visualize the video annotations that can be viewed. A complete displayed video annotation beacon includes the embedded video annotation playback range [375], embedded video annotation symbol, embedded video annotation beacon [378], embedded video annotation beacon symbol, and embedded video annotation beacon play time [381]. The embedded video annotation playback range [375] highlights the time range the user believes is relevant to the video annotation. Embedded video annotation symbols such as the question embedded video annotation symbol [376] and the disagreement embedded video annotation symbol [377] convey the annotation semantic relationship between the selected video segment and the video annotation comment. The embedded video annotation beacon [378] serves to draw a user's attention to the existence of a video annotation and some of its properties. The embedded video annotation beacon symbol puts the annotation semantic relationship between the selected video segment and the video annotation comment in the vicinity of the embedded video annotation beacon [378]. Two examples of the embedded video annotation beacon symbols are the embedded video annotation beacon question symbol [379] and embedded video annotation beacon disagreement symbol [380]. The embedded video annotation beacon play time [381], which is put in the vicinity of the embedded video annotation beacon [378], conveys the length of the video segment relevant to the video annotation comment.

In the exemplary embodiment depicted in FIG. 46, the embedded video annotation playback range [375] and question embedded video annotation symbol [376] is shown in the context of the embedded video [373] and embedded video playback [374]. However, a video annotation playback range and video annotation symbols can also be used on the video annotation playback [320] depicted in FIG. 45.

Figure 47:
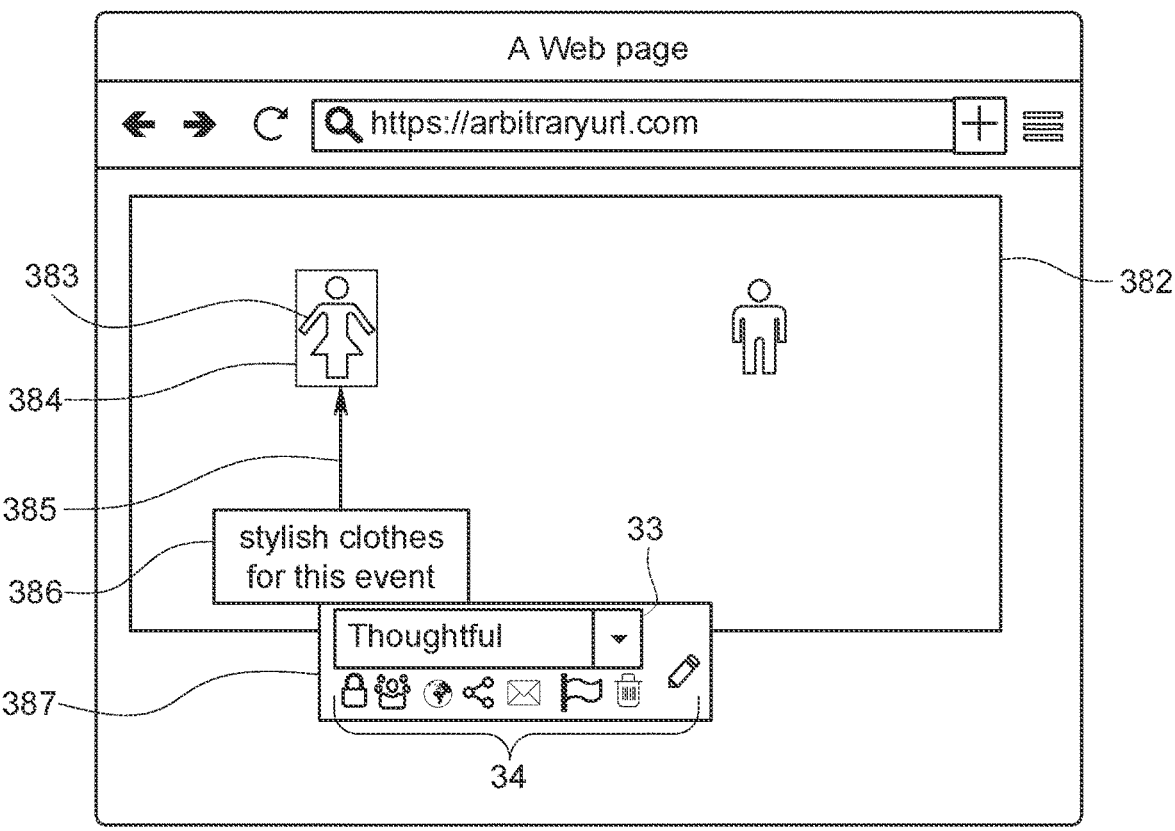
FIG. 47 shows an annotation capable web browser after a picture annotation has been created and the embedded displayed picture annotation is in the open state.

In the exemplary embodiment depicted in FIG. 47, an embedded picture [382] is shown. The embedded picture [382] exists within a web page, and the embedded picture annotation subject [383] occurs within the embedded picture [382]. In the exemplary embodiment depicted in FIG. 47, the embedded picture annotation subject bounding box [384], embedded picture annotation arrow [385], and embedded picture annotation comment in box [386] are shown. The embedded picture annotation subject [383] is an entity of interest in the picture. The embedded picture annotation subject [383] could be a person, car, soccer ball, tennis ball, or other object that is identifiable within a picture by a human or computer system. The embedded picture annotation subject bounding box [384] is a bounding box drawn around the embedded picture annotation subject [383] by a user or computer system. The user can select a rectangle tool from a panel somewhere on the web page or floating toolbar and draw an embedded picture annotation subject bounding box [384]. Furthermore, the user can enter text and position the embedded picture annotation comment in box [386]. The embedded picture annotation comment in box [386] is created by the user, and the annotation comment should relate to the embedded picture annotation subject [383]. The embedded picture annotation arrow [385] is a line that may have arrowheads on either side that connects the embedded picture annotation subject bounding box [384] and the embedded picture annotation comment in box [386]. The embedded picture annotation subject bounding box [384], embedded picture annotation arrow [385], and embedded picture annotation comment in box [386] were created by a user and are the embedded objects included in a picture annotation.

The embedded objects of the picture annotation may not all be visible at the same time. As an example, it is possible for only the embedded picture annotation subject bounding box [384] to be visible with the other embedded objects of the picture annotation becoming visible after a user mouses over the embedded picture annotation subject [383] or the embedded picture annotation subject bounding box [384]. The visible elements of the picture annotation are those embedded elements that are visible without having to mouseover some other element. The mouseover embedded elements of the picture annotation are those embedded elements that become visible when the user mouses over the visible embedded elements of the picture annotation. While mousing over embedded objects of the picture annotation, the contextual variant annotation control bar box [387] appears. The user can use the contextual variant annotation control bar [34] embedded in the contextual variant annotation control bar box [387] to change privacy settings, share by email, share by social media, flag the picture annotation as inappropriate, delete the picture annotation object from the electronic database [62] assuming sufficient permissions, or edit the embedded objects comprising the picture annotation. Furthermore, the user can use the reputation selector [33] to vote on a reputation for the picture annotation.

Figure 48:
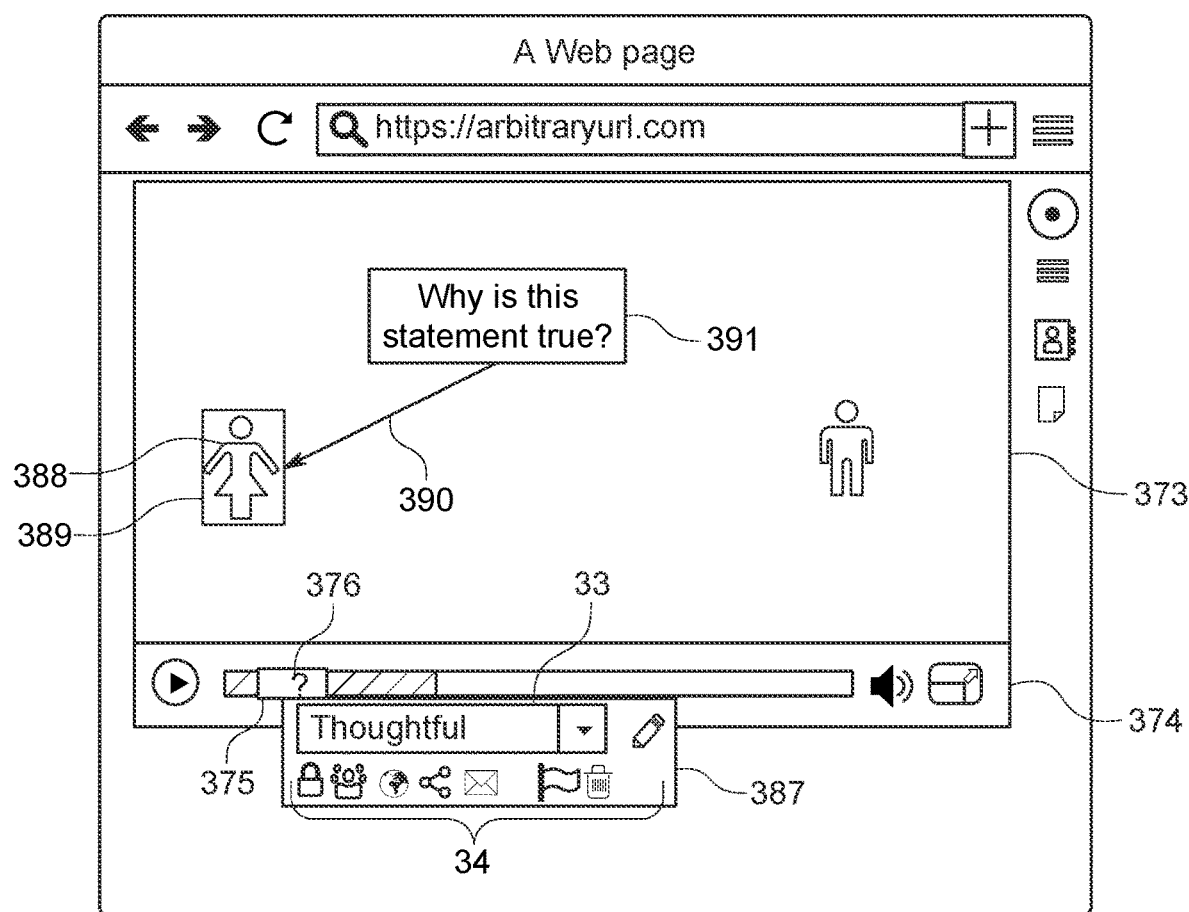
FIG. 48 shows an annotation capable web browser after a video annotation has been created and the embedded displayed video annotation is in the open state during the video annotation playback range.

In the exemplary embodiment depicted in FIG. 48, an embedded video [373] is shown. The embedded video [373] and embedded video playback [374] exists within a web page, and the embedded video annotation subject [388] occurs within the embedded video [373]. In the exemplary embodiment depicted in FIG. 48, the embedded video annotation subject bounding box [389], embedded video annotation arrow [390], and embedded video annotation comment in box [391] are shown. The embedded video annotation subject [388] is an entity of interest in the video. The embedded video annotation subject [388] could be a person, car, soccer ball, tennis ball, or other object that is identifiable within a video by a human or computer system. The embedded video annotation subject bounding box [389] is a bounding box drawn around the embedded video annotation subject [388] by a user or computer system. As the embedded video annotation subject [388] moves through the video, the embedded video annotation subject bounding box [389] should continue to act as a bounding box for the embedded video annotation subject [388]. The embedded video annotation comment in box [391] is created by the user, and the annotation comment should relate to the embedded video annotation subject [388]. The embedded video annotation arrow [390] is a line that may have arrowheads on either side that connects the embedded video annotation subject bounding box [389] and the embedded video annotation comment in box [391]. The embedded video annotation subject bounding box [389], embedded video annotation arrow [390], and embedded video annotation comment in box [391] were created by a user and are the embedded objects included in a video annotation.

The user can select a rectangle tool from a panel somewhere on the web page or a floating toolbar and draw the initial embedded video annotation subject bounding box [389]. Furthermore, the user can enter text and position the embedded video annotation comment in box [391] and connect them with an embedded video annotation arrow [390]. In order to ensure the objects are properly positioned as the video plays, either the user or a computer system needs to determine a motion path for the embedded video annotation subject bounding box [389]. The user creating the video annotation has the option of tracing the path of the embedded video annotation subject bounding box [389] as the video plays in time. While embedded video playback [374] plays, the user creating a video annotation can move the embedded video annotation subject bounding box [389] with the mouse to ensure the embedded video annotation subject bounding box [389] is properly positioned throughout the embedded video. The user can move the embedded video annotation comment in box [391] with the mouse to ensure the embedded video annotation comment in box [391] is properly positioned throughout the video. Either the annotation capable web browser, web browser extension, or web page code records the motion path as the user drags the mouse. The next time the video plays, the path of the embedded video annotation subject bounding box [389] and embedded video annotation comment in box [391] will evolve along their respective motion paths. Once the motion paths of the embedded video annotation subject bounding box [389] and embedded video annotation comment in box

[391] are known, the motion path of the embedded video annotation arrow [390] along with its rotation over time, contraction over time, dilation over time, and position over time can be calculated to correspond to the motion paths of the embedded video annotation subject bounding box [389] and embedded video annotation comment in box [391]. If the size of the desired bounding box for the embedded video annotation subject [388] changes as the video plays, the user can also pause the video and resize the embedded video annotation subject bounding box [389] and embedded video annotation comment in box [391].

The embedded objects of the video annotation may not all be visible at the same time. As an example, it is possible for only the embedded video annotation subject bounding box [389] to be visible with the other embedded objects of the video annotation becoming visible after a user mouses over the embedded video annotation subject [388] or the embedded video annotation subject bounding box [389]. The visible elements of the video annotation are those embedded elements that are visible without having to mouseover some other element. The mouseover embedded elements of the video annotation are those embedded elements that become visible when the user mouses over the visible embedded elements of the video annotation. While mousing over embedded objects of the video annotation, the contextual variant annotation control bar box [387] appears. The user can use the contextual variant annotation control bar [34] embedded in the contextual variant annotation control bar box [387] to change privacy settings, share by email, share by social media, flag the video annotation as inappropriate, delete the video annotation object from the electronic database [62] assuming sufficient permissions, or edit the embedded objects comprising the video annotation. Furthermore, the user can use the reputation selector [33] to vote on a reputation for the video annotation. Associated to each relationship in the group of annotation semantic relationships is a different embedded video annotation symbol. As an example, the question embedded video annotation symbol [376] indicates the creator of the video annotation designated the annotation semantic relationship between the selected portion of the video and the video annotation comment as a question relationship. The question embedded video annotation symbol [376] allows a user familiar with how the exemplary embodiment works to know that the user can click on the question embedded video annotation symbol [376] and see a video annotation comment that is a question about the embedded video annotation playback range [375] before the user actually performs the action of clicking. Corresponding to a question annotation symbol, disagreement annotation symbol, agreement annotation symbol, exclamation annotation symbol, and advertisement annotation symbol are five relationships in the group of annotation semantic relationships. These annotation semantic relationships are the question relationship, disagreement relationship, agreement relationship, exclamatory relationship, and advertisement relationship. These video annotation symbols and video annotation semantic relationships apply to the relationships between the embedded video annotation playback range [375] and the embedded video annotation comment in box [391].

In the exemplary embodiment depicted in FIG. 49, an embedded sound recording [392] is shown with an embedded sound recording annotation playback range [393] and question embedded sound annotation symbol [394]. The embedded sound recording annotation playback range [393] designates the selected portion of the sound recording corresponding to the sound annotation. Embedded sound annotation symbols are associated with elements of a group of annotation semantic relationships. Each annotation semantic relationship shows a relationship between the embedded sound recording annotation playback range [393] and the sound annotation comment. Associated to each relationship in the group of annotation semantic relationships is a different embedded sound annotation symbol. As an example, the question embedded sound annotation symbol [394] indicates the creator of the sound annotation designated the annotation semantic relationship between the selected portion of the sound recording and the sound annotation comment as a question relationship. The question embedded sound annotation symbol [394] allows a user familiar with how the exemplary embodiment works to know that the user can click on the question embedded sound annotation symbol [394] and see a sound annotation comment that is a question about the embedded sound recording annotation playback range [393] before the user actually performs the action of clicking. The annotation comment box [31] appears when mousing over the embedded sound recording annotation playback range [393]. The user can use the contextual variant annotation control bar [34] embedded in the annotation comment box [31] to change privacy settings, share by email, share by social media, flag the sound annotation as inappropriate, delete the sound annotation object from the electronic database [62] assuming sufficient permissions, or edit the embedded objects comprising the sound annotation. Furthermore, the user can use the reputation selector [33] to vote on a reputation for the sound annotation. Corresponding to a question annotation symbol, disagreement annotation symbol, agreement annotation symbol, exclamation annotation symbol, and advertisement annotation symbol are five relationships in the group of annotation semantic relationships. These annotation semantic relationships are the question relationship, disagreement relationship, agreement relationship, exclamatory relationship, and advertisement relationship. These sound annotation symbols and sound annotation semantic relationships apply to the relationships between the embedded sound recording annotation playback range [393] and the sound annotation comment [32].

Aspects of the present invention were described in FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, and FIG. 49, and it will be understood that each item of these GUI diagrams can be implemented by computer readable program instructions. Next, methods and systems related to the features and capabilities depicted in the exemplary embodiments in FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, and FIG. 49 will be described and related to material previously presented. Describing these methods and systems involves describing bundles of data elements used to receive and store data as well as display bundles used to transmit and display visual elements on client devices. As bundles of display elements are described, various item boxes will be described. Once these item boxes are described, the relation of these elements to the other elements that were presented including the user interface will be discussed. The bundles of data elements, display bundles, and item boxes that will be described are to be construed as descriptions within the context of an exemplary embodiment.

In the context of an exemplary embodiment, bundles of data elements used for receiving data from client devices and storing this data using one or more computer systems will now be described. The bundles of data elements are picture annotation bundles, video annotation bundles, sound recording annotation bundles, embedded picture annotation bundles, embedded video annotation bundles, embedded sound recording annotation bundles, annotation group bundles, derived annotation group bundles, and annotation group bundles with derived annotations.

In the context of an exemplary embodiment, picture annotation bundles include one or more picture annotation atoms. A picture annotation atom is a unit that can be meaningfully used by itself to annotate a picture. For example, a picture annotation atom may include a picture annotation subject bounding box [301], picture annotation comment in box [303], and picture annotation arrow [302] as shown in the exemplary embodiment depicted in FIG. 36. However, it is also possible to use a picture annotation comment in box [303] by itself near the picture annotation subject [300]. Thus, a picture annotation comment in box [303] can be a picture annotation atom by itself. In addition to the picture annotation atoms, a picture annotation bundle includes frame information about the picture being annotated. The frame information includes the image size specified by the number of pixels along the x-axis and the number of pixels along the y-axis. Once the image size is specified, the elements comprising a picture annotation atom such as the picture annotation subject bounding box [301], picture annotation comment in box [303], and picture annotation arrow [302] are given relative coordinates based on the frame information. If the picture annotation subject bounding box [301] is specified by the x and y coordinates of its center, its width, and its length, the coordinates are specified relative to the lower left corner of the picture. The picture annotation comment in box [303] can be specified with a similar method along with markup information for the annotation comment contained in the picture annotation comment in box [303]. This markup information contains font size as well as formatting information for the text. In addition, information about the creation mechanism of the text is in the picture annotation bundle. The creation mechanism could be user-written, image captioning using an artificial intelligence (AI) or deep learning model, another annotation, or a combination of techniques. Furthermore, at least one of username, machine learning model, and other annotation data are recorded. If a combination of techniques is used, that information is also in the picture annotation bundle. The picture annotation arrow [302] can be specified by the x and y coordinates of its starting and ending points, along with information specifying whether an arrowhead is present at the starting point and whether an arrowhead is present at the ending point. Again, the coordinates are specified relative to the lower left corner of the picture. In addition to relative coordinate information, each element included in an annotation atom specifies a generation mechanism. The generation mechanism specifies whether that element was created by a user, machine learning model, or simple algorithm. In addition, at least one of the username, machine learning model name, and algorithm name is recorded. In addition, ovals can also be used. Ovals are specified by the x and y coordinates of the center relative to the lower left corner of the image, the width, the height, and the rotation of the oval. In addition, the generation mechanism along with at least one of the username, machine learning model name, and algorithm name is recorded.

In the context of an exemplary embodiment, embedded picture annotation bundles contain all the information within a picture annotation bundle as well as the URL of the web page or document on which the picture is located. The description written for picture annotation bundles should be interpreted with the embedded picture annotation subject [383] substituted for the picture annotation subject [300], the embedded picture annotation subject bounding box [384] substituted for the picture annotation subject bounding box [301], the embedded picture annotation arrow [385] substituted for the picture annotation arrow [302], and the embedded picture annotation comment in box [386] substituted for the picture annotation comment in box [303]. Figure FIG. 36 and FIG. 47 should be examined for details. If the document is a pdf or complex web page, information to locate the image such as the page of the pdf document or DOM locators of the picture are also stored.

In the context of an exemplary embodiment, video annotation bundles include one or more video annotation atoms. A video annotation atom is a unit that can be meaningfully used by itself to annotate a video. For example, a video annotation atom may include a video annotation subject bounding box [322], video annotation subject bounding box motion path [332], video annotation comment in box [324], video annotation comment input box motion path [334], video annotation arrow [323], and video annotation arrow motion path [333] as shown in the exemplary embodiment depicted in FIG. 41. However, it is also possible to use a video annotation comment in box [324] and video annotation comment input box motion path [334] by themselves with the video annotation comment in box [324] near the video annotation subject [321] while the video plays. Thus, the video annotation comment in box [324] and video annotation comment input box motion path [334] can be a video annotation atom by themselves. In addition to the video annotation atoms, a video annotation bundle includes frame information about the video being annotated. The frame information includes the video size specified by the number of pixels along the x-axis and the number of pixels along the y-axis. This should include the area of the video [319] and not the area of the video annotation playback [320]. Once the video size is specified, the elements comprising a video annotation atom such as the video annotation subject bounding box [322], video annotation subject bounding box motion path [332], video annotation comment in box [324], video annotation comment input box motion path [334], video annotation arrow [323], and video annotation arrow motion path [333] are given relative coordinates based on the frame information. If the video annotation subject bounding box [322] is specified by the x and y coordinates of its center, its width, and its length, the coordinates are specified relative to the lower left corner of the video. The video annotation subject bounding box motion path [332] should specify the evolution of the video annotation subject bounding box [322] over time. It specifies the change of the x and y coordinates of its center, its width, and its length over time. This specification is done by specifying the x and y coordinates relative to the lower left corner of the video at discrete time points during the video annotation playback range along with the interpolation mechanism between these discrete time steps. Since the relative x coordinate, relative y coordinate, width, and length are real numbers, the same method of storing the values at discrete time points and specifying an interpolation method is sufficient for all four values. Possible interpolation methods include linear interpolation, spline curves, bezier curves, and other methods. The video annotation comment in box [324] and video annotation comment input box motion path [334] can be specified with a similar method along with markup information for the annotation comment contained in the video annotation comment in box [324]. This markup information contains font size as well as formatting information for the text. In addition, information about the creation mechanism of the text is in the video annotation bundle. The creation mechanism could be user-written, video captioning using an AI or deep learning model, another annotation, or a combination of techniques. Furthermore, at least one of username, machine learning model, and other annotation data are recorded. If a combination of techniques is used, that information is also in the video annotation bundle. The video annotation arrow [323] and video annotation arrow motion path [333] can be specified by the relative x and y coordinates of its starting and ending points along with information specifying whether an arrow head is present at the starting point and whether an arrow head is present at the ending point. The specification of the video annotation arrow motion path [333] is done by specifying the relative x and y coordinates of the starting and ending points at discrete time points during the video annotation playback range along with the interpolation mechanism between these discrete time steps. Again, the coordinates are specified relative to the lower left corner of the video. In addition to relative coordinate information, each element included in an annotation atom specifies a generation mechanism. The generation mechanism specifies whether that element was created by a user, an AI or deep learning model, another annotation, or a combination of techniques. In addition, at least one of the username, AI or deep learning model name, and algorithm name is recorded. In addition, ovals can also be used. Ovals are specified by the x and y coordinates of the center relative to the lower left corner of the video, the width, the height, and the rotation of the oval. In addition, the generation mechanism along with at least one of the username, AI or deep learning model name, and algorithm name are recorded. Video annotation symbol information can also be included in video annotation bundles.

In the context of an exemplary embodiment, embedded video annotation bundles contain all the information within a video annotation bundle as well as the URL of the web page or document on which the video is located. The description written for video annotation bundles should be interpreted with the embedded video annotation subject [388] substituted for the video annotation subject [321], the embedded video annotation subject bounding box [389] substituted for the video annotation subject bounding box [322], the embedded video annotation arrow [390] substituted for the video annotation arrow [323], the embedded video annotation comment in box [391] substituted for the video annotation comment in box [324], the embedded video annotation subject bounding box motion path substituted for the video annotation subject bounding box motion path [332], the embedded video annotation arrow motion path substituted for the video annotation arrow motion path [333], the embedded video annotation comment in box motion path substituted for the video annotation comment input box motion path [334], and the embedded video annotation symbol substituted for the video annotation symbol. Figure FIG. and FIG. 48 should be examined for details. If the document is a pdf or complex web page, information to locate the video such as the page of the pdf document or DOM locators of the video are also stored.

In the context of an exemplary embodiment, sound recording annotation bundles include one or more sound recording annotation atoms. A sound recording annotation atom is a unit that can be meaningfully used by itself to annotate a sound recording. For example, a sound recording annotation atom may include a sound recording annotation playback range, sound recording annotation symbol, and sound recording annotation comment. However, it is possible to use just a sound recording annotation playback range and sound recording annotation comment. Thus, the sound recording annotation playback range and sound recording annotation comment can comprise the sound recording annotation atom by itself. The sound recording annotation comment may have associated markup information for the sound recording annotation comment. This markup information contains font size as well as formatting information for the text. In addition, information about the creation mechanism of the text is in the sound recording annotation bundle. The creation mechanism could be user-written, sound recognition using an AI or deep learning model, copying another annotation, or a combination of techniques. In addition, the creation mechanism, along with at least one of the username, AI or deep learning model name, and other annotation references are recorded. More than one source name type is recorded when a combination of techniques is used. The sound recording annotation playback range can also be determined based on sound search. Thus, the generation mechanism for the sound recording playback range also should be recorded along with at least one of the username, AI or deep learning model name, or other annotation comment. More than one generation mechanism and source information are recorded when a combination of techniques are used. In addition, sound recording frame information is recorded to facilitate the placement of sound recording annotation playback ranges on the sound recording annotation playback controls.

In the context of an exemplary embodiment, embedded sound recording annotation bundles contain all the information within a sound recording annotation bundle as well as the URL of the web page or document on which the sound recording is located. The description written for sound recording annotation bundles should be interpreted with embedded sound recording annotation playback range [393] substituted for sound recording playback range, embedded sound recording annotation symbol substituted for sound recording annotation symbol, and embedded sound annotation comment substituted for sound annotation comment. Furthermore, it should be understood that embedded sound recording frame information is recorded with the embedded sound recording annotation bundle to facilitate the placement of the embedded sound recording annotation playback range [393] on the embedded sound recording playback controls. Figure FIG. 44 and FIG. 49 should be examined for details. If the document is a complex web page, information to locate the sound recording, such as the DOM locators of the sound recording, are also stored.

In the context of an exemplary embodiment, annotation group bundles include references to all the annotations included in that particular annotation group. In addition, information about whether or not the annotations collide is stored along with metadata indicating when the annotation group was created and whether collision detection was done by a user or AI or deep learning model. At least one of the user and AI or deep learning model performing collision detection is also stored in the annotation group bundle.

In the context of an exemplary embodiment, derived annotation group bundles include references to all the annotations included in that particular derived annotation group. In addition, information about whether or not the annotations collide is stored along with metadata indicating when the annotation group was created and whether collision detection was done by a user or AI or deep learning model. At least one of the user and AI or deep learning model performing collision detection is also stored in the derived annotation group bundle. A derived annotation group bundle contains one derived annotation along with references to all the annotations included in that particular annotation group. The annotation connection arrows can be determined from the annotation references present within the derived annotation group bundle. In this exemplary embodiment, only one derived annotation is present, which provides all information to draw annotation connection arrows. In addition, the derived annotation comment is stored in the derived annotation group bundle. Markup information for the derived annotation comment is also stored. This markup information contains font size as well as formatting information for the text. In addition, information about the creation mechanism of the text is in the derived annotation group bundle. The creation mechanism could be user-written, AI or deep learning model generated, another annotation copied, or a combination of techniques. Furthermore, at least one of username, machine learning model, and other annotation data are recorded. If a combination of techniques is used, that information is also in the derived annotation group bundle.

In the context of an exemplary embodiment, annotation group with derived annotations bundles include references to all the derived annotations and annotations present in that particular annotation group with derived annotations. In addition, information about whether or not the annotations collide is stored along with metadata indicating when the annotation group with derived annotations was created and whether collision detection was done by a user or AI or deep learning model. At least one of the user and AI or deep learning model performing collision detection is also stored in the annotation group bundle.

Next, some types of display bundles and item boxes will be described. These descriptions are construed to be in the context of an exemplary embodiment. In the context of an exemplary embodiment, the display bundles that will be described are picture annotation display bundles, video annotation display bundles, sound recording annotation display bundles, embedded picture annotation display bundles, embedded video annotation display bundles, embedded sound recording annotation display bundles, annotation group display bundles, derived annotation group display bundles, and annotation group with derived annotations display bundles. In the context of an exemplary embodiment, the item boxes that will be described are the picture annotation item box, video annotation item box, sound recording annotation item box, embedded picture annotation item box, embedded video annotation item box, embedded sound recording item box, annotation group item box, derived annotation group item box, and annotation group with derived annotations item box. One purpose of display bundles, in an exemplary embodiment, is to provide the data for a web browser to display the corresponding item box associated to that type of annotation or media item. Thus, item boxes will be described in relation to the annotation item box [36] presented in the exemplary embodiment depicted in FIG. 9. In addition to the numbered items in the annotation item box, the annotation item box also contains the item box annotation highlighted text, item box annotation symbol, item box annotation comment, and item box URL. Once the various item boxes are described in the context of an exemplary embodiment, the data structures corresponding to the various display bundles can be illustrated. In addition, referring to displayed bundles is sometimes helpful for illustrative purposes. Displayed bundles are the visual output created using display bundles. This visual output is contained within an item box. In contexts such as the notepad, the displayed bundle may be present without an entire item box being present.

In an exemplary embodiment, a picture annotation item box will include the separate context variant annotation control bar [41] and separate context reputation selector [42] like the annotation item box [36], as shown in the exemplary embodiment in FIG. 9. In place of the screenshot with marked text [37], a picture annotation item box will contain a thumbnail of the picture along with the picture annotation displayed over the thumbnail picture. In place of the separate context annotation highlighted text [38], separate context question displayed annotation symbol [39], and separate context annotation comment [40], the picture annotation item box will have the picture annotation comment. The URL will not be present for picture annotation item boxes, but it will be present for embedded picture annotation item boxes. To ensure the web browser can display these picture annotation item boxes, the picture annotation display bundle should contain a marked thumbnail image of the picture with the picture annotation displayed over it with objects such as the picture annotation subject bounding box [301], picture annotation comment in box [303], and picture annotation arrow [302] resized and overlaid properly. In addition, the picture annotation display bundle will need to contain the picture annotation comment, username, and reputation information.

In an exemplary embodiment, an embedded picture annotation item box will include the separate context variant annotation control bar [41] and separate context reputation selector [42] like the annotation item box [36]. In place of the screenshot with marked text [37], an embedded picture annotation item box will contain a thumbnail of the embedded picture along with the picture annotation displayed over the thumbnail picture. In place of the separate context annotation highlighted text [38], separate context question displayed annotation symbol [39], and separate context annotation comment [40], the embedded picture annotation item box will have the embedded picture annotation comment. The URL will correspond to the URL including the embedded picture that was annotated with a picture annotation. To ensure the web browser can display these embedded picture annotation item boxes, the embedded picture annotation display bundle should contain a marked thumbnail image of the embedded picture with the picture annotation displayed over it with objects such as the embedded picture annotation subject bounding box [384], embedded picture annotation comment in box [386], and embedded picture annotation arrow [385] resized and overlaid properly. In addition, the embedded picture annotation display bundle will need to contain the embedded picture annotation comment, username, and reputation information.

In an exemplary embodiment, a video annotation item box will include the separate context variant annotation control bar [41] and separate context reputation selector [42] like the annotation item box [36], as shown in the exemplary embodiment in FIG. 9. In place of the screenshot with marked text [37], a video annotation item box will contain a thumbnail of the video frame at some chosen point in time along with the video annotation displayed over the thumbnail of the video frame at the same chosen point in time. Furthermore, a play button can allow thumbnail videos to play, showing a portion of the thumbnail video and video annotation. In place of the separate context annotation highlighted text [38] will be video sound summarization text that is a machine-generated piece of text summarizing the sound in the video. Next, the video annotation item box will have a video annotation comment, and the video annotation item box will also have a video annotation symbol determining the annotation semantic relationship between the video sound summarization text and video annotation comment. The URL will not be present for video annotation item boxes, but it will be present for embedded video annotation item boxes. To ensure the web browser can display these video annotation item boxes, the video annotation display bundle should contain a marked thumbnail image of the video frame at some chosen point in time with the video annotation displayed over it with objects such as the video annotation subject bounding box [322], video annotation comment in box [324], and video annotation arrow [323] resized and overlaid properly. In case a user hits the play button, the video annotation display bundle will need to contain a thumbnail video with the video annotation overlaid. In addition, the video annotation display bundle will need to contain the video sound summarization text, video annotation symbol, video annotation comment, username, and reputation information. Furthermore, users will be allowed to modify machine-generated aspects of video annotations.

In an exemplary embodiment, an embedded video annotation item box will include the separate context variant annotation control bar [41] and separate context reputation selector [42] like the annotation item box [36], as shown in the exemplary embodiment in FIG. 9. In place of the screenshot with marked text [37], an embedded video annotation item box will contain a thumbnail of the embedded video frame at some chosen point in time along with the embedded video annotation displayed over the thumbnail of the embedded video frame at the same chosen point in time. Furthermore, a play button can allow thumbnail videos to play, showing a portion of the thumbnail video and video annotation. In place of the separate context annotation highlighted text [38] will be the embedded video sound summarization text that is a machine-generated piece of text summarizing the sound in the video. Next, the embedded video annotation item box will have an embedded video annotation comment, and the embedded video annotation item box will also have an embedded video annotation symbol determining the annotation semantic relationship between the embedded video sound summarization text and embedded video annotation comment. The URL of the web page in which the video is embedded will be shown in the embedded video annotation item box. To ensure the web browser can display these embedded video annotation item boxes, the embedded video annotation display bundle should contain a marked thumbnail image of the embedded video frame at some chosen point in time with the embedded video annotation displayed over it with objects such as the embedded video annotation subject bounding box [389], embedded video annotation comment in box [391], and embedded video annotation arrow [390] resized and overlaid properly. In case a user hits the play button, the embedded video annotation display bundle will need to contain a thumbnail video with the embedded video annotation overlaid. In addition, the embedded video annotation display bundle will need to contain the embedded video sound summarization text, embedded video annotation symbol, embedded video annotation comment, username, and reputation information. Furthermore, users will be allowed to modify machine-generated aspects of video annotations.

In an exemplary embodiment, a sound recording annotation item box will include the separate context variant annotation control bar [41] and separate context reputation selector [42] like the annotation item box [36], as shown in the exemplary embodiment in FIG. 9. In place of the screenshot with marked text [37], a sound recording annotation item box will contain a thumbnail representative of the sound recording called the thumbnail associated sound recording image. This will be done by first creating sound recording summarization text that converts the sound recording into a textual representation. This will be done by using voice recognition and other sound understanding technologies. Once a textual representation is created, an image associated with that sound recording summarization text can be found using AI or deep learning models. This image will be called the associated sound recording image. A thumbnail representation of the associated sound recording image is the thumbnail associated sound recording image. In place of the separate context annotation highlighted text [38] will be the sound recording summarization text. Next, the sound recording annotation item box will have a sound recording annotation comment, and the sound recording annotation item box will also have a sound recording annotation symbol determining the annotation semantic relationship between the sound recording summarization text and sound recording annotation comment. The URL will not be present for sound recording annotation item boxes, but it will be present for embedded sound recording annotation item boxes. To ensure the web browser can display these sound recording annotation item boxes, the sound recording annotation display bundle should contain the thumbnail associated sound recording image, sound recording summarization text, sound recording annotation comment, sound recording annotation symbol, username, and reputation information. Furthermore, users will be allowed to modify machine-generated aspects of sound recording annotations.

In an exemplary embodiment, an embedded sound recording annotation item box will include the separate context variant annotation control bar [41] and separate context reputation selector [42] like the annotation item box [36]. In place of the screenshot with marked text [37], an embedded sound recording annotation item box will contain a thumbnail representative of the embedded sound recording called the thumbnail associated embedded sound recording image. This will be done by first creating embedded sound recording summarization text that converts the embedded sound recording into a textual representation. This will be done by using voice recognition and other sound understanding technologies. Once a textual representation is created, an image associated with that embedded sound recording summarization text can be found using AI or deep learning models. This image will be called the associated embedded sound recording image. A thumbnail representation of the associated embedded sound recording image is the thumbnail associated embedded sound recording image. In place of the separate context annotation highlighted text [38] will be the embedded sound recording summarization text. Next, the embedded sound recording annotation item box will have an embedded sound recording annotation comment, and the embedded sound recording annotation item box will also have an embedded sound recording annotation symbol determining the annotation semantic relationship between the embedded sound recording summarization text and embedded sound recording annotation comment. The URL of the website on which the embedded sound recording is found will be present for embedded sound recording annotation item boxes. To ensure the web browser can display these embedded sound recording annotation item boxes, the embedded sound recording annotation display bundle should contain the thumbnail associated embedded sound recording image, embedded sound recording summarization text, embedded sound recording annotation comment, embedded sound recording annotation symbol, username, and reputation information. Furthermore, users will be allowed to modify machine-generated aspects of sound recording annotations.

In an exemplary embodiment, an annotation group item box will include the separate context variant annotation control bar [41] and separate context reputation selector [42] like the annotation item box [36], as shown in the exemplary embodiment in FIG. 9. In place of the screenshot with marked text [37], an annotation group item box will contain a thumbnail representative of the annotation group. For picture annotations, this means a thumbnail image of the picture with all picture annotations included in the annotation group. Picture annotations and annotation groups include picture annotations of embedded pictures. For video annotations, this means a thumbnail image of the video at a point in time with all the video annotations included in the annotation group at that same point in time. Furthermore, thumbnail videos would include thumbnail videos with all video annotations in the annotation group displayed throughout the thumbnail video. Video annotations and annotation groups include video annotations of embedded videos. For sound recording annotations, this means a thumbnail image representative of the sound for all sound recording playback ranges for all the sound recording annotations in the annotation group. Such an image would be based on the sound recording summarization text for all the sound recording playback ranges. In place of the separate context annotation highlighted text [38] will be a list of annotations in that particular annotation group. In place of the separate context annotation comment [40] will be a user-generated comment about that particular annotation group. Furthermore, these elements can be modified by users if machine-generated images and default text is not suitable. In an alternative embodiment, the list of annotations in the annotation group can be replaced by more suitable summarization text generated by a human. The URL will not be present for annotation group item boxes that do not have any embedded annotations, but the URL will be present for annotation group item boxes including embedded annotations. An embedded annotation group annotation symbol can be used denoting a semantic relationship amongst the source material and annotations in the annotation group. An annotation group item box will also indicate the number of annotations in the annotation group. To ensure the web browser can display these annotation group annotation item boxes, the annotation group display bundle should include the relevant thumbnail image or thumbnail video, list of references to annotation objects, relevant summarization text, relevant annotation comment, relevant annotation group annotation symbol, username, and reputation information. Furthermore, users will be allowed to modify machine-generated aspects of annotation groups.

In an exemplary embodiment, a derived annotation group item box will include the separate context variant annotation control bar [41] and separate context reputation selector [42] like the annotation item box [36], as shown in the exemplary embodiment in FIG. 9. In place of the screenshot with marked text [37], a derived annotation group item box will contain a thumbnail representative of the derived annotation group. For picture annotations, this means a thumbnail image of the picture with all picture annotations included in the derived annotation group. Picture annotations and derived annotation groups include picture annotations of embedded pictures. For video annotations, this means a thumbnail image of the video at a point in time with all the video annotations included in the derived annotation group at that same point in time. Furthermore, thumbnail videos would include thumbnail videos with all video annotations in the derived annotation group displayed throughout the thumbnail video. Video annotations and derived annotation groups include video annotations of embedded videos. For sound recording annotations, this means a thumbnail image representative of the sound for all sound recording playback ranges for all the sound recording annotations in the derived annotation group. Such an image would be based on the sound recording summarization text for all the sound recording playback ranges. In place of the separate context annotation highlighted text [38] will be a list of annotations in that particular derived annotation group. In place of the separate context annotation comment [40] will be a user-generated comment about that particular derived annotation group. Furthermore, these elements can be modified by users if machine-generated images and default text is not suitable. In an alternative embodiment, the list of annotations in the derived annotation group can be replaced by more suitable summarization text generated by a human. The URL will not be present for derived annotation group item boxes that do not have any embedded annotations, but the URL will be present for derived annotation group item boxes including embedded annotations. A derived annotation group annotation symbol can be used denoting a semantic relationship amongst the source material and annotations in the annotation group. To ensure the web browser can display these annotation group annotation item boxes, the annotation group display bundle should include the relevant thumbnail image or thumbnail video, list of references to annotation objects, relevant summarization text, relevant derived annotation comment, relevant derived annotation group annotation symbol, username, and reputation information. Furthermore, users will be allowed to modify machine-generated aspects of derived annotation groups.

At this point, annotation groups and derived annotation groups may appear similar within the context of the exemplary embodiments that have been described. However, derived annotation groups, derived annotation group item boxes, and derived annotation group display bundles, when used, will be handled differently from annotation groups, annotation group item boxes, and annotation group display bundles. Annotation groups indicate a much closer link between the annotations, and derived annotation groups can be incorporated into annotation groups. The impact of these differences can be seen by examining FIG. 44 and FIG. 45.

In an exemplary embodiment, an annotation group with derived annotations item box will include the separate context variant annotation control bar [41] and separate context reputation selector [42] like the annotation item box [36], as shown in the exemplary embodiment in FIG. 9. An annotation group with derived annotations item box and corresponding annotation group with derived annotations display bundle is similar to an annotation group item box and annotation group display bundle except for the fact that information about the derived annotations such as its constituent annotations and the derived annotation comment is present for each derived annotation group. The presence of this information allows the display of derived annotations as depicted in FIG. 44 and FIG. 45. In addition, the annotation group with derived annotations item box displays the number of annotations and the number of derived annotation groups within the annotation group with derived annotations. All of this information is reflected in the annotation group with derived annotations display bundle. An annotation group with derived annotations item box will include the separate context variant annotation control bar [41] and separate context reputation selector [42] like the annotation item box [36]. In place of the screenshot with marked text [37], an annotation group with derived annotations item box will contain a thumbnail representative of the annotation group with derived annotations. For picture annotations, this means a thumbnail image of the picture with all picture annotations included in the annotation group with derived annotations. Since derived annotation groups alter images by virtue of the annotations that are contained in the derived annotation group, it is the set of all annotations contained in the annotation group with derived annotations that matters. Picture annotations and annotation groups include picture annotations of embedded pictures. For video annotations, this means a thumbnail image of the video at a point in time with all the video annotations included in the annotation group with derived annotations at that same point in time. Furthermore, thumbnail videos would include thumbnail videos with all video annotations in the annotation group with derived annotations displayed throughout the thumbnail video. Again, it is the set of all annotations contained in the annotation group with derived annotations that matters. Video annotations and annotation groups include video annotations of embedded videos. For sound recording annotations, this means a thumbnail image representative of the sound for all sound recording playback ranges for all the sound recording annotations in the annotation group with derived annotations. Such an image would be based on the sound recording summarization text for all the sound recording playback ranges in the set of all annotations in the annotation group with derived annotations. In place of the separate context annotation highlighted text [38] will be a list of annotations in that particular annotation group with derived annotations. In place of the separate context annotation comment [40] will be a user-generated comment about that particular annotation group with derived annotations. Furthermore, these elements can be modified by users if machine-generated images and default text is not suitable. In an alternative embodiment, the list of annotations in the annotation group with derived annotations can be replaced by more suitable summarization text generated by a human. The URL will not be present for annotation group with derived annotations item boxes that do not have any embedded annotations, but the URL will be present for annotation group with derived annotations item boxes including embedded annotations. An embedded annotation group with derived annotations symbol can be used denoting a semantic relationship amongst the source material and annotations in the annotation group with derived annotations. An annotation group with derived annotations item box will also indicate the number of annotations in the annotation group with derived annotations as well as the number of derived annotation groups. To ensure the web browser can display these annotation group with derived annotations item boxes, the annotation group with derived annotations display bundle should include the relevant thumbnail image or thumbnail video, list of references to annotation objects, relevant summarization text, relevant annotation comment, relevant annotation group with derived annotations symbol, username, and reputation information. Furthermore, users will be allowed to modify machine-generated aspects of annotation groups with derived annotations.

Having discussed the various types of bundles of data elements, display bundles, and item boxes within the context of an exemplary embodiment, the changes that need to be made to FIG. 14, FIG. 15, FIG. 16, FIG. 17, and FIG. 18 will be described. These changes adapt those sequence diagrams and flowcharts to implement methods and systems related to the features and capabilities shown and described in the written descriptions and in the exemplary embodiments depicted in FIG. 35, FIG. 36, FIG. 37, FIG. 38, FIG. 39, FIG. 40, FIG. 41, FIG. 42, FIG. 43, FIG. 44, FIG. 45, FIG. 46, FIG. 47, FIG. 48, and FIG. 49. The sequence diagram in FIG. 14 applies with one of the bundles of data elements previously described along with its corresponding display bundle and its corresponding displayed bundle where the annotation creation process is different for the different types of annotations previously described when the different types of annotations are implemented. The display bundle occurs where FIG. 14 uses annotation display bundle, and the displayed bundle occurs where FIG. 14 uses displayed annotation bundle. The sequence diagram in FIG. 15 also applies with the display bundles and displayed bundles previously described. These display bundles occur where annotation displayed bundles occur in FIG. 15, and the displayed bundles occur where FIG. 15 uses displayed annotation bundles. A display bundle has the data to display either its corresponding item box or its corresponding displayed bundle. Depending on the exemplary embodiment, either an item box or a displayed bundle can be shown in the user interface. Typically, the item box is the displayed bundle along with the separate context variant annotation control bar [41] and separate context reputation selector [42]. The separate context variant annotation control bar [41] and separate context reputation selector [42] are shown for the annotation item box [36] in the exemplary embodiment shown in FIG. 9. The sequence diagram in FIG. 16 applies with annotation symbol display bundles replaced with the appropriate embedded annotation display bundles and closed displayed annotation symbols replaced with the visible elements of the appropriate embedded annotation. Embedded annotation display bundles and visible elements of embedded annotations were previously discussed. FIG. 17 and FIG. 18 apply as they are, wherein the bundle of data elements and display bundles are chosen from the types that were previously specified herein.

In an exemplary embodiment, the item bin [44] inside the annotation organization context area [43] in FIG. 10 can contain annotation item boxes, embedded picture annotation item boxes, embedded video annotation item boxes, embedded sound recording item boxes, annotation group item boxes, derived annotation group item boxes, annotation group with derived annotations item boxes, and notepads. Notepads can also be displayed as a notepad item box. All of these types of item boxes have a separate context variant annotation control bar [41] as depicted for the annotation item box [36]. While the other elements of the annotation item box [36] change for other types of item boxes, the separate context variant annotation control bar [41] and the displayed form factor of the item box does not change. This allows the integration of these new types of item boxes into the item bin [44]. All these item types are created on an external site, and they appear in the item bin [44] shortly after the user creates these items. This is facilitated through the use of web sockets that push information from the annotation server [61] to all connected web browsers that should receive the display bundles based on access controls and use case. Item boxes can be moved from the item bin [44] to a writeable collection represented by a displayed writeable collection [50] as depicted in the exemplary embodiment in FIG. 11. Furthermore, annotation item boxes, embedded picture annotation item boxes, embedded video annotation item boxes, and embedded sound recording item boxes can be added to the active notepad [159] using the add to notepad icon [158] button located in the contextual variant annotation control bar [34] as depicted in the exemplary embodiment in FIG. 23. The add to notepad icon [158] button does not appear in the contextual variant annotation control bar [34] labelled in all figures. However, such a button can be added to the contextual variant annotation control bar [34] within an exemplary embodiment. Other item types can also be added to the active notepad [159] using a trigger to perform the addition to the notepad. In all cases, clicking on the item box within the active notepad [159] should open the relevant item in a browser tab, scroll to the location of the annotation, and display the annotation. All the different types of item boxes can appear within collections. While the collection displayed in the exemplary embodiment depicted in FIG. 31 only shows annotation item boxes, all types of item boxes can be present within a collection. All the comments about stacked set of displayed annotation items apply to stacked sets of items of various types. In addition, the comments about windowing functions also apply. Stacked sets of items can be grouped based on URL or based on the picture item, video item, sound recording item, or document item that is being annotated. Furthermore, the types of items that are included in a collection do not alter the other properties of collections. Collections represented by displayed collections can be displayed on pages similar to the one shown in the exemplary embodiment of FIG. 32.

As previously mentioned, filters such as the search filter shown in the exemplary embodiment in FIG. 10 are used to receive inputs from users. In the case of the item bin [44] search filter [46], it is a search phrase. These inputs are translated into parameter values sent to the annotation server [61]. These parameter values are used by the annotation server [61] to input parameters into a request query that is used by the electronic database [62]. The request query includes parameter values and a page number. The request query with parameter values is used to specify a set of items and a sequential ordering on those items. These items include web page annotations, embedded picture annotations, embedded video annotations, embedded sound recordings, picture annotations, video annotations, sound recording annotations, annotation groups, derived annotation groups, annotation groups with derived annotations, pdf document annotations, pdf documents, pictures, videos, links, and ordinary comments. Filters can also restrict to certain item types. The page number specifies a specific page. Furthermore, the request query may include a specified number of items that are to be sent to the web browser running on the client electronic device. This request query contains parameters for filter values such as search phrases and an exclusion list of items to exclude from the specified list of items and sequential ordering on that list of items. As previously discussed, this sequential ordering provides the information for paging in the exemplary embodiments depicted in FIG. 10 and FIG. 31. Collection filters and collection paging works as previously described for the descriptions of the exemplary embodiments depicted in FIG. 10 and FIG. 32. The same applies to pinning functionality.

The inbox described in the exemplary embodiment depicted in FIG. 33 would function in a similar way when collections include different item types. The change would be that users can now discuss granular details of more item types within collection messages. Furthermore, functionality can be built within message chains specialized to each type of item. Then, functionality can be implemented to change objects that are components of an annotation, approve changes to an annotation, or fork an annotation that is added to the current collection. If discourse is focused around a picture annotation, selectors for each object in the picture annotation can be used to facilitate discussion. Furthermore, selectors for other item types such as video annotations or sound recording annotations can be built into the message chain functionality. Such functionality can transform the video annotation subject bounding box [322], video annotation comment in box [324], or video annotation arrow [323], and change the video annotation subject bounding box motion path [332], video annotation arrow motion path [333], and video annotation comment input box motion path [334]. After the changes are proposed in a message chain, the owner of the item can approve the changes, or an admin can approve forking the item into a new item in the context of the current collection.

The exemplary embodiments depicted in FIG. 28 and FIG. 29 also apply when multiple item types are present. In this situation, the annotation server [61] and electronic database [62] will handle these different types of items. In the exemplary embodiment, the annotation server [61] may have REST APIs to handle different item types, and the electronic database [62] has a schema that handles the different data elements in the various types of bundles. The hardware requirements are impacted in the following ways. If video [319] is not stored locally and is reference through a URL, the presence of video [319] will not increase storage requirements as much as if video [319] is stored locally. If it is stored locally or through the content delivery network [63], video [319] will have a bigger impact on storage requirements. The presence of sound recording playback [348] may create the need to use deep learning models to handle voice and sound recognition. The presence of video [319] will increase the computational processing requirements of the system since video [319] typically has greater computational processing requirements than other media types.

To provide additional annotation features to the user in an exemplary embodiment, machine learning and deep learning models can be deployed and configured through the web browser extension of an annotation capable web browser. It is also possible to handle the deployment and configuration directly through an annotation capable web browser if the annotation capable web browser is not built through the use of a web browser extension. This functionality can be made available to the user through a panel somewhere on the web page or a floating toolbar. This functionality can also be exposed through menu options or a fixed browser toolbar. The floating toolbar can also be attached to a location of the page or placed inside a side panel in the web browser. For pictures and embedded pictures, this panel or floating toolbar can make available buttons to handle the tasks of recognizing objects in images, recognizing text in images, configuring the recognition characteristics of the object and text detectors, and configuring the characteristics of the annotation elements. The annotation subject bounding box, annotation arrow, and annotation comment box are annotation elements. The object recognition button draws annotation subject bounding boxes with dashed lines around potential annotation subjects. The user can then select the annotation subject bounding box of interest and write an annotation comment in the annotation comment input box that appears. Based on configuration settings, an annotation arrow may automatically be created. The user can also be provided the option to select multiple annotation subject bounding boxes that can result in the creation of one annotation arrow for each annotation subject bounding box with one end of each annotation arrow pointing at the annotation subject bounding box and the other end pointing at the annotation comment input box or annotation comment box depending on whether or not the annotation comment has been written. The placement of arrowheads is a configuration property. Another configurable property is the visibility characteristic of the annotation subject bounding box, annotation arrow, and the annotation comment box. The visibility characteristics include visible, mouseover, and invisible. Visible is for always visible annotation elements. Mouseover is for annotation elements that become visible on mouseover of target areas. And invisible is for annotation elements that are always invisible. The mouseover target areas could be at least one of the annotation subject or the annotation element that is visible. In an alternative embodiment, annotation subject outlines, enclosing a closed region that includes the pixels of the annotation subject, are used. These annotation subject outlines as opposed to annotation subject bounding boxes can be used. Furthermore, the object outline can be a mouseover element as opposed to a visible element, wherein this visibility characteristic can be controlled through a configuration setting. It is also possible to have a configuration setting that allows the user to choose whether to use annotation subject bounding boxes or annotation subject outlines. Determining the annotation subject bounding boxes or annotation subject outlines relies on machine learning or deep learning models that can recognize objects and determine annotation subject bounding boxes or annotation subject outlines. Deep learning models can be run in the web browser running on a client electronic device either by using the CPU or GPU of the client electronic device. The GPU can be used through the use of the WebGL interface exposed by modern web browsers that in turn uses the GPU of the client electronic device. Annotation subject bounding boxes and annotation subject outlines can then be determined through the use of annotation object detectors using region-based convolution neural networks (R-CNNs) or through object segmentation using region-based convolution neural networks (R-CNNs). In addition to R-CNN based models, alternative embodiments can employ other machine learning or deep learning methods. Since different deep learning models have different recognition characteristics, the user can input the desired recognition characteristics of the object and text detectors. Different machine learning or deep learning models can be selected based on those characteristics. Text in images can be recognized through the use of convolution neural networks (CNNs) designed to recognize various letters, numbers, and other characters. Furthermore, the user can select whether to group individual characters into words, and whether to group individual words into n-grams in the configuration options. Furthermore, the user can input words or tags through configuration options available for recognition characteristics to limit object recognition to the specified types of objects the user has input. For handling videos and embedded videos, an additional button is provided for the configuration of annotation element motion paths. The techniques described for pictures can also be implemented in individual frames of videos. Furthermore, deep learning models can track annotation subjects through time and ensure that annotation subject bounding boxes and annotation subject outlines move with the annotation subject. This can be done through individual frame analysis at discrete points and then using interpolation methods between the discrete points. This yields motion paths for the annotation subject bounding box and annotation subject outline. The contour shifts in the annotation subject outline are also computed. The configuration of these motion paths and annotation outline evolutions is available to the user through the additional button in the panel, menu option, browser toolbar, or floating toolbar handling configuration options of motion paths of annotation elements. Machine learning and deep learning models for voice and sound recognition in videos for annotation purposes can be handled by another configuration option in the panel, menu options, browser toolbar, or floating toolbar.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated. Thus, the description is to be regarded as illustrative instead of restrictive on the present invention.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader and are not meant to limit the scope of the invention or claims.

As used herein, a phrase referring to "at least one of" a list of items refers to any combination of those items, including single members. As an example, "at least one of A, B, or C" is intended to cover A, B, C, A and B, A and C, B and C, and A, B, and C. Conjunctive language such as the phrase "at least one of X, Y and Z," unless specifically stated otherwise, is otherwise understood within the context as used in general to convey that an item, term, etc. may be at least one of X, Y or Z. Thus, such conjunctive language is not generally intended to imply that certain embodiments require at least one of X, at least one of Y, and at least one of Z to each be present.

The flowchart, GUI, sequence, system, component, and swimlane activity diagrams in the figures illustrate the use case, functionality, architecture, and operation of possible implementations of methods, computer program products, and systems according to various embodiments of the present invention. In this regard, each item in the flowchart, GUI, sequence, system, component, and swimlane activity diagrams may represent a module, segment, or portion of instructions, which comprises one or more executable instructions for implementing the specified logical function(s). In some alternative implementations, the functions noted in the item may occur out of the order noted in the figures. For example, two items shown in succession may, in fact, be executed substantially concurrently, or the items may sometimes be executed in the reverse order depending upon the functionality involved. It will also be noted that each item, that does not involve one or more users, of the flowchart, GUI, sequence, system, component, and swimlane activity diagrams, and combinations of items, wherein the combination of items does not involve one or more users, in the flowchart, GUI, sequence, system, component, and swimlane activity diagrams can be implemented by special purpose hardware-based systems that perform the specified functions or acts or carry out combinations of special purpose hardware and computer instructions.

Aspects of the present invention are described herein with reference to flowchart, GUI, sequence, system, component, and swimlane activity diagrams of methods, computer program products, and systems according to embodiments of the invention. It will be understood that each item, that does not involve one or more users, of the flowchart, GUI, sequence, system, component, and swimlane activity diagrams, and combinations of items, that do not involve one or more users, in the flowchart, GUI, sequence, system, component, and swimlane activity diagrams can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts, that do not involve one or more users, specified in the flowchart, GUI, sequence, system, component, and swimlane activity diagram item or items, wherein the item and items do not involve one or more users. These computer readable program instructions may also be stored in a computer readable storage medium that can direct a computer, a programmable data processing apparatus, and or other devices to function in a particular manner, such that the computer readable storage medium having instructions stored therein comprises an article of manufacture including instructions which implement aspects of the function/act, that does not involve one or more users, specified in the flowchart, GUI, sequence, system, component, and swimlane activity diagram item or items, wherein the item and items do not involve one or more users.

Such code, as will be appreciated by those of ordinary skilled in the art, may be stored or adapted for storage in one or more tangible machine readable media, such as on memory chips, local or remote hard disks, optical disks or other media, which may be accessed by a processor based system to execute the stored code. Note that the tangible media may comprise paper or another suitable medium upon which the instructions are printed. For instance, the instructions may be electronically captured via optical scanning of the paper or other medium, then compiled, interpreted or otherwise processed in a suitable manner if necessary, and then stored in a computer memory. Furthermore, note that the tangible media may comprise version control repositories utilizing memory chips, local, or remote hard disks, optical disks or other media for storage. For instance, the instructions can be obtained from a version control repository, then compiled, interpreted or otherwise processed in a suitable way, and then stored in a computer memory.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart, GUI, sequence, system, component, and swimlane activity diagram item or items.

Further, while the methods, non-transitory computer readable mediums, systems, and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various implementations described and the appended claims. Furthermore, the disclosure herein of any particular feature, aspect, method, property, characteristic, quality, attribute, element, or the like in connection with an implementation or embodiment can be used in all other implementations or embodiments set forth herein. Any methods disclosed herein need not be performed in the order recited. The methods disclosed herein may include certain actions taken by a practitioner; however, the methods can also include any third-party instruction of those actions, either expressly or by implication. The ranges disclosed herein also encompass any and all overlap, sub-ranges, and combinations thereof.

Language such as "at least," "at a minimum," and the like includes the number recited. Numbers preceded by a term such as "about" or "approximately" include the recited numbers and should be interpreted based on the circumstances (e.g., as accurate as reasonably possible under the circumstances, for example –5%, 5%, 10%, 15%, etc.). For example, "about 3.5 mm" includes "3.5 mm." Phrases preceded by a term such as "substantially" include the recited phrase and should be interpreted based on the circumstances (e.g., as much as reasonably possible under the circumstances). For example, "substantially constant" includes "constant."

The detailed description is presented to enable a person of ordinary skill in the art to make and use the invention and is provided in the context of the requirement for obtaining a patent. Various modifications to the exemplary embodiments will be readily apparent to those skilled in the art and the generic principles of the present invention may be applied to other embodiments, and some features of the present invention may be used without the corresponding use of other features. Accordingly, the present invention is not intended to be limited to the embodiments shown but is to be accorded the widest scope consistent with the principles and features described herein.

What is claimed:

1. A method comprising:
receiving from a web browser a create instruction to create a notepad comprising a list of references to annotation objects already stored using one or more computer systems, wherein an annotation object comprises:
a Uniform Resource Locator (URL) for a document;
data for representing the selected piece of text from the document, wherein the selected piece of text is representative of the annotation;
wherein information for finding the selected piece of text in the document; and
the annotation object further comprises a group of one or more deliverable screenshots, wherein a deliverable screenshot corresponds to a marked screenshot in a storage group, and
wherein the deliverable screenshot comprises a pre-determined selection from a group comprising: the marked screenshot itself; and the URL for retrieving the marked screenshot from a Content Delivery Network (CDN), creating the notepad using one or more computer systems;
receiving from the web browser an add instruction to add a reference to the annotation object in the list of references to annotation objects of the notepad using one or more computer systems; and storing a notepad object corresponding to the notepad in an electronic database, wherein the notepad object comprises the list of references to annotation objects of the notepad.

2. The method of claim 1, wherein the web browser comprises a web browser application and a browser extension that can be run by the web browser application.

3. The method of claim 1, wherein the web browser comprises one or more JavaScript files.

4. The method of claim 1, wherein the storage group comprises one or more marked screenshots created from an initial marked screenshot comprising a portion of the document showing the selected piece of text, and
wherein the selected piece of text is visually marked; and
the screenshots in the storage group are created using one or more methods from a method group comprising resizing, cropping, and image alteration based on one or more criterion selected from a group of criterions.

5. The method of claim 4, wherein one marked screenshot in the storage group is a thumbnail marked screenshot.

6. The method of claim 1, wherein the list of references to annotation objects is initially empty.

7. The method of claim 1, wherein the list of references to annotation objects contains annotation objects with different URLs.

8. The method of claim 1, further comprising receiving a delete instruction to remove a reference in the list of references to annotation objects of the notepad using one or more computer systems and updating the notepad object in the electronic database to reflect the change caused by the delete instruction.

9. The method of claim 1, further comprising transmitting a notepad to the web browser based on a set of access control rules that determine whether a user account associated to the user of the web browser has permission to view the notepad.

10. A system comprising:
an annotation server operative to receive from a web browser a create instruction to create a notepad comprising a list of references to annotation objects already stored using one or more computer systems, wherein an annotation object comprises:
a uniform resource locator(URL) for a document;
data for representing a selected piece of text from the document, wherein the selected piece of text is representative of the annotation; and
information for finding the selected piece of text in the document; and
wherein the annotation object further comprises a group of one or more deliverable screenshots, a deliverable screenshot corresponds to a marked screenshot in a storage group, and wherein the deliverable screenshot comprises a pre-determined selection from a group comprising: the marked screenshot itself; and
the URL for retrieving the marked screenshot from a Content Delivery Network (CDN);
the annotation server operative to create the notepad using one or more computer systems;
the annotation server operative to receive from the annotation capable web browser an add instruction to add a reference to the annotation object in the list of references to annotation objects of the notepad using one or more computer systems; and
an electronic database operative to store the notepad object corresponding to the notepad.

11. The system of claim 10; wherein the web browser is comprised of a web browser application and a browser extension that can be run by the web browser application.

12. The system of claim 10, wherein the web browser comprises one or more JavaScript files.

13. The system of claim 10, wherein the storage group comprises one or more marked screenshots created from an initial marked screenshot comprising a portion of the document showing the selected piece of text, and wherein the selected piece of text is visually marked; and
the screenshots in the storage group are created using one or more methods from a method group comprising resizing, cropping, and image alteration based on one or more criterion selected from a group of criterions.

14. The system of claim 13, wherein one marked screenshot in the storage group is a thumbnail marked screenshot.

15. The system of claim 10, wherein the list of references to annotation objects is initially empty.

16. The system of claim 10, further comprising the annotation server operative to receive a delete instruction to remove a reference in the list of references to annotation objects of the notepad using one or more computer systems and updating the notepad object in the electronic database to reflect the change caused by the delete instruction.

17. The system of claim 10, further comprising the annotation server operative to transmit the notepad to an annotation capable web browser based on a set of access control rules that determine whether a user account associated to the user of the annotation capable web browser has permission to view the notepad.

18. The system of claim 10, wherein the list of references to annotation objects contains annotation objects with different URLs.

* * * * *